(12) United States Patent
Schonfeld et al.

(10) Patent No.: US 10,259,345 B2
(45) Date of Patent: *Apr. 16, 2019

(54) INTEGRATED SAFETY SEAT

(71) Applicants: Lizbeth Schonfeld, North Miami Beach, FL (US); David Schonfeld, North Miami Beach, FL (US)

(72) Inventors: Lizbeth Schonfeld, North Miami Beach, FL (US); David Schonfeld, North Miami Beach, FL (US)

(73) Assignee: DALI, LLC, North Miami Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,214

(22) Filed: Jul. 18, 2018

(65) Prior Publication Data

US 2019/0009695 A1    Jan. 10, 2019

Related U.S. Application Data

(63) Continuation-in-part of application No. 15/683,445, filed on Aug. 22, 2017, now Pat. No. 10,052,979,
(Continued)

(51) Int. Cl.
*B60N 2/02* (2006.01)
*B60N 2/22* (2006.01)
(Continued)

(52) U.S. Cl.
CPC ........... *B60N 2/0292* (2013.01); *B60N 2/002* (2013.01); *B60N 2/2231* (2013.01); *B60N 2/265* (2013.01);
(Continued)

(58) Field of Classification Search
CPC .... B60N 2/002; B60N 2/0292; B60N 2/2231; B60N 2/26; B60N 2/265; B60N 2/3081;
(Continued)

(56) References Cited

U.S. PATENT DOCUMENTS 2,584,481 A * 2/1952 Mast ..................... B60N 2/3084
                                                                    297/113
4,756,573 A * 7/1988 Simin ................... B60N 2/3084
                                                                    297/117
(Continued)

FOREIGN PATENT DOCUMENTS

DE        4121795 A1 *   2/1992   ........... B60N 2/2821
DE        4213218 A1 * 10/1993   ........... B60N 2/3084
(Continued)

*Primary Examiner* — Laura Freedman
(74) *Attorney, Agent, or Firm* — Jacqueline Tadros; Jacqueline Tadros, P.A.

(57) ABSTRACT

An integrated safety seat permanently built into a vehicle. The safety seat may be united with other seats or separated from other seats, or other integrated safety seats. The integrated safety seat is configured to accommodate an occupant from newborn to adulthood in a seat bottom, as well as in a back, whereby the seat bottom, back and a cradle in between may incline upward and downward by an internal mechanism, to a plurality of angles, ranging from rear facing to forward facing. The integrated safety seat includes a headrest and footrests support in the forward facing position, which serve as a footrest and headrest support, respectively in the rear facing position. The integrated safety seat includes harnesses and lap-belts with hasps, armrests, and headrests, footrests, inserts, within that elevate. The safety seat further includes integrated safety controls that operate regardless of whether the vehicle is in operation.

18 Claims, 56 Drawing Sheets

Related U.S. Application Data which is a continuation of application No. 15/289,048, filed on Oct. 7, 2016, now Pat. No. 9,796,303.

(51) Int. Cl.
  *B60N 2/26*      (2006.01)
  *B60N 2/30*      (2006.01)
  *B60N 2/00*      (2006.01)

(52) U.S. Cl.
  CPC .... *B60N 2/3081* (2013.01); *B60N 2002/0216* (2013.01); *B60R 2300/8013* (2013.01)

(58) Field of Classification Search
  CPC ............... B60N 2/3084; B60N 2/3086; B60N 2002/0216; B60R 22/105; B60R 22/024; B60R 2022/4816; B60R 2022/025; B60R 2300/8013
  See application file for complete search history.

(56) References Cited

U.S. PATENT DOCUMENTS

| | | | | |
|---|---|---|---|---|
| 4,900,087 A | * | 2/1990 | Crisp | B60N 2/3084 297/112 |
| 4,913,498 A | * | 4/1990 | Forlivio | B60N 2/3084 297/238 |
| 4,943,112 A | * | 7/1990 | Law | B60N 2/3084 297/112 |
| 5,205,308 A | * | 4/1993 | Kendall | B60J 1/2011 135/90 |
| 5,224,756 A | * | 7/1993 | Dukatz | B60N 2/3084 297/114 |
| 5,260,684 A | * | 11/1993 | Metzmaker | B60N 2/002 340/425.5 |
| 5,280,995 A | * | 1/1994 | Elton | B60N 2/3084 280/807 |
| 5,282,667 A | * | 2/1994 | Elton | B60N 2/3084 297/238 |
| 5,332,284 A | * | 7/1994 | Elton | B60N 2/3084 297/238 |
| 5,332,292 A | * | 7/1994 | Price | B60N 2/2839 297/219.12 |
| 5,364,169 A | * | 11/1994 | Collins | B60R 22/105 297/238 |
| 5,385,384 A | * | 1/1995 | Gierman | B60N 2/3084 297/216.11 |
| RE34,868 E | * | 2/1995 | Vander Stel | B60N 2/3084 297/238 |
| 5,472,260 A | * | 12/1995 | Czapski | B60N 2/3084 297/112 |
| 5,498,062 A | * | 3/1996 | Holdampf | B60N 2/3084 297/14 |
| 5,524,962 A | * | 6/1996 | Fulgenzi | B60N 2/3081 297/236 |
| 5,568,959 A | * | 10/1996 | Weber | B60N 2/757 297/238 |
| 5,601,334 A | * | 2/1997 | Marks | B60N 2/3084 297/233 |
| 5,788,326 A | * | 8/1998 | Kawade | B60N 2/2812 248/419 |
| 6,773,123 B1 | * | 8/2004 | Hatchett | B60N 2/2821 359/872 |
| 6,918,631 B2 | * | 7/2005 | Verbovszky | A47D 15/006 297/219.12 |
| 7,261,381 B2 | * | 8/2007 | Tsai | B60N 2/2812 297/488 |
| 7,284,792 B1 | * | 10/2007 | Dabney | B60N 2/2812 297/216.11 |
| 7,311,357 B2 | * | 12/2007 | Gold | B60N 2/2812 297/219.12 |
| 8,063,788 B1 | * | 11/2011 | Morningstar | B60N 2/002 180/271 |
| 8,322,788 B2 | * | 12/2012 | Williams | B60N 2/2806 297/256.16 |
| 8,544,950 B2 | * | 10/2013 | Merensky | B60N 2/3084 297/238 |
| 9,189,943 B1 | * | 11/2015 | Rambadt | G08B 21/0266 |
| 9,266,535 B2 | * | 2/2016 | Schoenberg | B60N 2/28 |
| 9,403,437 B1 | * | 8/2016 | McDonald | B60K 37/02 |
| 9,796,303 B1 | | 10/2017 | Schonfeld et al. | |
| 10,052,979 B2 | * | 8/2018 | Schonfeld | B60N 2/26 |
| 2005/0151844 A1 | * | 7/2005 | Chiao | H04N 7/183 348/148 |
| 2007/0170758 A1 | * | 7/2007 | Allen | B60N 2/0244 297/250.1 |
| 2010/0078976 A1 | * | 4/2010 | Hou | B60N 2/2845 297/230.13 |
| 2013/0033373 A1 | * | 2/2013 | Thomas | B60N 2/002 340/457.1 |
| 2014/0118548 A1 | * | 5/2014 | Veneziano | H04N 7/183 348/148 |
| 2016/0200250 A1 | * | 7/2016 | Westmoreland | B60Q 9/00 340/457.1 |
| 2018/0099587 A1 | | 4/2018 | Schonfeld et al. | |

FOREIGN PATENT DOCUMENTS

| | | | | |
|---|---|---|---|---|
| DE | 19604094 A1 | * | 7/1997 | ............... B60N 2/28 |
| EP | 0431199 A1 | * | 6/1991 | .......... B60N 2/2821 |
| EP | 0516495 A1 | * | 12/1992 | .......... B60N 2/3086 |
| GB | 2439521 A | * | 1/2008 | ............... B60N 2/26 |
| JP | 02106448 A | * | 4/1990 | .......... B60N 2/3084 |
| JP | 04349040 A | * | 12/1992 | |
| JP | 04349041 A | * | 12/1992 | |
| JP | 05162574 A | * | 6/1993 | .......... B60N 2/2872 |
| JP | 06008764 A | * | 1/1994 | |
| JP | 06135274 A | * | 5/1994 | |
| JP | 06183291 A | * | 7/1994 | |
| JP | 07186799 A | * | 7/1995 | .......... B60N 2/3084 |
| JP | 07315092 A | * | 12/1995 | |
| JP | 08085418 A | * | 4/1996 | |
| JP | 2001130298 A | * | 5/2001 | |
| WO | WO-9203306 A1 | * | 3/1992 | .......... B60N 2/3084 |
| WO | WO-2005012032 A1 | * | 2/2005 | .......... B60N 2/2824 |
| WO | WO-2015076764 A1 | * | 5/2015 | ............... B60N 2/26 |

\* cited by examiner

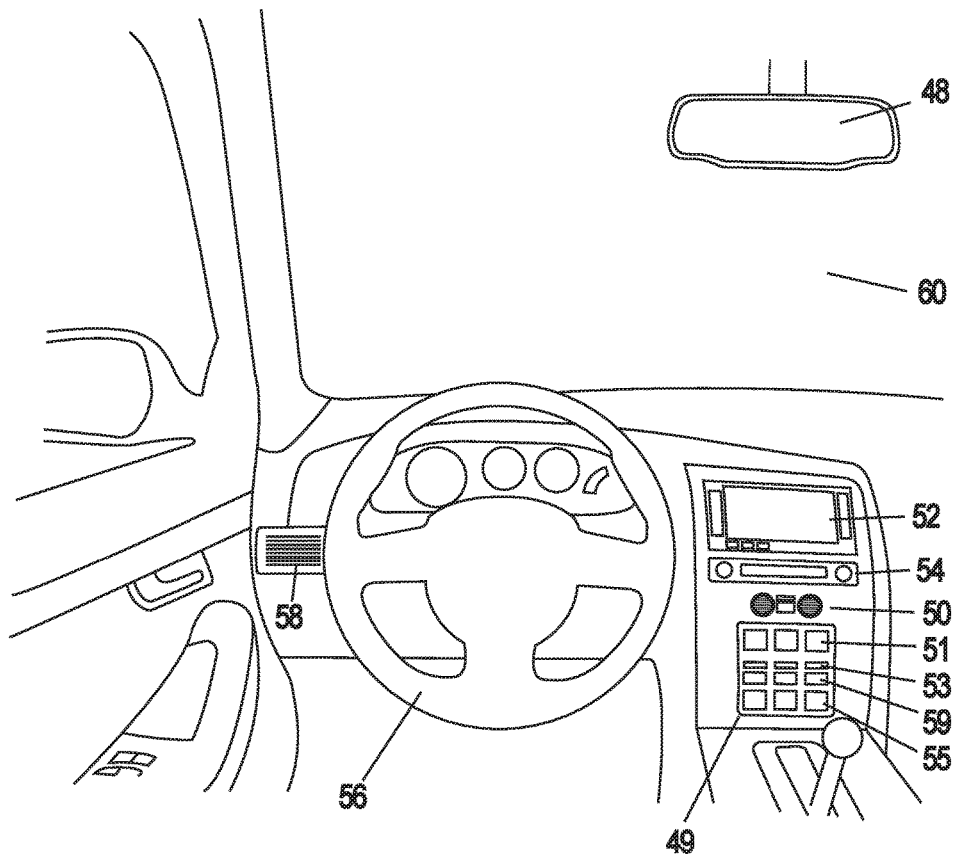
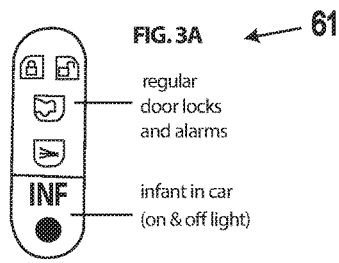
FIG. 3

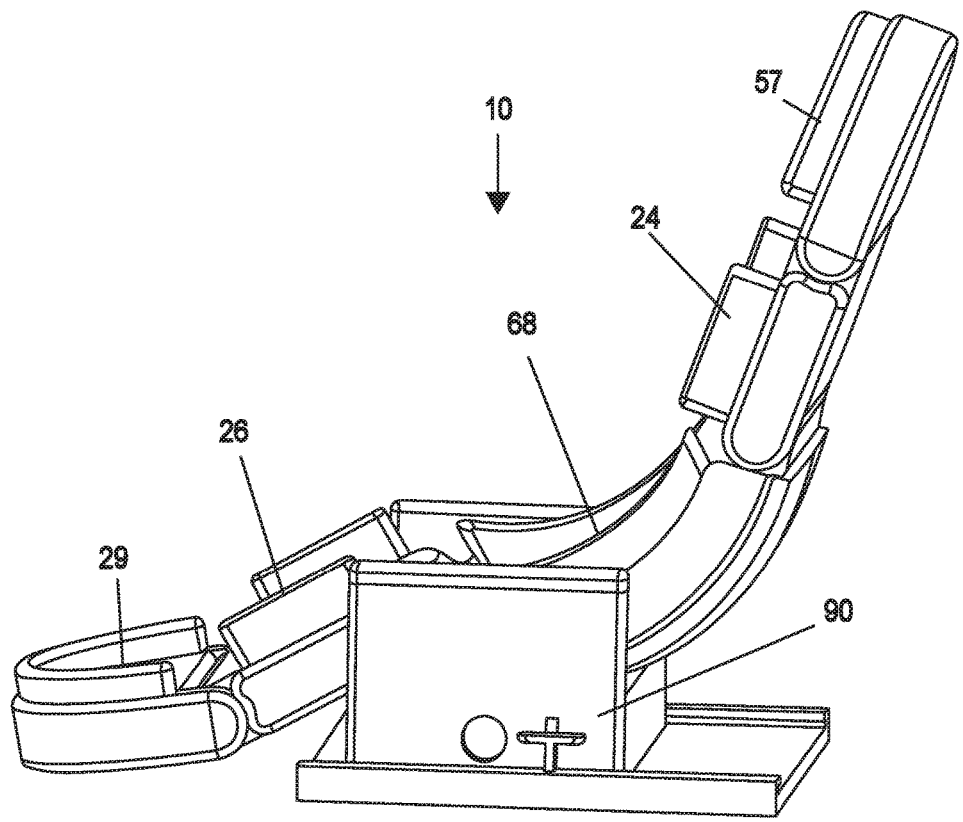
FIG. 19 A - X

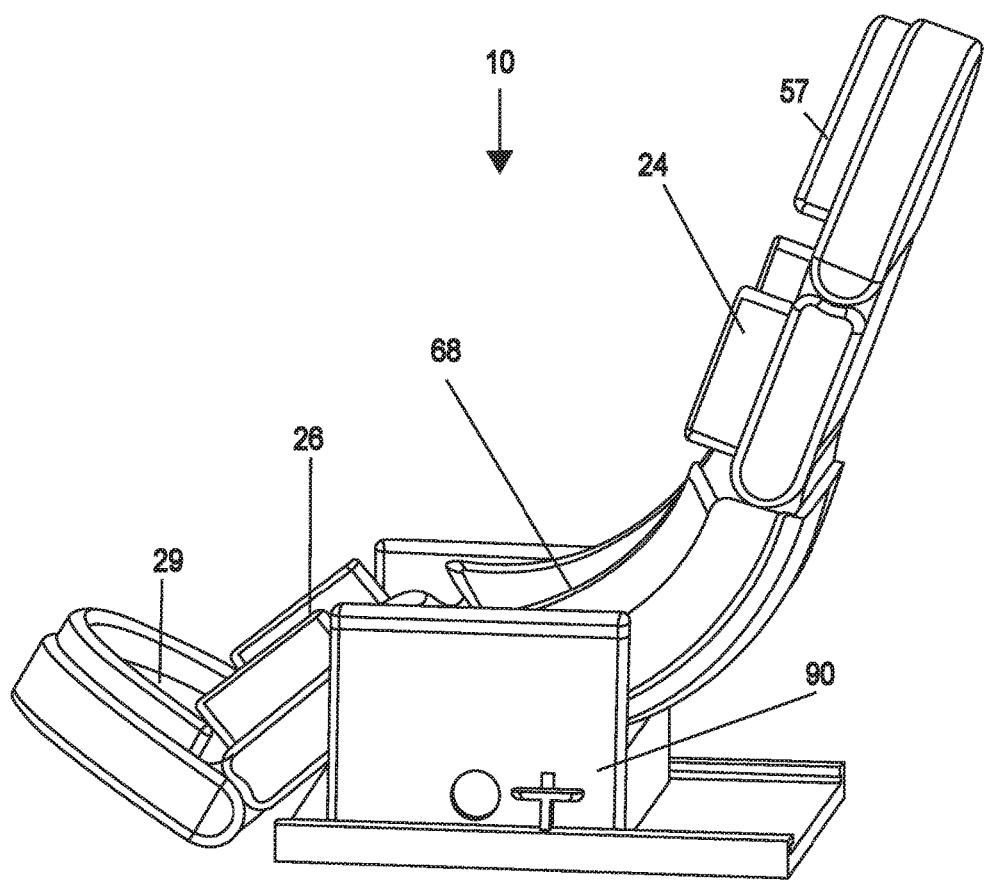
FIG. 19 A - Y

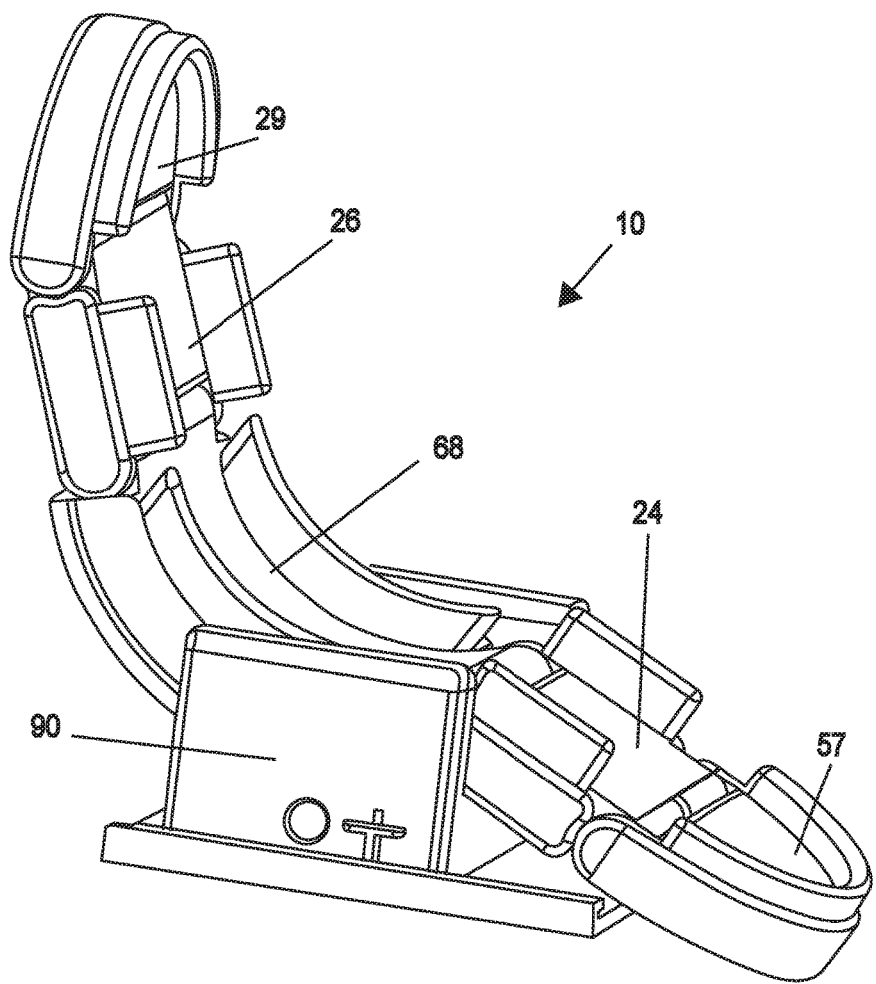
FIG. 20 A - X

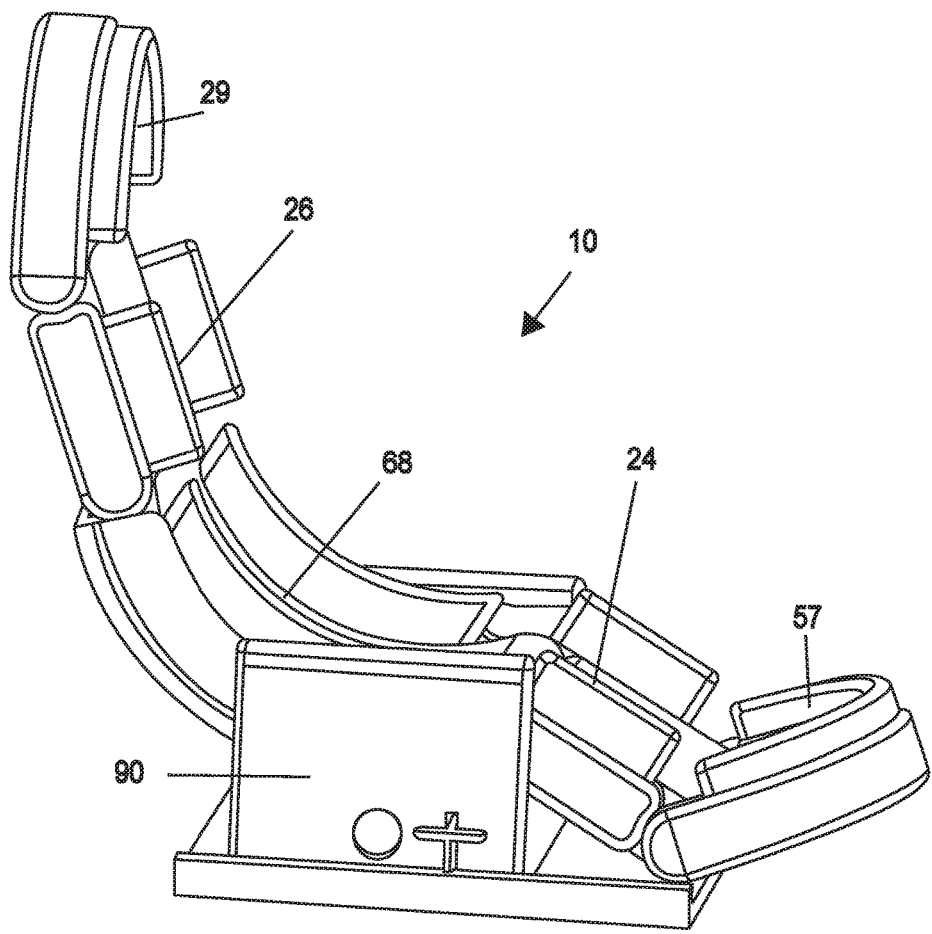
FIG. 20 A - Y

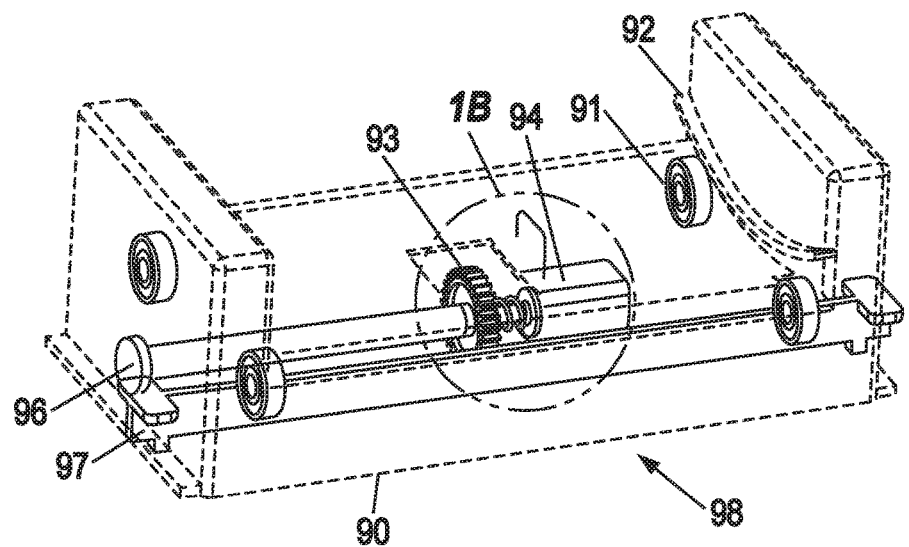
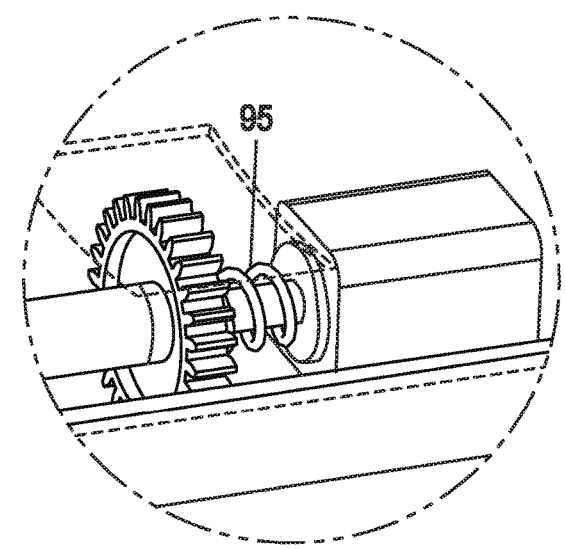
1st. Embodiment  FIG. 27 - 1

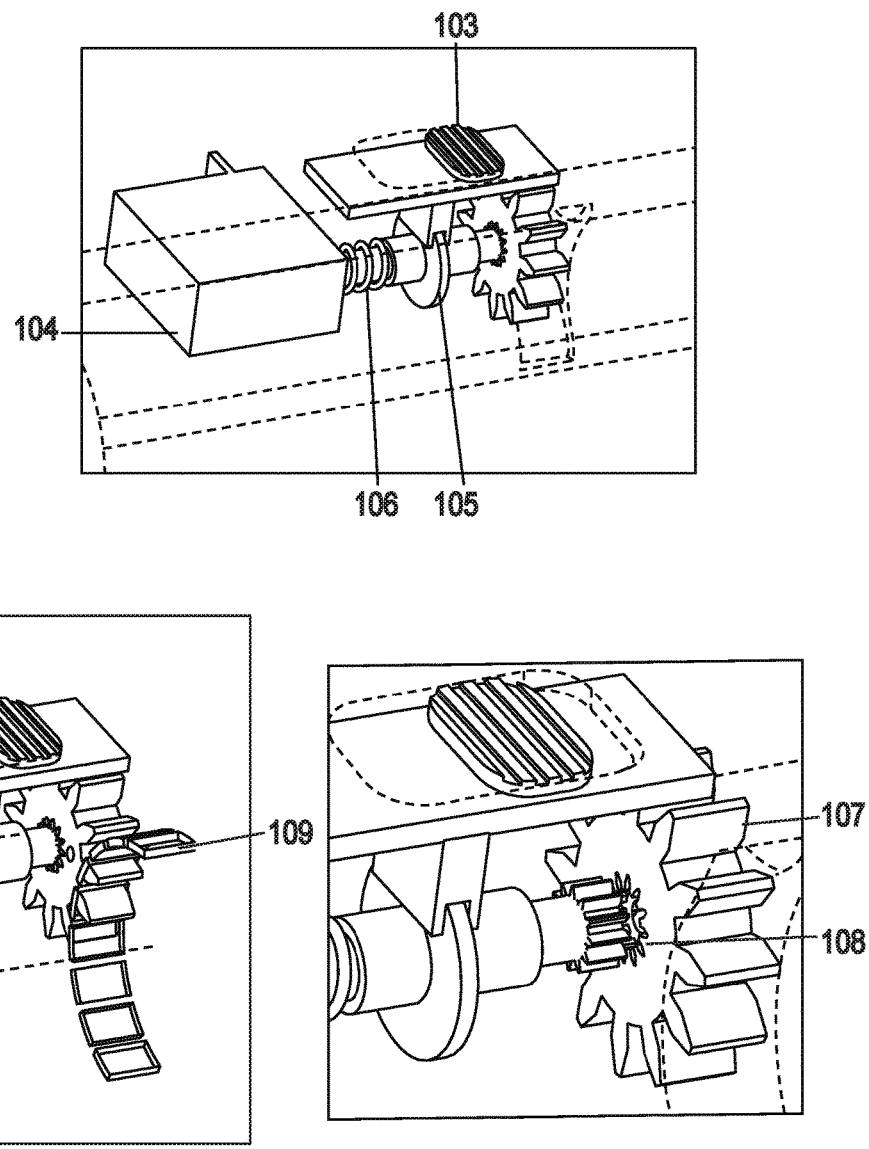
1st. Embodiment FIG. 27 - 2

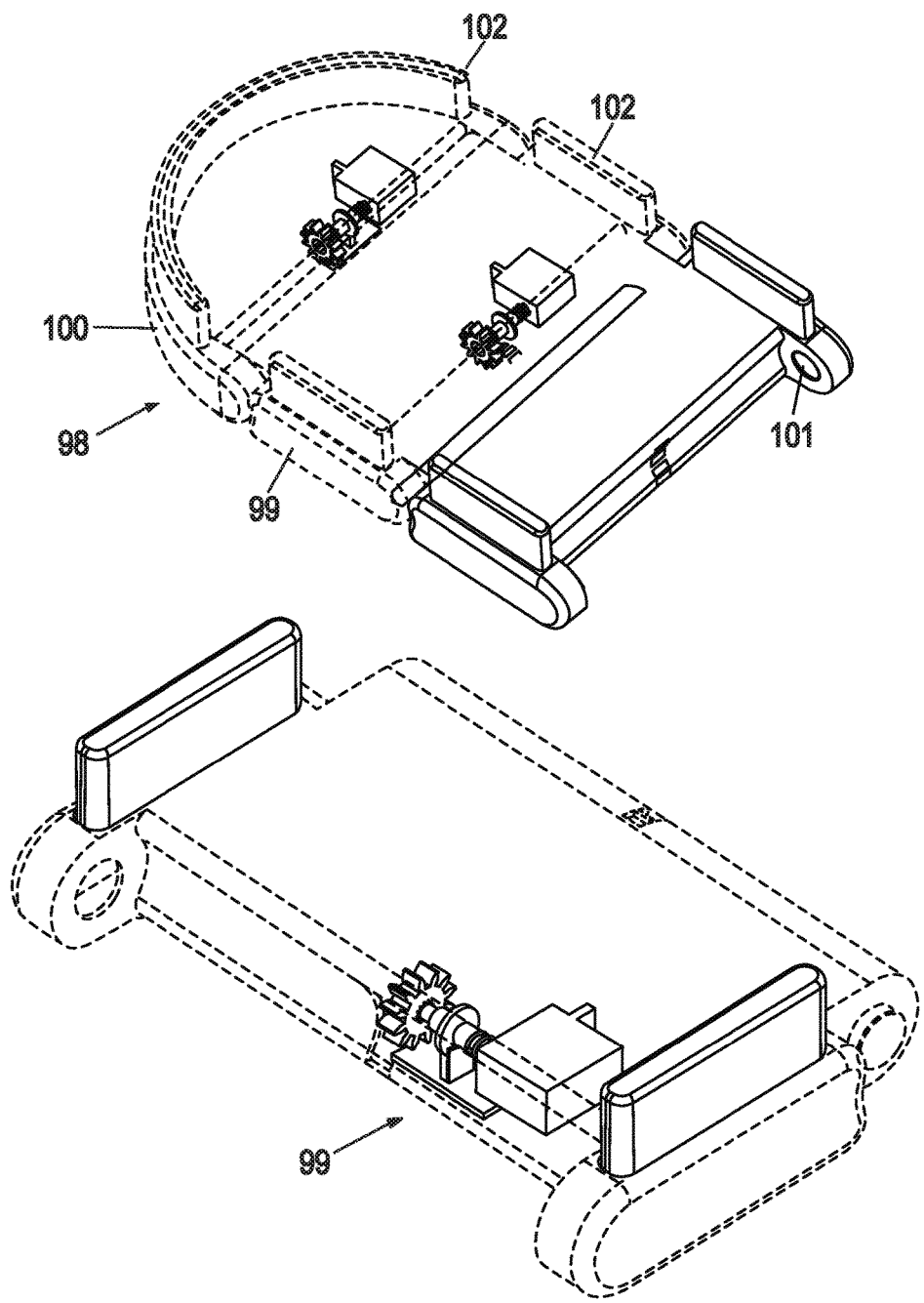
1st. Embodiment FIG. 27 - 3

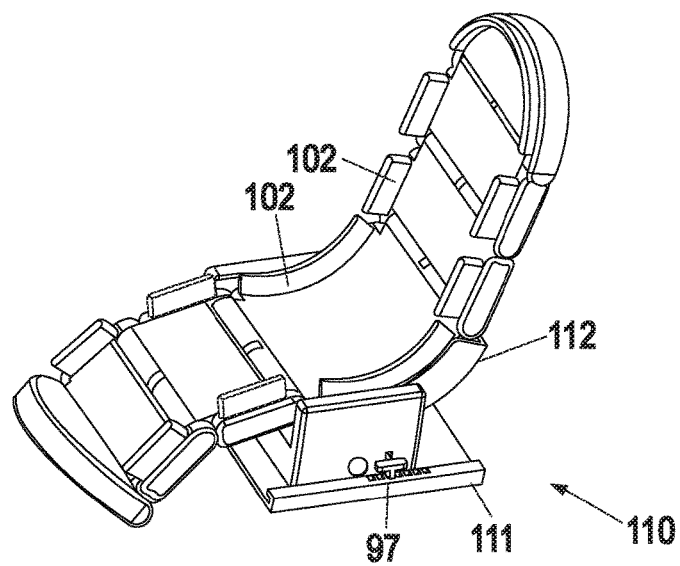
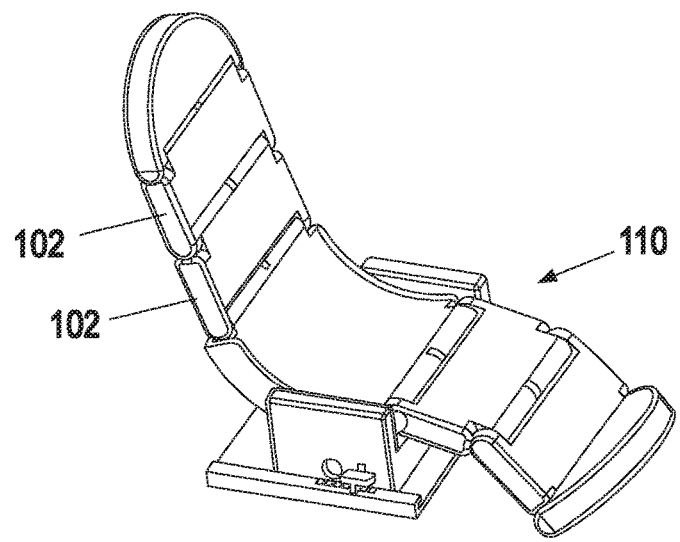
1st. Embodiment FIG. 27 - 4

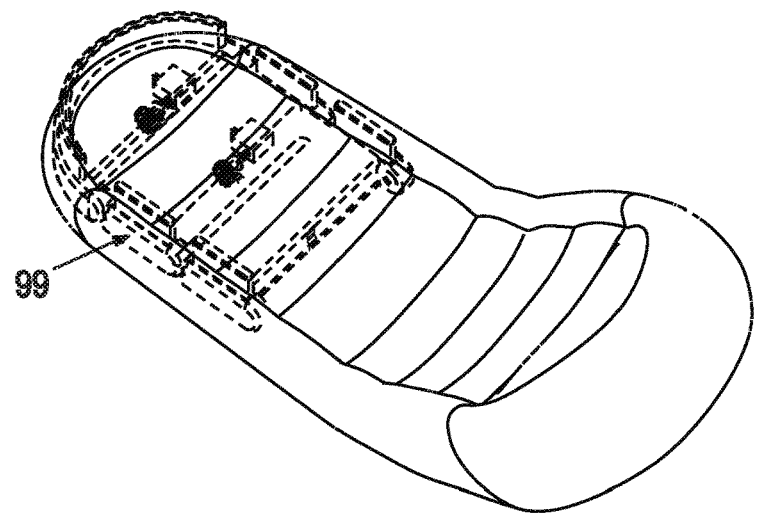
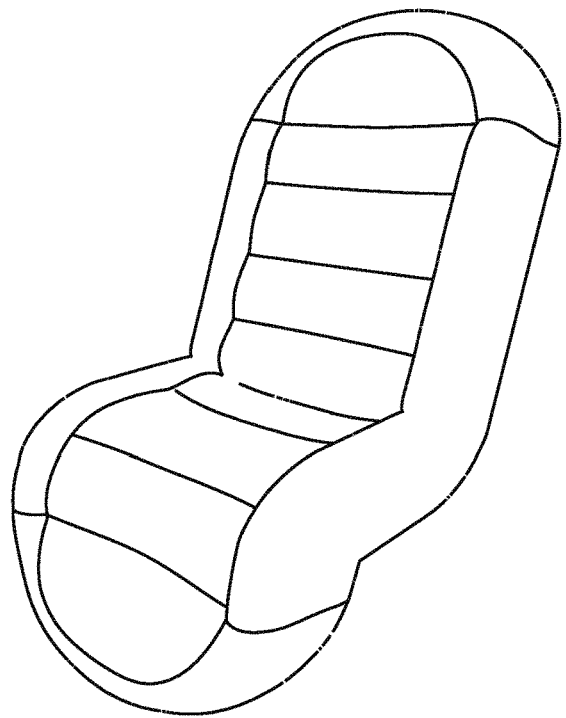
1st. Embodiment FIG. 27 - 5

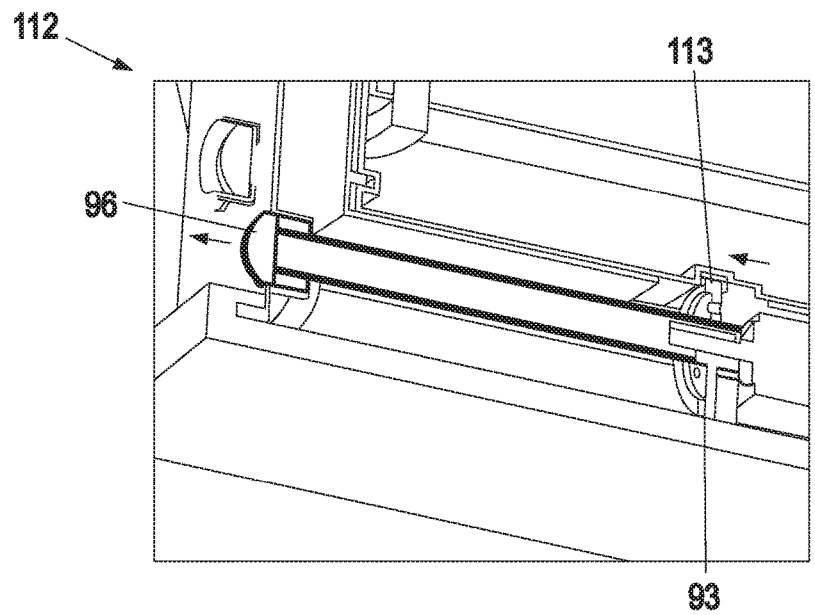
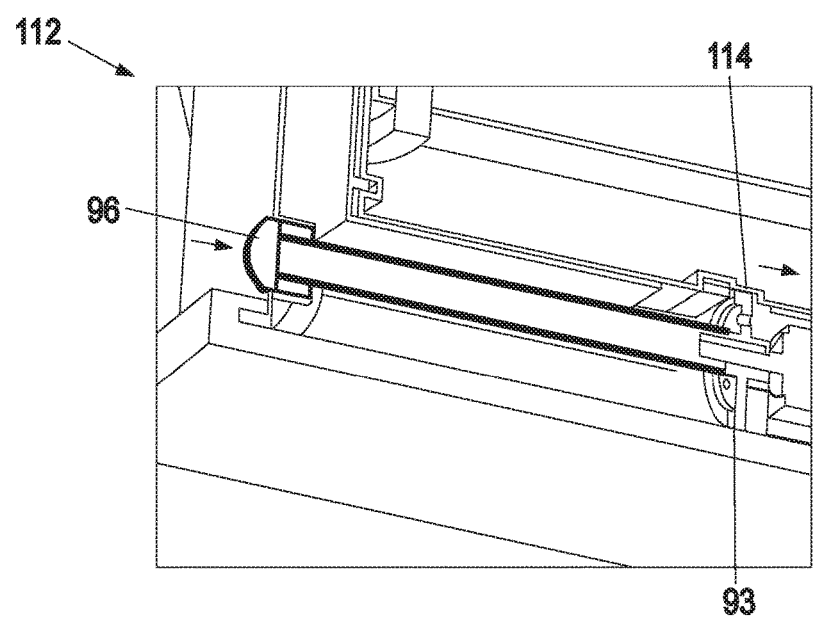
1st. Embodiment FIG. 27 - 6

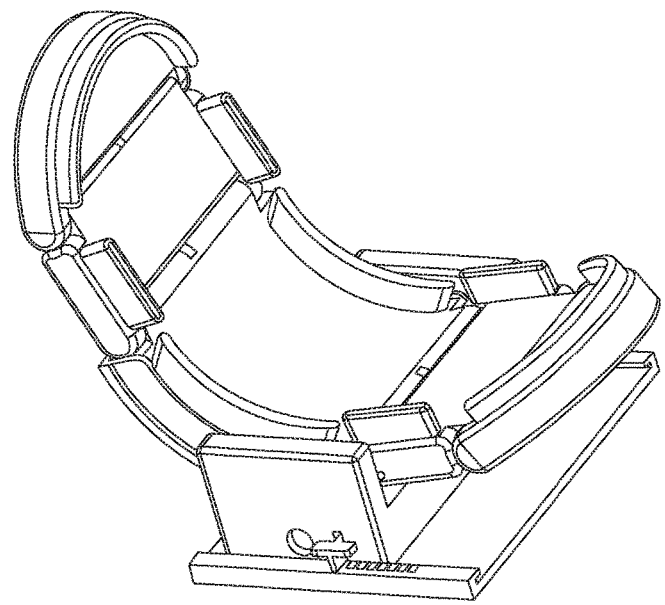
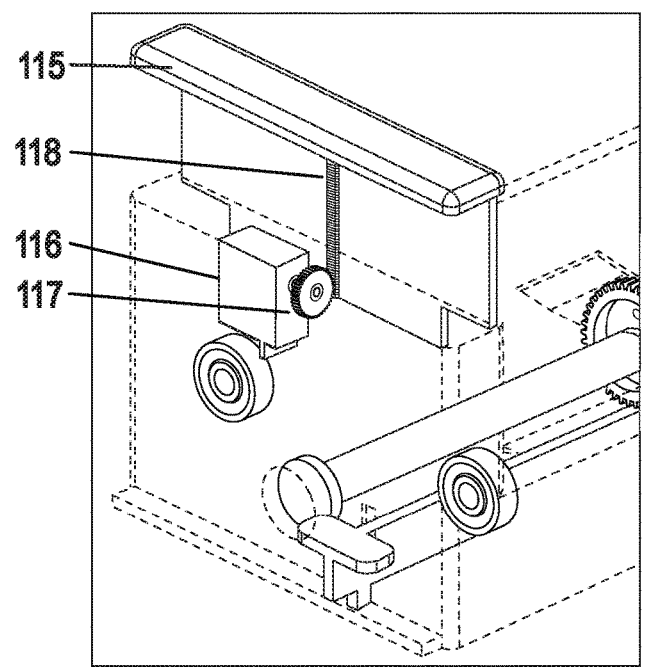
1st. Embodiment FIG. 27 - 7

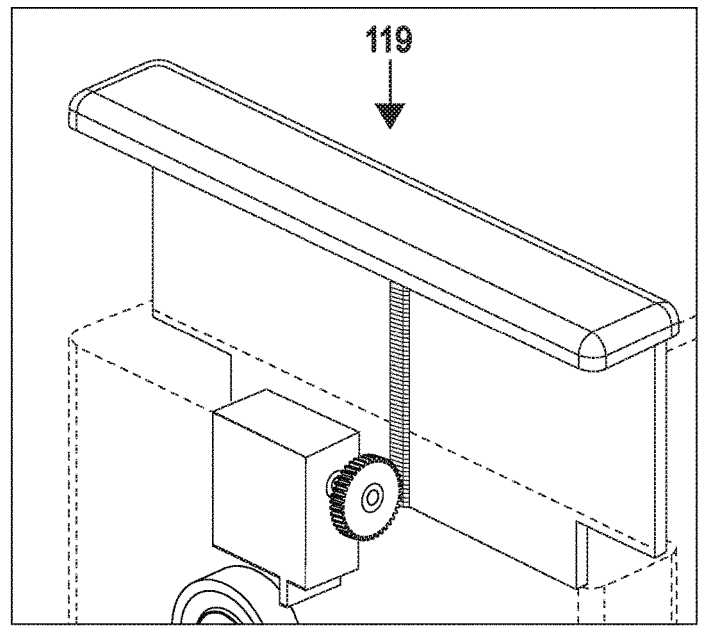
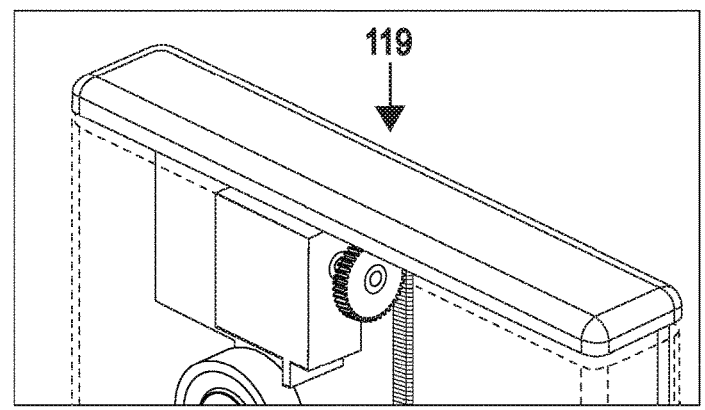
1st. Embodiment FIG. 27 - 8

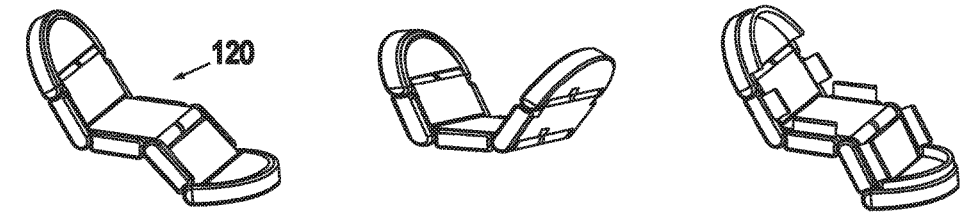
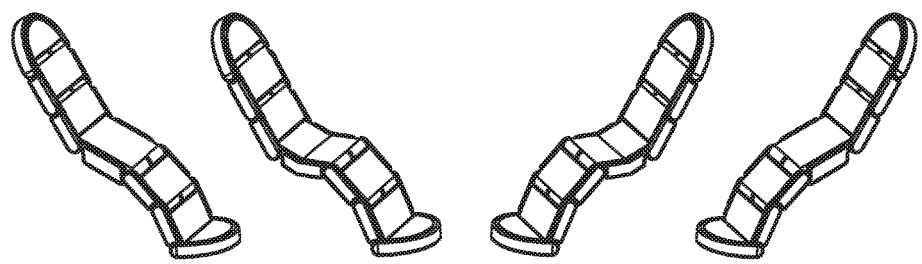
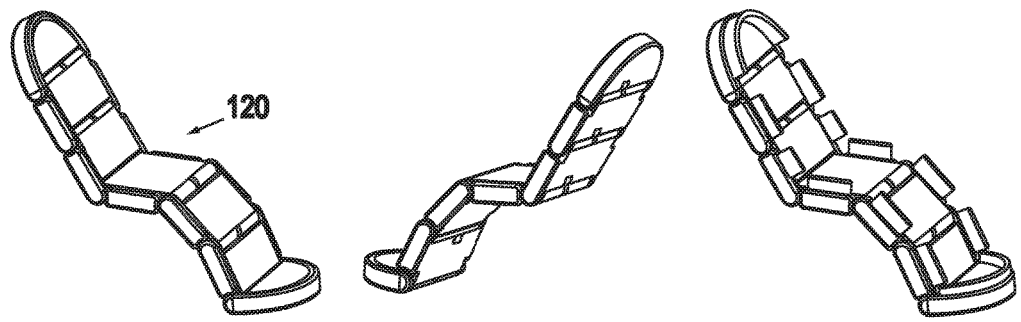
2nd. Embodiment FIG. 27 - 9

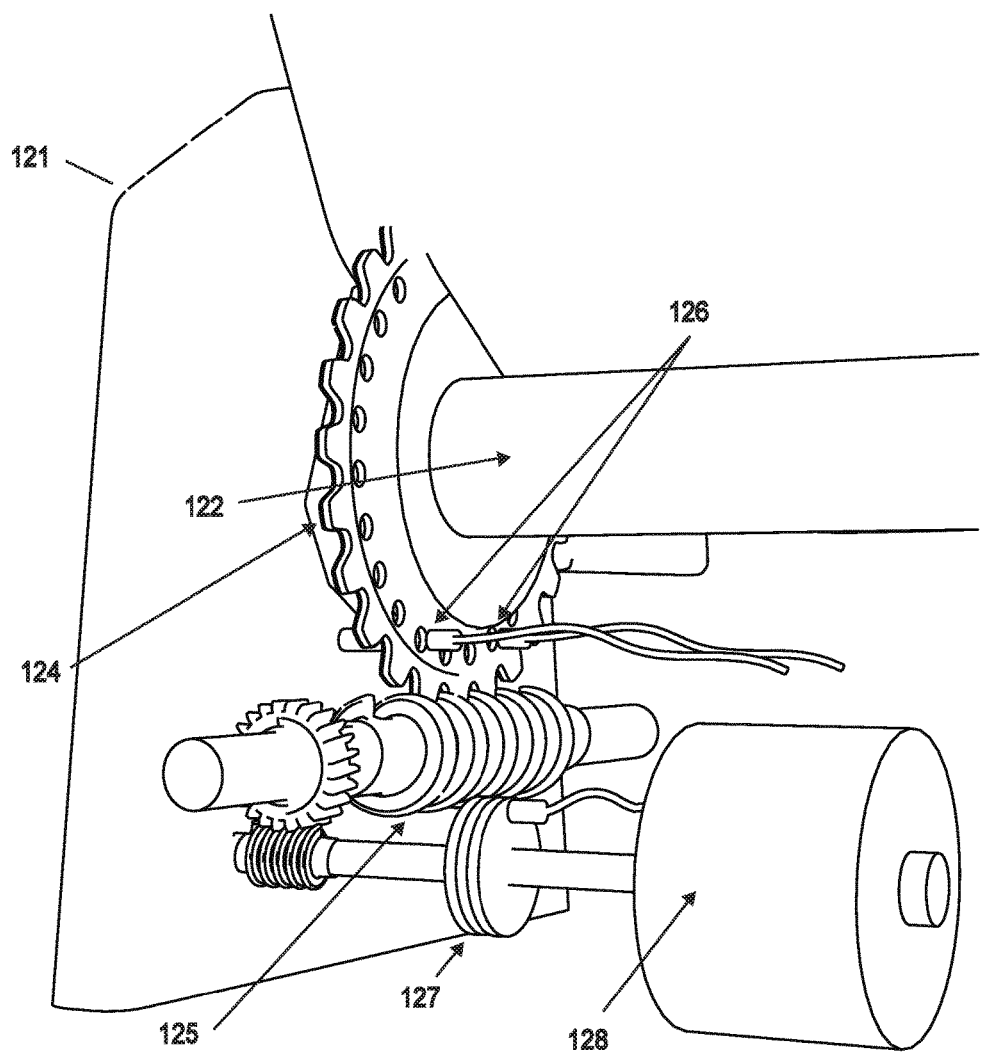
3rd-Embodiment FIG. 27 - 10

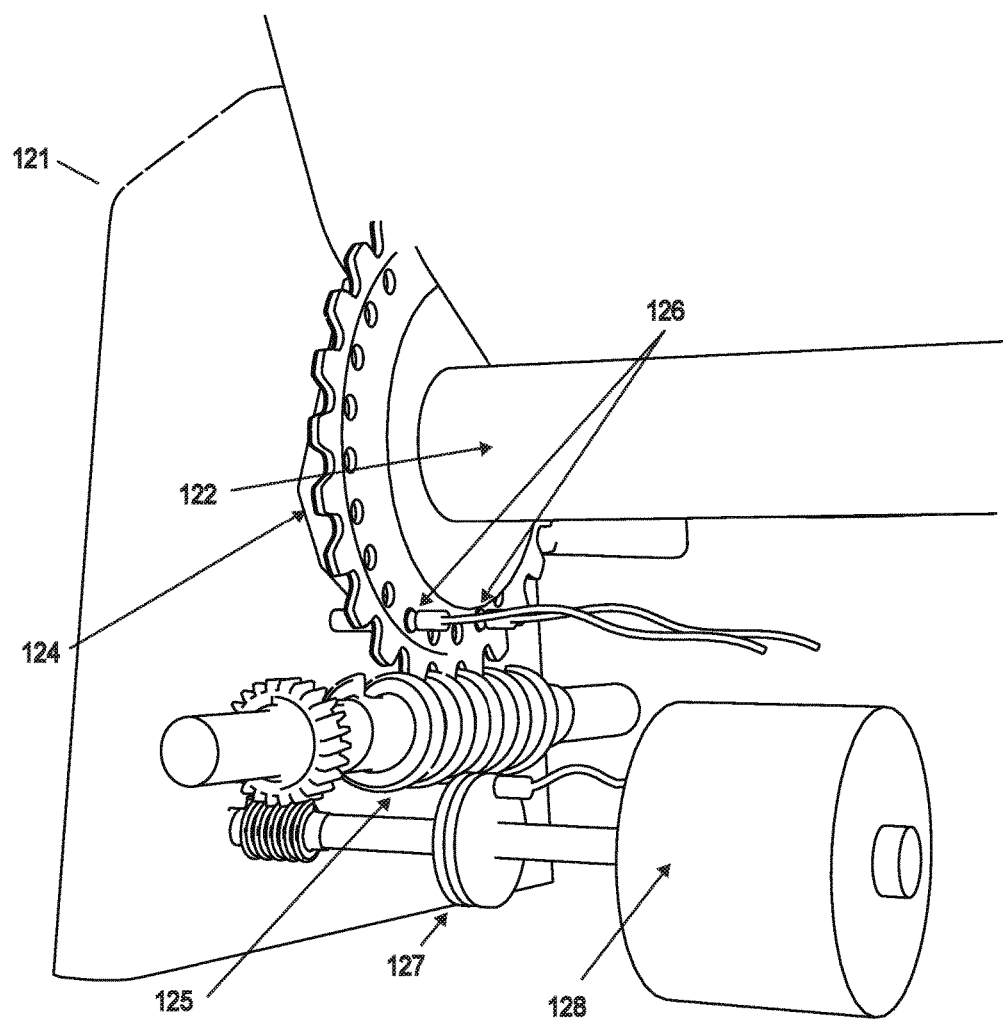
3rd·Embodiment FIG. 27 - 11

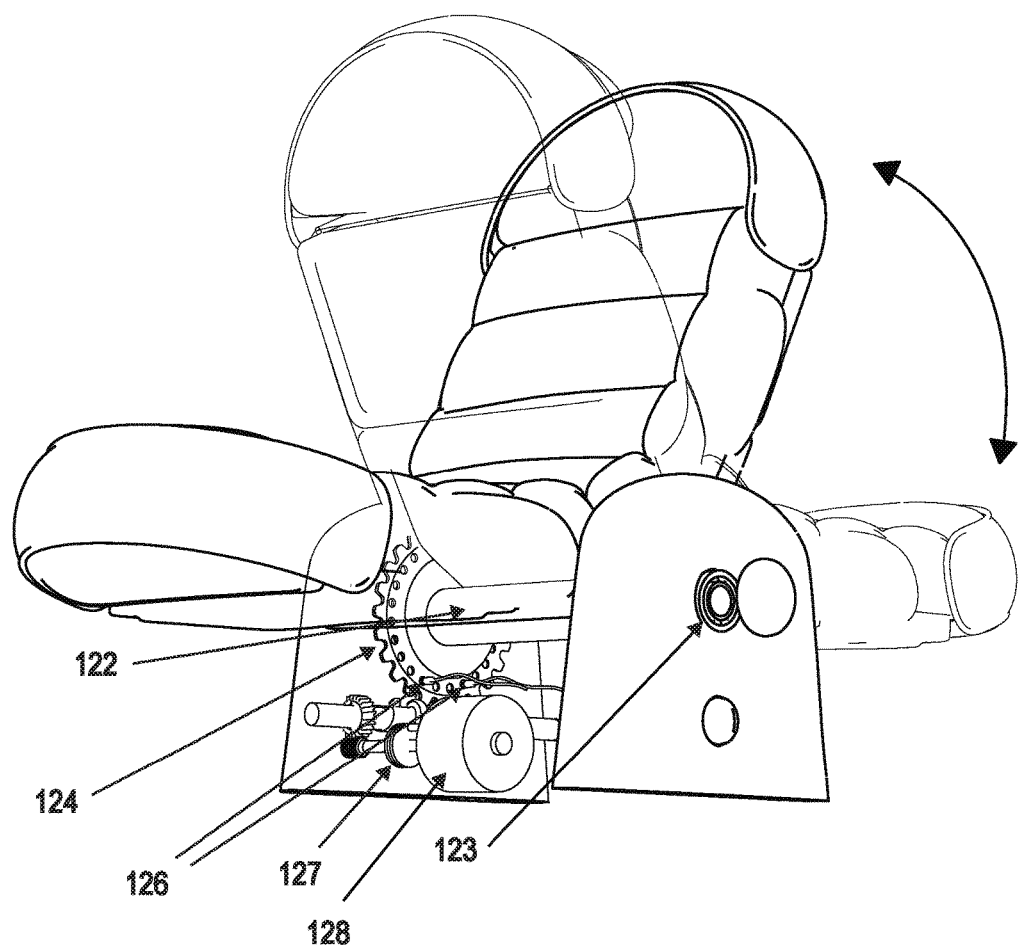
3rd. Embodiment FIG. 27 - 12

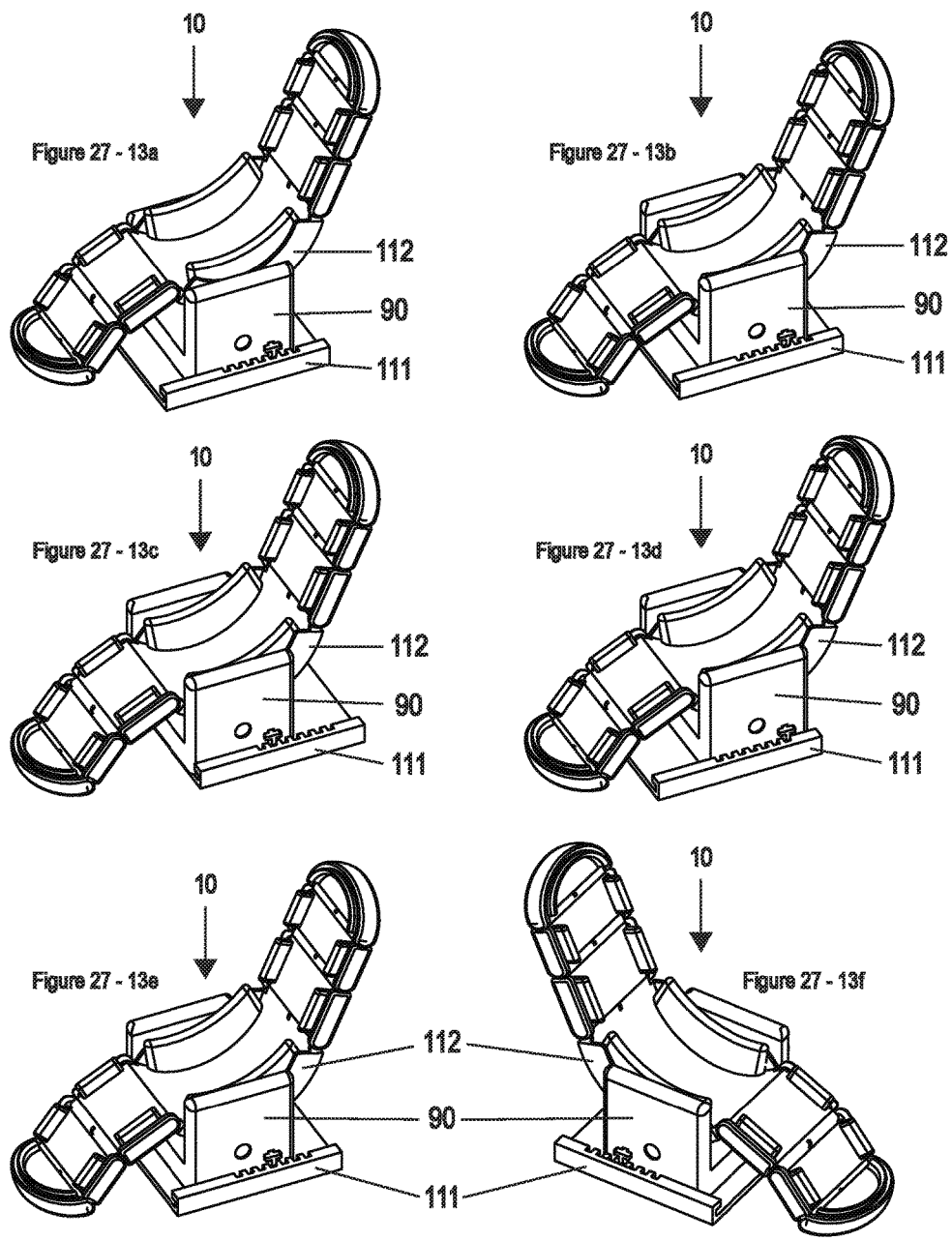
3rd·Embodiment FIG. 27 - 13

INTEGRATED SAFETY SEAT

I. CROSS-REFERENCE TO RELATED APPLICATIONS

This is a continuation-in-part application of allowed U.S. patent application Ser. No. 15/683,445, filed on Aug. 22, 2017, now U.S. Pat. No. 10,052,979, which issued on Aug. 21, 2018, which is a continuing application of U.S. patent application Ser. No. 15/289,048 filed on Oct. 7, 2016, now U.S. Pat. No. 9,796,303 issued on Oct. 24, 2017, and claims the benefit thereof.

II. BACKGROUND OF THE INVENTION

1. Field of the Invention

The present invention relates to an integrated safety seat for a vehicle. In particular, the safety seat of the present invention is completely and seamlessly integrated with the upholstery of a vehicle seat and permanently built in the seat area of a passenger vehicle. The safety seat of the present invention may be unified with other seats or with another seat as part of a unitary bench seat or separated from other seats or another seat as with bucket seats. The safety seat of the present invention is configured to accommodate an occupant ranging in age from infancy to adulthood. In particular, the safety seat of the present invention may be configured to adapt to different positions ranging from rear facing to forward facing, including a cradle position between the rear facing and forward facing positions. The safety seat of the present invention may incline in a variety of different positions with a plurality of angles and includes security control features intertwined with one another, integrated into the seat and reflected and controlled in the dashboard.

2. Description of the Related Art

Several designs for safety seats used in vehicles have been designed in the past. None of them, however, include a seat or seats configured to accommodate an occupant from infancy to adulthood or provide for the safety seat to be permanently integrated as part of the vehicle's structure, such that the safety seat is seamlessly integrated with the seat of the vehicle. In contrast to safety seats known in the art, the integrated safety seat of the invention provides for the mechanisms of the safety seat to be invisible in the interior of the integrated safety seat. The seat of the invention includes safety integrated features configured to ensure that the infant is travelling with the utmost protection and is configured to prevent unbuckled infants, or infants inadvertently left in seat and infant left in-car injuries with the use of a monitoring system configured to allow a driver to focus attention on the road ahead while also viewing an infant without turning around.

Applicant believes that the closest reference corresponds to U.S. Pat. No. 4,756,573 issued to Simin. However, it differs from the present invention because while the Simin device is partially integrated with the vehicle, the infant carrier is similar to most baby car seats in use today and it is configured to be located externally on top or above a platform of the automobile front seat next to the driver, facing backwards, configured to needing an attendant to look after the infant from the back seat.

In contrast, the integrated safety seat of the present disclosure includes, among other features, a seat configured to accommodate an occupant from infancy to adulthood permanently formed into the rear area or bench seat of a vehicle, preferably in the center seat area which is safer, thus allowing a sturdier construction and absolute assimilation into the upholstery for a more pleasing aesthetic of the vehicle. The safety seat of the present invention may be united with other seat(s) as with a bench seat or it may be a separate unit, between or next to other seat(s) as with a bucket seat. Whether as part of a bench or bucket seat configuration, the safety seat is permanently integrated with the structure of the vehicle. Other safety features allow the driver to more securely monitor the status of the infant and are configured to prevent accidental injury from leaving an infant unattended, unbuckled or alone in a vehicle.

In the prior art, detached seats may include an additional pole configured to secure the safety seat to the base of the car to try to avoid movement of the detached seat, as well as a platform for the base of the detached car seat. The present invention avoids having to install these additional accessories, because the safety seat is integrated with the vehicle itself, and is therefore configured for the occupant to be secured, for greater stability and safety.

Another difference with Simin art is that the safety seats in the prior art are configured to accommodate infants or children from 6 to 8 years old. The present invention in contrast is an integrated seat that can accommodate an occupant from infancy to adulthood. In addition, the safety seat may incline from a fully rear facing to a fully forward position, including a cradle position generally midway between the fully forward and fully rear facing positions. Thus, the present invention may accommodate different growing stages from infancy to adulthood. The present invention provides for separate and independent inclination of the seat and head or foot rests supports and ensures safety with electronic, digital or other security features that are intertwined and installed as part of the safety seat when the vehicle is built.

The present invention dispenses with the need to purchase detached seats configured for the different growing stages of an infant or child.

The integrated safety seat is ideally configured for consumers that are starting a family or have children and feel the necessity of providing the highest safety and comfort for infants and children at every stage of development while traveling in a vehicle.

The integrated safety seat is ideal for large vans or SUVs or crossovers, although the design also serves smaller vehicles. The integrated safety seat can also be built into buses, trains, airplanes, boats or any other motion vehicle configured for a child that would best be secured in the rear facing position in his first years of development, and configured for occupants that will benefit from the features of the integrated seat.

This invention will serve the market with advanced technological and novel features for regular and autonomous vehicles with a vision of present and future needs.

In contrast to the prior art, the safety control features are intertwined with one another and are an internal part of the safety seat. The safety control features may be portrayed all together in a screen and a display or elsewhere in the dashboard covering all possible scenarios.

The safety features are configured to prevent inadvertently un-buckling a young occupant from the integrated safety seat using a control in the display on the dashboard to facilitate the process of following the sequence on the safety controls before leaving the vehicle and is configured for not leaving an occupant, particularly an infant or child alone in the seat or anywhere in the car.

The prior art does not suggest the novel features of the present invention that integrates all the control systems together and incorporates them internally in the vehicle.

The integrated safety seat of the invention ensures that a child will travel more safely when secured in the seat, as the seat comprises part of the structure of the vehicle, whether the seat is part of a bench or bucket seat. In contrast, the prior art buckles a child to a seat that is itself buckled to a bench or bucket seat of a car. The prior art safety seats are unstable, wiggly and unsafe, especially at the moment of an abrupt use of the brakes, or in a collision or accident.

The integrated safety seat is configured to provide assurance that occupants particularly children present in vehicles are completely safe, monitored and protected, by the ergonomic design of the integrated safety seat and security features.

III. SUMMARY OF THE INVENTION

An object of the present invention is to provide a safety seat including security devices, in which the security seat is permanently built into the vehicle and seamlessly integrated with the interior décor and upholstery of the vehicle into which it is installed.

It is another object of this invention to provide a safer seat by integrating the safety seat into the structure of a vehicle, such as a bench area or bucket seat instead of using seat belts or other strap-in systems as with detached car seat units which are often difficult to use and unreliable.

It is another object of the invention to provide an integrated safety seat that inclines to a plurality of angles from completely rear facing, to completely forward facing, including a cradle position in between.

It is an object of the invention to provide an integrated safety seat that provides for inclinations in all the sections of the integrated seat in a plurality of angles that may optionally be independent from each other, including the headrest and footrest support at either end of the safety seat given by an internal mechanized recline system, in which the integrated seat may have a concave or a regular shape, the armrest may elevate for protection, the headrest and footrest inside the seat bottom and back may raise and expand, the harnesses with hasps and lap-belts with hasp adjust for every position, inserts may reduce the width of the seat and may elevate, and padding may cover areas for protection, all of the features are within the safety seat, as well as integrated safety controls to monitor the child amongst other features, configured to accommodate an occupant from infancy to adulthood.

It is still another object of the present invention to provide an integrated infant safety seat configured to prevent the occurrence of injury to an occupant, in particular, a child. These features contemplate a series of controls coordinated together in a system that covers all possibilities to ensure maximum safety.

It is still another object of the present invention to provide a seat in which a child fits comfortably in the integrated seat in the rear facing position until he or she is 2 or 4 years old, as is mandatory in the United States, and in Europe.

It is yet another object of this invention to provide a device that is inexpensive to manufacture and maintain while retaining its effectiveness, since the integrated seat can be used for an infant, a child and even an adult.

It is another object of the present invention to provide an integrated seat with different models and sizes, to comply with the size of the vehicle it will be permanently built into, the design of the vehicle, and preferences, for regular and autonomous vehicles.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 is a view of a vehicle dashboard demonstrating safety features in the integrated safety seat.

FIG. 3A is a view of a key fob illustrating the control for door locks and an infant in car light signal.

Figure 19:
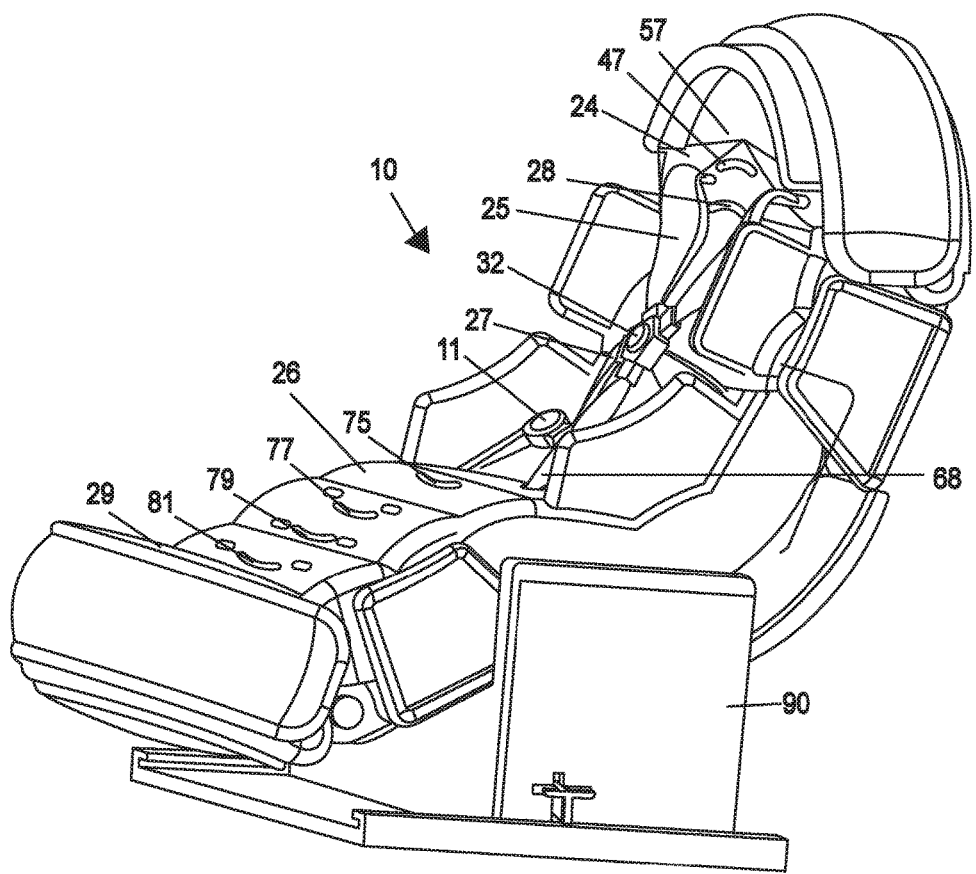

FIG. 19A-X-FIG. 19A-Y show a view of the integrated safety seat configured for an occupant in a forward facing position, and inclinations of the lower extreme of the seat bottom and additional inclination of the head/foot rests support.

FIG. 19B is another view of the integrated safety seat configured for an occupant in a forward facing position with the inclinations of the lower extreme of the seat bottom and additional inclination of the head/foot rest support.

Figure 20:
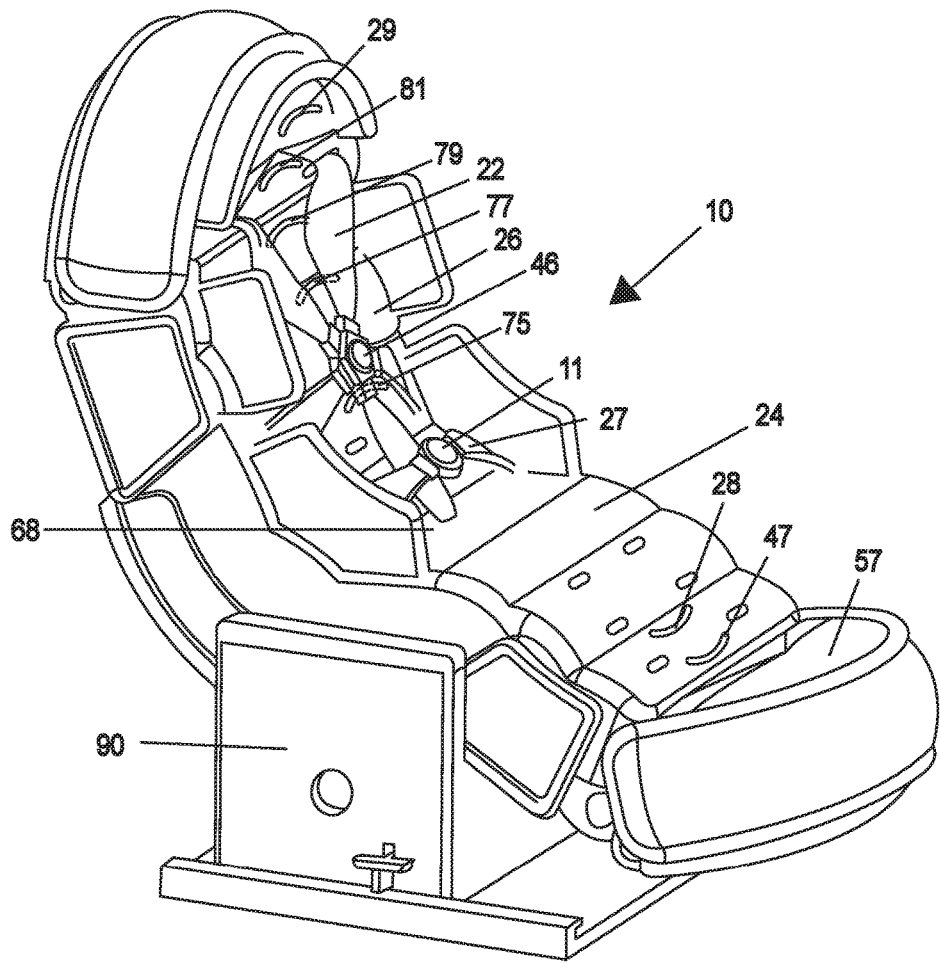

FIG. 20A-X-FIG. 20A-Y, show a view of the integrated safety seat configured for a child from newborn to adulthood placed in a rear facing position, and inclinations of the lower extreme of back, and additional inclinations of the head/foot rest support.

FIG. 20B is another view of the integrated safety seat configured for a child from 2 years old to adulthood placed in a rear facing position, and inclinations of the lower extreme of back, and additional inclinations of head/foot rest support.

Figure 21:
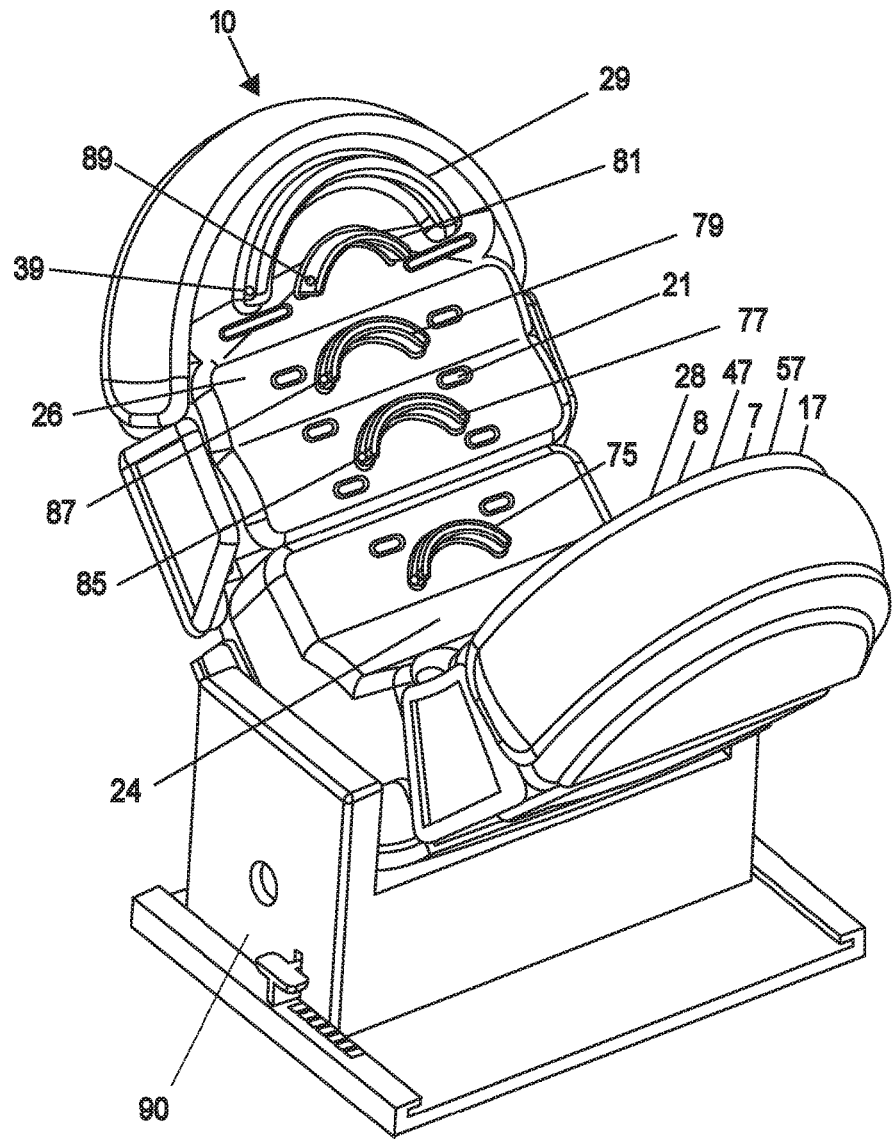

FIG. 21 is a view of head/foot rests, within the integrated safety seat, in the extremes of seat bottom and back that incline to different angles, and head/foot rests along the seat bottom and the back, whereas all head/foot rests may be rounded protruding and cushioned, in the integrated safety seat, and protruding head/foot rests within the surface of the seat bottom and protruding head/foot rest within the surface of the back as well as in the cradle area which may raise and expand configured for each age and size group, a newborn, a baby, a toddler, an older child, and an adult.

FIG. 22A-FIG. 22B-FIG. 22C-FIG. 22D, show a view of armrest or side protection, within the integrated safety seat, on both sides of seat bottom and back including edges of head/foot rests on the extremes as well as external armrests that elevate in the cradle area of integrated safety seat that provide different heights of protection and may elevate manually or electronically, or by other means, and may be inflatable. Different heights of the elevation of armrests are shown in FIG. 22A, FIG. 22B, FIG. 22C, and FIG. 22D.

Figure 23:
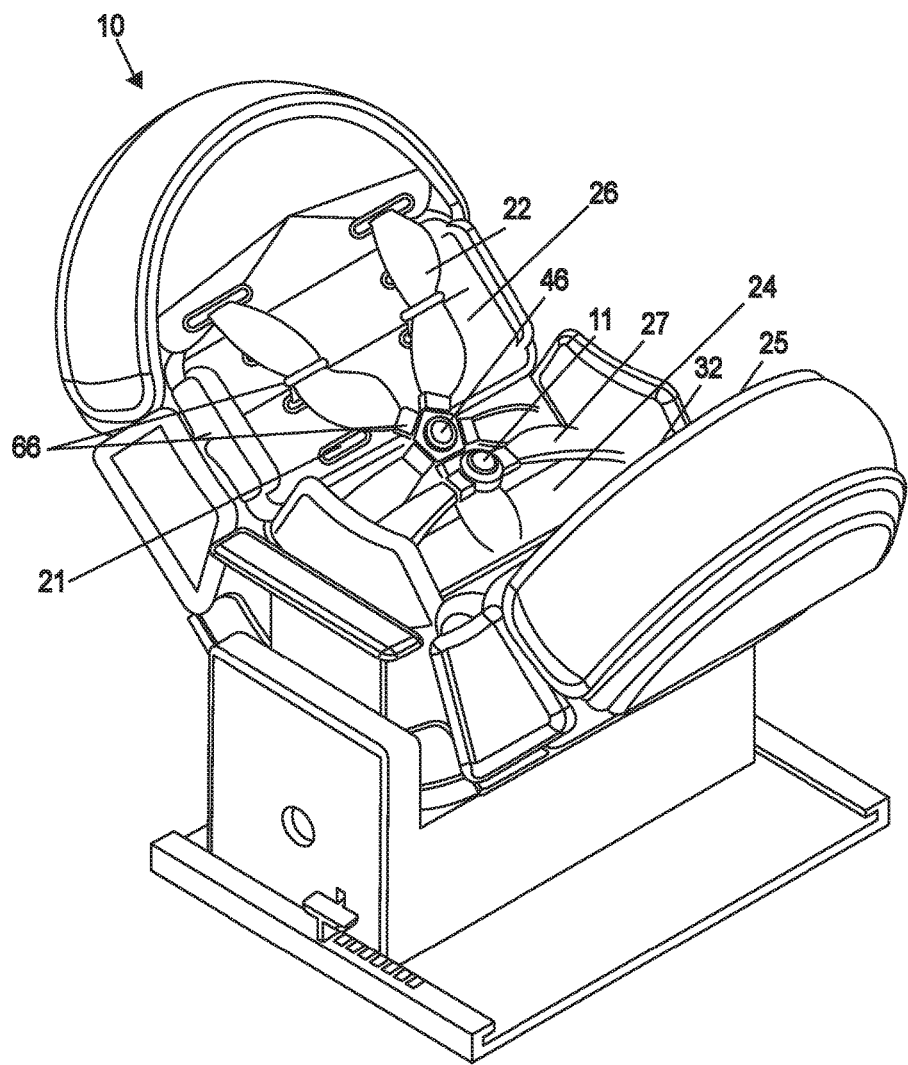
Figure 23:
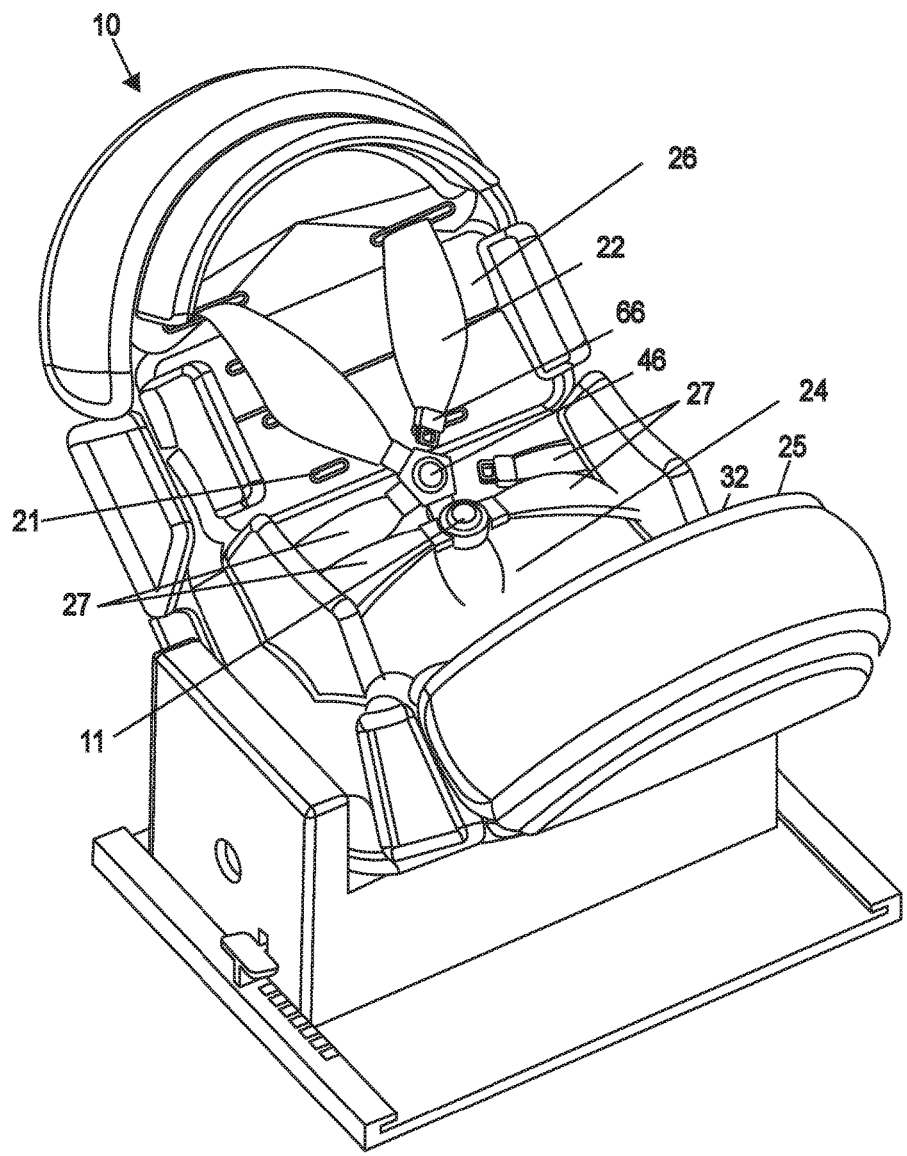

FIG. 23A is a view of at least one or more than one harness with hasp and lap-belt with hasp, within the integrated safety seat, along the seat bottom and at least one or more than one harness with hasp and lap-belt with hasp on the back, as well as in cradle, which may be in different sections of the integrated safety seat and may have a triangular shape and be cushioned, may be pinned to orifices with a connector or pulled from orifices with a connector, there may be at least one or various harnesses with hasps in the rear facing position to secure an occupant, and in the forward facing position to secure an occupant, in the integrated safety seat.

FIG. 23B is another view of at least one or more than one harness with hasp and lap-belt with hasp along the seat bottom and at least one or more than one harness with hasp and lap-belt with hasp on the back, as well as in cradle, which may be in different sections of the integrated safety seat and may have a triangular shape and be cushioned, may be pinned to orifices with a connector or pulled from orifices with a connector, there may be at least one or various harnesses with hasps in the rear facing position to secure an occupant, and in the forward facing position to secure an occupant, in the integrated safety seat.

Figure 24:
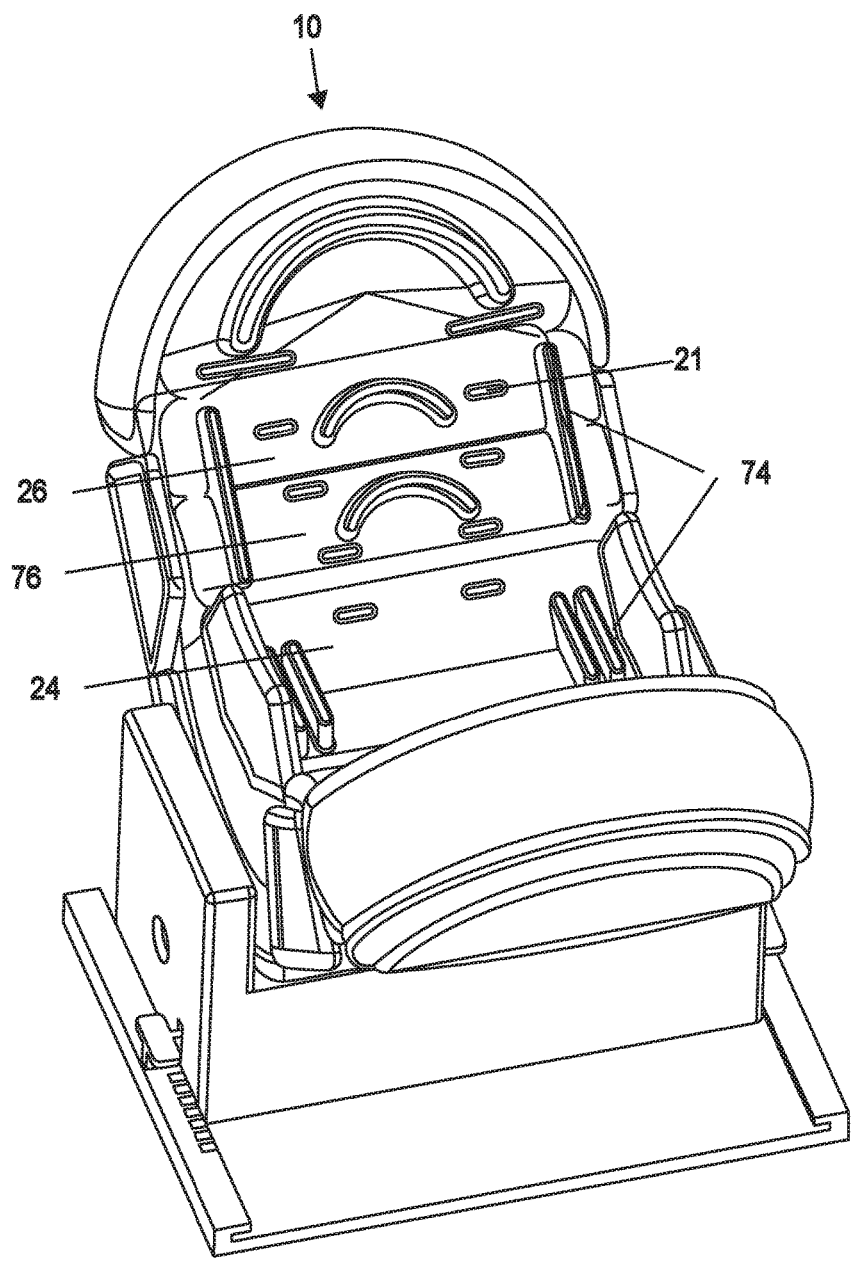
Figure 24:
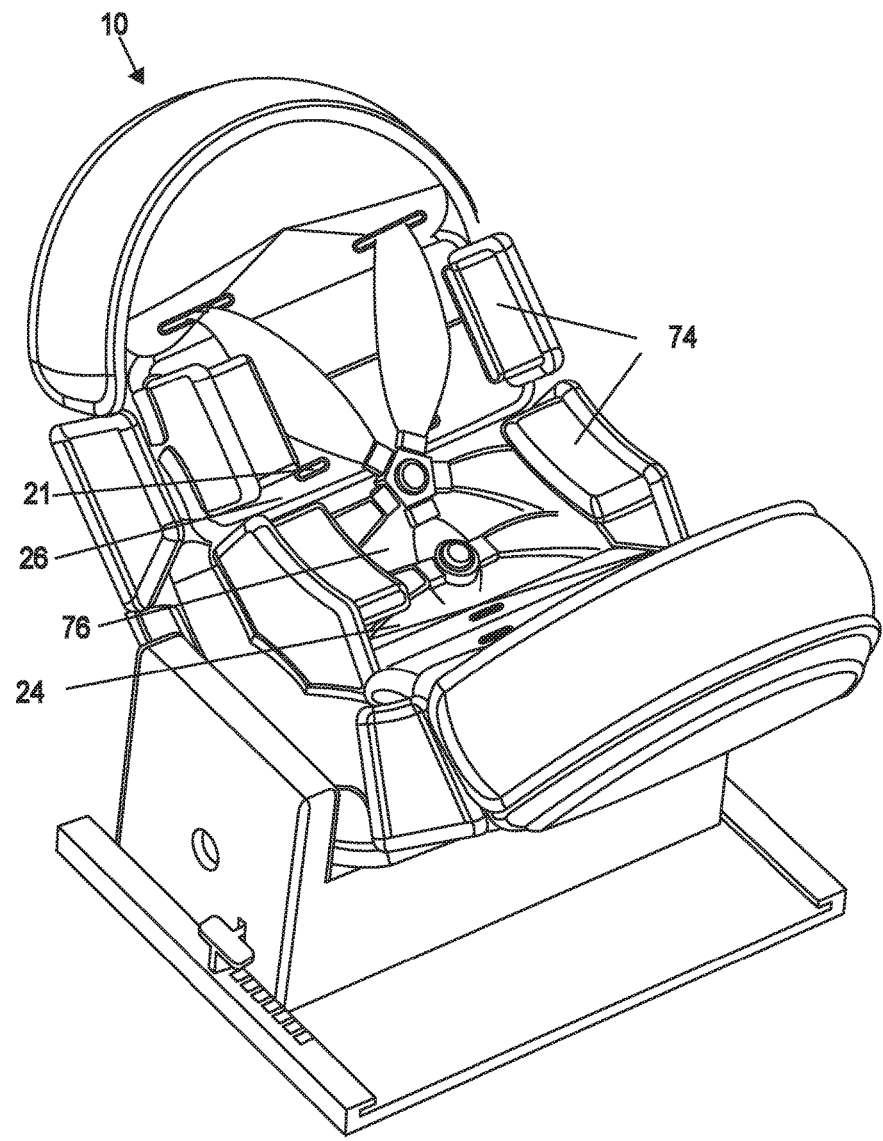

FIG. 24A is a view of inserts, within the integrated safety seat, that reduce the width or are a barrier in the seat bottom and the back as well as in cradle and may elevate and expand from the surface or the internal sides of the integrated safety seat, manually or electronically or by other means.

FIG. 24B is another view of inserts that reduce the width or are a barrier in the seat bottom and the back as well as in cradle and may elevate and expand from the surface or the internal sides of the integrated safety seat, manually or electronically or by other means.

Figure 25:
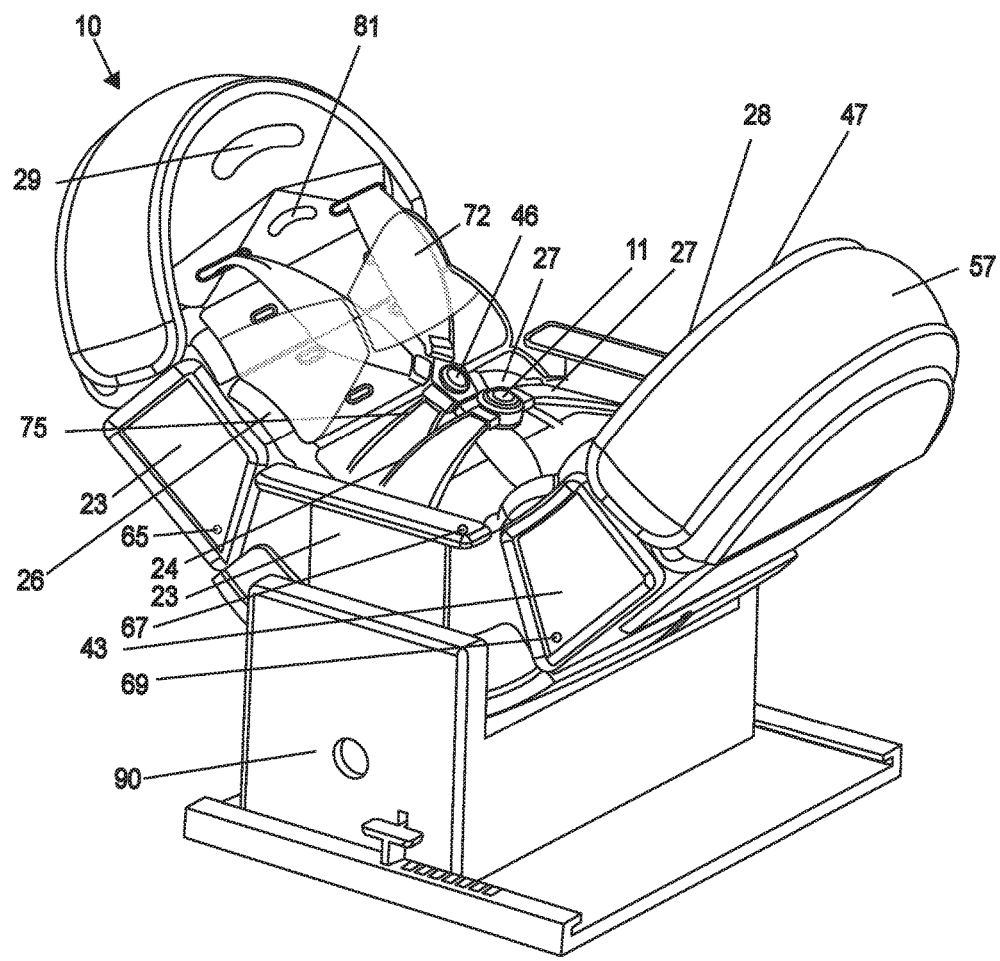

FIG. 25 is a view of integrated vests, within the integrated safety seat, in the seat bottom and back, as additional protection.

FIG. 26A illustrates models and sizes included in the integrated safety seat for occupants from infancy to adulthood for regular and autonomous vehicles.

FIG. 26B illustrates different models and sizes included in integrated safety seat to accommodate occupants from infancy to adulthood in which some sections are expanded and reduced or eliminated, making the seat bottom or back shorter or longer.

FIG. 27.1 to FIG. 27.13 are views of the means of internal mechanisms included in the integrated safety seat, presenting three embodiments that provide inclinations of the seat bottom and back including the cradle, as well as elevations, not limiting other embodiments that may provide the same inclinations and elevations, as well as parts and components of embodiments that may vary to provide the same multiple inclinations and elevations.

Figure 28:
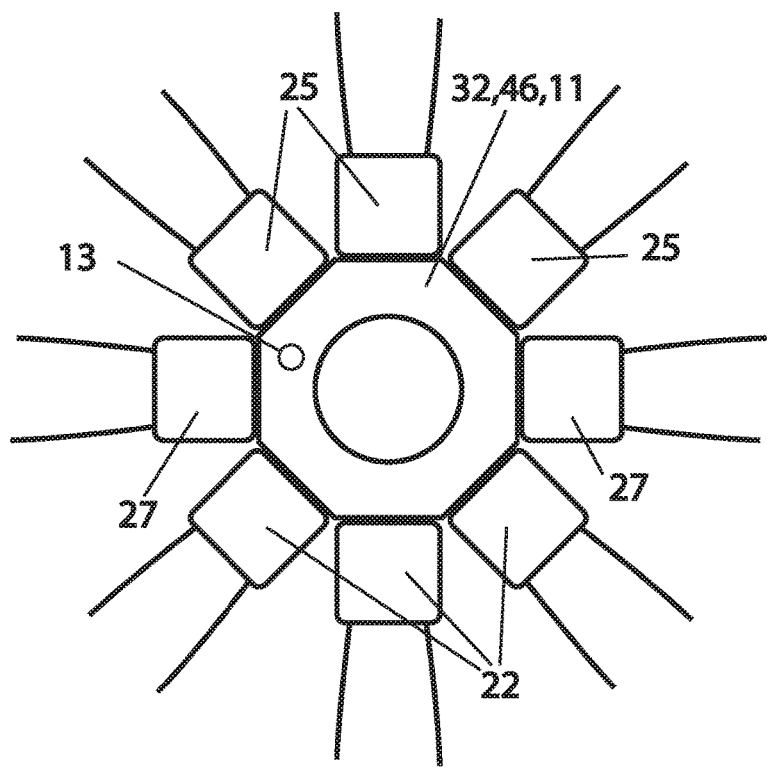

FIG. 28 is a view of the hasp with multiple openings for harnesses.

V. DETAILED DESCRIPTION OF THE PREFERRED EMBODIMENT

The subject device and method of use is sometimes referred to as the device, the invention, the art, the seat, the safety seat, the integrated infant safety seat, the integrated child safety seat, the integrated safety seat, the safety seat, the integrated seat, the integrated infant safety car seat, or other similar terms. These terms may be used interchangeably as context requires and from use the intent becomes apparent. The masculine can sometimes refer to the feminine and neutral and vice versa. The plural may include the singular and singular the plural as appropriate from a fair and reasonable interpretation in the situation.

Referring now to the drawings, where the present invention is generally referred to with numeral 10, it can be observed that it includes, among claimed and contextual elements, a rear back bench 12, a rear seat bench 14, a seatbelt 16, a seatbelt 18, a door of vehicle 20, a seat bottom 26, a back 24, a cradle 68, a rear bench seat contour 36, a harness 22, a hasp 46, a harness 25, a hasp 32, a connector of harnesses to hasps 66, a sensor 13, an armrest 23, a button 65, an armrest 43, a button 69, a cradle armrest 23, a cradle armrest button 67, a head/foot rest support 29, a head/foot support 57, a head/foot rest 75, a head/foot rest 77, a head/foot rest 79, a head/foot rest 81, a head/foot rest 28, a head/foot rest 47, a button 39, a button 83, a button 85, a button 87, a button 89, a button 8, a button 7, a button 17, a button 37, a button 31, a button 41, a headrest of a regular seat 38, a lap-belt(s) 27, a hasp(s) of lap-belt(s) 11, a vest(s) 72, an orifice 21, a hinge 33, an insert 74, a padding 76, a canopy 9, a windshield 60, a rear view mirror of vehicle 48, a scale 30, a camera 35, a camera 42, a camera 44, a camera 62, a screen 52, a radio of vehicle 54, a rear view infant mirror 50, a display 49, an infant in seat button 51, a buckled button 53, an infant in car button 55, an unbuckle button 59, a wheel of vehicle 56, a speaker of vehicle 58, a key fob 61, a loudspeaker intercom 63, a base or cradle or rotary support with the internal mechanism 90, a seat assembly 99, bearings 91, guide rail 92, drive gear wheel 93, drive motor 94, spring 95, plunger 96, lever 97, seat assembly of section 98, seat section 100, rotary axis 101, gear motor/servo 104, gear drive 107, splined hollow shaft 105, rack 109, slide release 103, spring 106, spline teeth 108, a seat assembly 110, concave or curved seat section 112, base plate 111, toothed track 113, pocket 114, retractable armrest 115, gear motor 116, gear 117, track 118, center seat 120, a seat assembly 121, a main axis 122, side bearings 123, toothed spring 124, spline teeth long gear 125, steel pins 126, clutch 127, motor 128, pneumatic bladders 102.

There are 2 positions configured to sit an occupant in the integrated safety seat 10: Position Infant 1: Configured for a child seated with his head in the seat bottom 26, or his head laying in head/foot rest 75, or head/foot rest 77, or head/foot rest 79, or head/foot rest 81, or head/foot rest support 29, or facing the opposite direction configured for the driver or backwards, configured for when he is a small infant from a newborn to two years old or below the mandatory weight established by the AAP—American Association of Pediatrics—in the U.S. and 4 years old in Europe, and also for a toddler, or a child 8 years old or above, and even an adult. This position also includes the cradle placement for newborns.

Position Infant 1: Configured for the head of an infant on head/foot rest 75 or 77 or 79 or 81 or 29, or in seat bottom 26.

Position Infant 2: Configured for a child seated with his head on back 24, or head/rests 28, or 47 or head/foot rest support 57, facing the same direction configured for the driver or frontwards, configured for when he is a bigger child from 2 years old or above the mandatory weight established by the AAP in the U.S., and 4 years old in Europe, and also for a toddler, or a child 8 years old or above, and even an adult.

Position Infant 2: Configured for head of child from 2 years or 4 years old and above or above the mandatory weight established by the AAP, or an older child, and even an adult, on head/foot rest 28 or 47 or 57, or in back 24.

Figure 1:
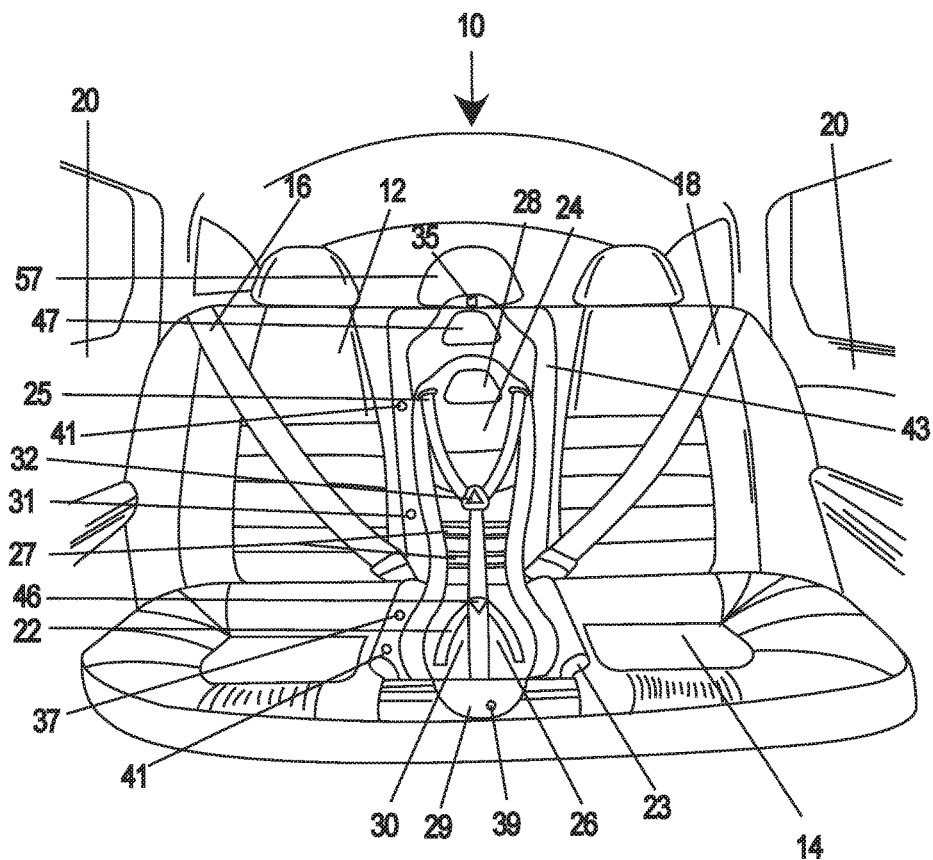
FIG. 1A is a view of the integrated safety seat forward facing position or placement, united with another seat or other seat(s) in a bench seat configuration.
FIG. 1B is a view of the integrated safety seat forward facing position or placement, separated from another seat or other seat(s) in a bucket seat configuration.
Figure 1B:
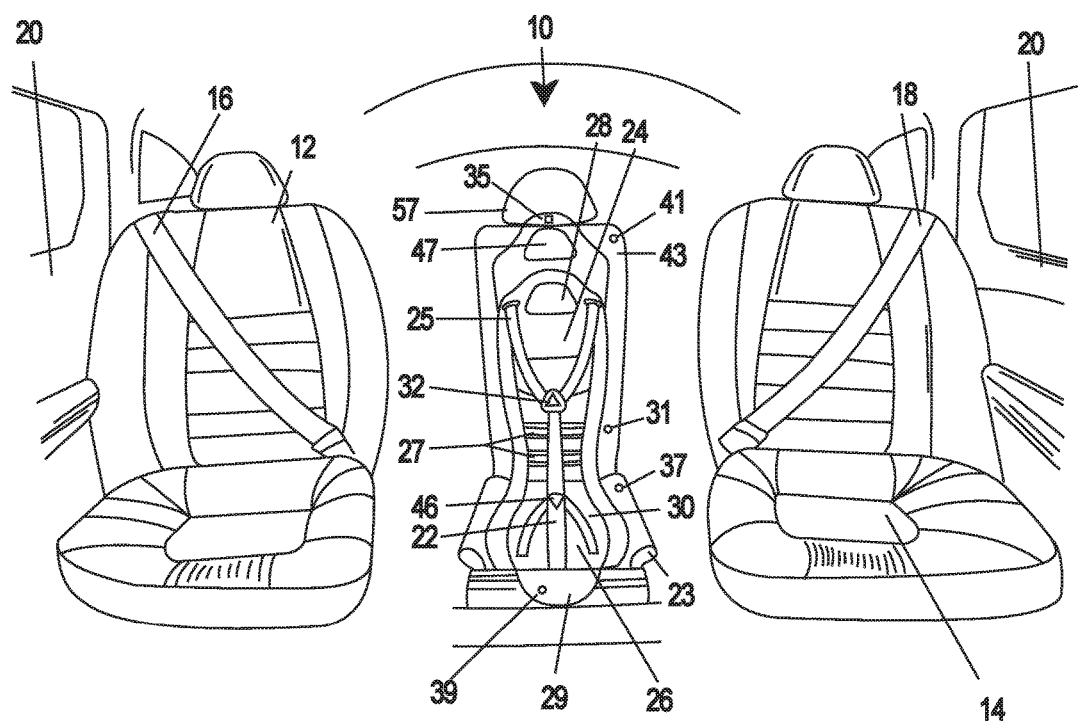
Figure 5:
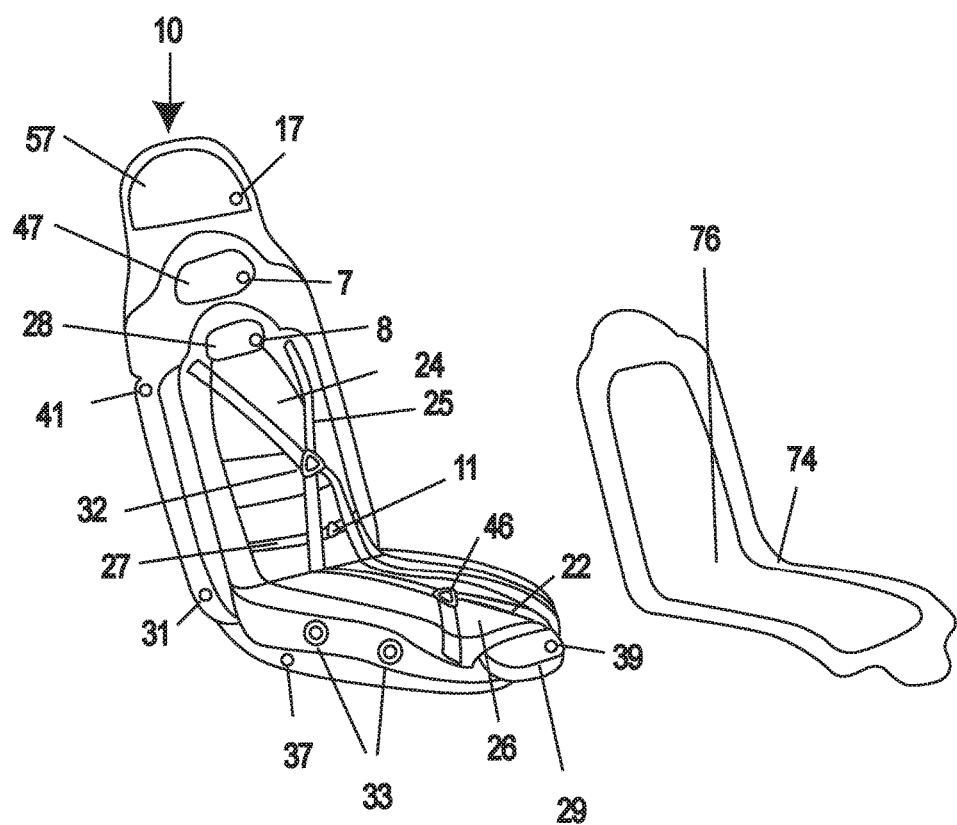
FIG. 5 is a perspective view of the integrated safety seat.

FIG. 1A and FIG. 1B: show how the integrated safety seat may be configured to be permanently built into the structure in the back area of a passenger vehicle 10 when it is united to other seats or another seat—FIG. 1A—or separated from other seat or another seat—FIG. 1B. As in many vehicles the rear bench seat includes a rear back 12 and a rear seat 14 that spans the width of the vehicle. A bench seat contour 36. A door 20 of vehicle is shown for context. The integrated safety seat 10 is positioned on a middle third of the back 12 and seat 14 bounded by the left third and right third of the bench seat or united with other seats, FIG. 1A, or separated from other seat(s) as a separated unit or bucket seat between other seat(s), FIG. 1B, There is a placement configured for newborns until 6 months, FIG. 7, and progressively as the child grows, the integrated safety seat is configured to adapt to his size by inserts and padding that are part of the upholstery. FIG. 5. The integrated safety seat may also be adapted to be positioned in the center, left or right, united or separated from other seats. There could be more than one integrated safety seat 10.

The left third and right third of the rear bench seat are engineered and configured for an adult to comfortably sit, or as expressed above, or for other of these integrated safety seats 10, and can be united or separated from other integrated safety seats. There may be integrated safety seats 10 in other back seat rows of the vehicle.

A seatbelt 16 of a regular seat is shown for the right third of a regular seat. A seatbelt 18 of a regular seat is shown for the left third of a regular seat, configured to the driver's side, rear seat position.

An important aspect of the invention is the safety seat 10 integrated into the upholstery, surface and structure of the rear back 12 and rear seat 14 configured between the left and right third adult or other seats—FIG. 1A. It can also be permanently built into the structure and integrated in the back seat area of a vehicle, separated from other seats—FIG. 1B. The seat bottom 26 of the integrated child seat is structured below the surrounding rear bench contour 36, or the integrated safety seat is separated as an independent unit. Equally, there may be one, two, three or more integrated child safety seats 10 in the rear of vehicle configured so that multiple children can be simultaneously transported or configured to the preference of the vehicle's owner, as to have integrated safety seats 10 in any of the right, center or left positions, as well as in other back rows of the vehicle.

Position 1 or rear facing position or placement, is configured to place an occupant that grows from being a newborn to a toddler, to an 8 year old or above and even an adult, sitting rear facing to a front seat driver of the vehicle, resting his upper body on seat bottom 26, on head-rests 75, 77, 79, 81, and 29, or on the cradle section of seat bottom 26 when he is a newborn.

Position or Placement 2 is configured to place an occupant when he becomes an older child of 2 years and above, a toddler, an 8 year old and above and even an adult, sitting forward facing to a front seat driver of a vehicle and resting his upper body onto the back 24. In Position Infant 2 or forward facing position it is configured that the occupants head can rest between the headrests 28 or 47 or 57, for older children, and even for adults. It is configured that the headrests may be leaned upon during rest or sleep to more comfortably support the child's head. It is configured that when becoming a child 8 years old and above and even an adult—FIG. 2, the same integrated safety seat 10 is configured to adapt to his age and size in Position Infant 2, and it is configured so that the occupant in Position 1 or rear facing and Position 2 or forward facing is secured with restraint systems such as harnesses with hasps and lap-belts with hasps, with adaptable head/foot rests, as well as inserts and padding, and armrests or side protection.

All the features of the integrated safety seat, particularly the internal head/foot rests, inserts and armrests are configured to elevate or raise and expand to adapt to the child's size and needs.

The areas that provided additional protections configured to fit a small infant are now configured to expand to fit a growing child and even an adult in all the stages of his development. The integrated safety seat is configured for an occupant of any age and size on both positions, rear facing and forward facing.

Different levels of inclination in the center of the seat bottom and back that transition between the upward and inclined positions, including the cradle position if there is a cradle section that is part of the seat bottom and the back, the inclinations of the seat bottom and the back, and the additional inclinations of the sections of the seat, as well as the head/foot rests at the extremes, are configured to give and array of multiple angles to enable comfort to the occupant in each one of the positions, rear facing and forward facing.

Figure 2:
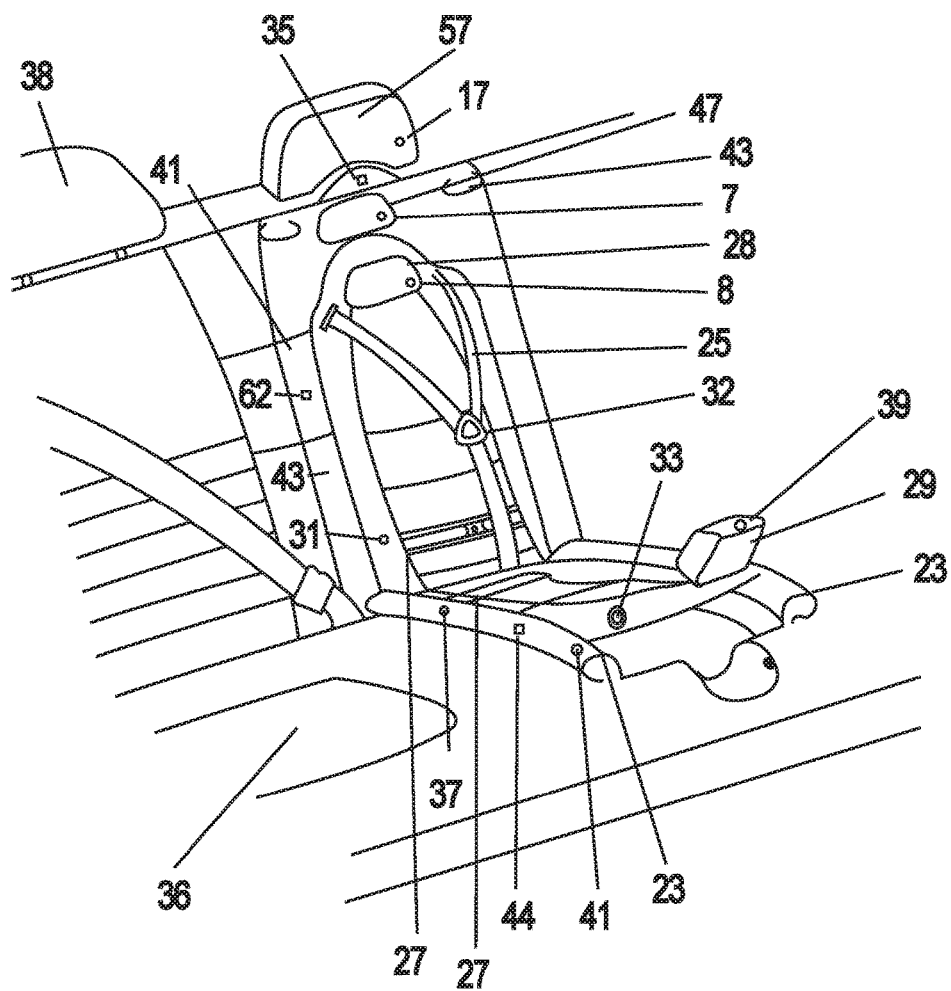
FIG. 2 is a perspective view of the integrated safety seat.

The positions for the seat bottom 26 are controlled by buttons 37 in the lower section closer to the cradle 68, and 41 for the positions of the extreme. The positions in the back 24 are controlled by buttons 31 in the lower section closer to the cradle 68 and button 41 for the extreme. FIG. 2. The seat bottom together with the back move from the center and elevate to upward and inclined positions. The buttons 31 and 37 control the inclinations and elevations of the center of the seat, and sections close to the center. The buttons 41 control the inclinations of the extremes of the seat.

Figure 16:
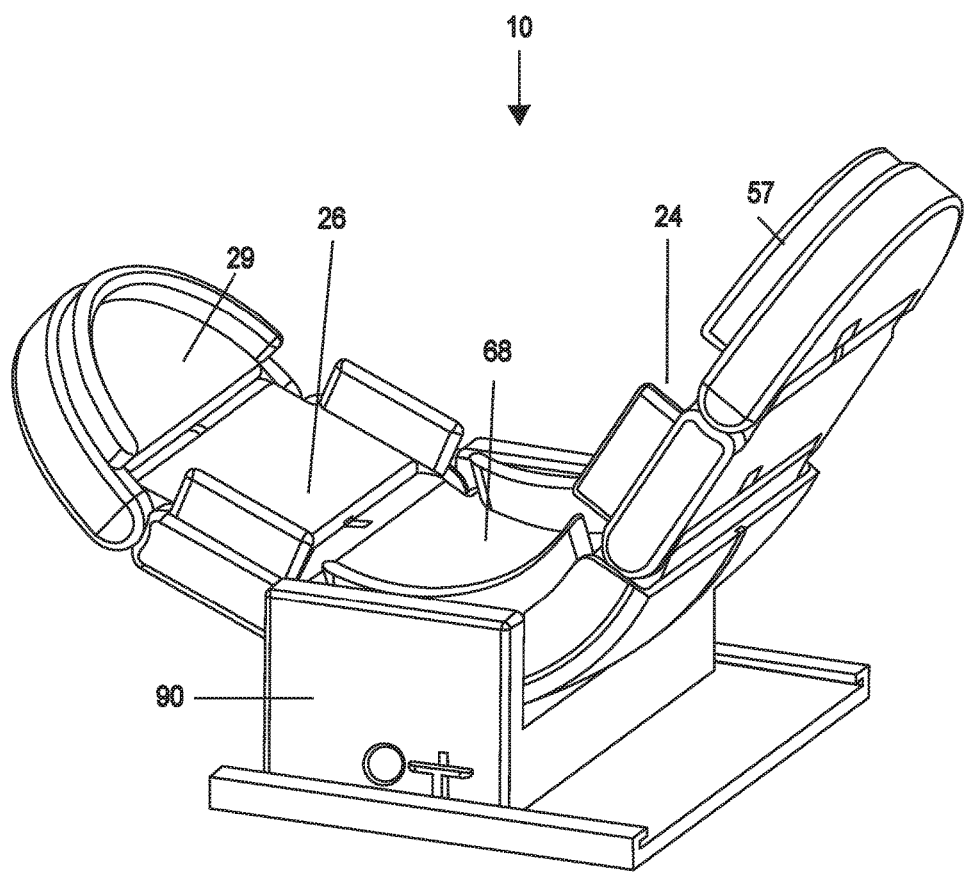
FIG. 16A is a view of the integrated safety seat configured for a child from 2 to 4 years old placed in a forward facing position.
FIG. 16B is another view of the integrated safety seat configured for a child from 2 to 4 years old placed in a forward facing position.
Figure 16:
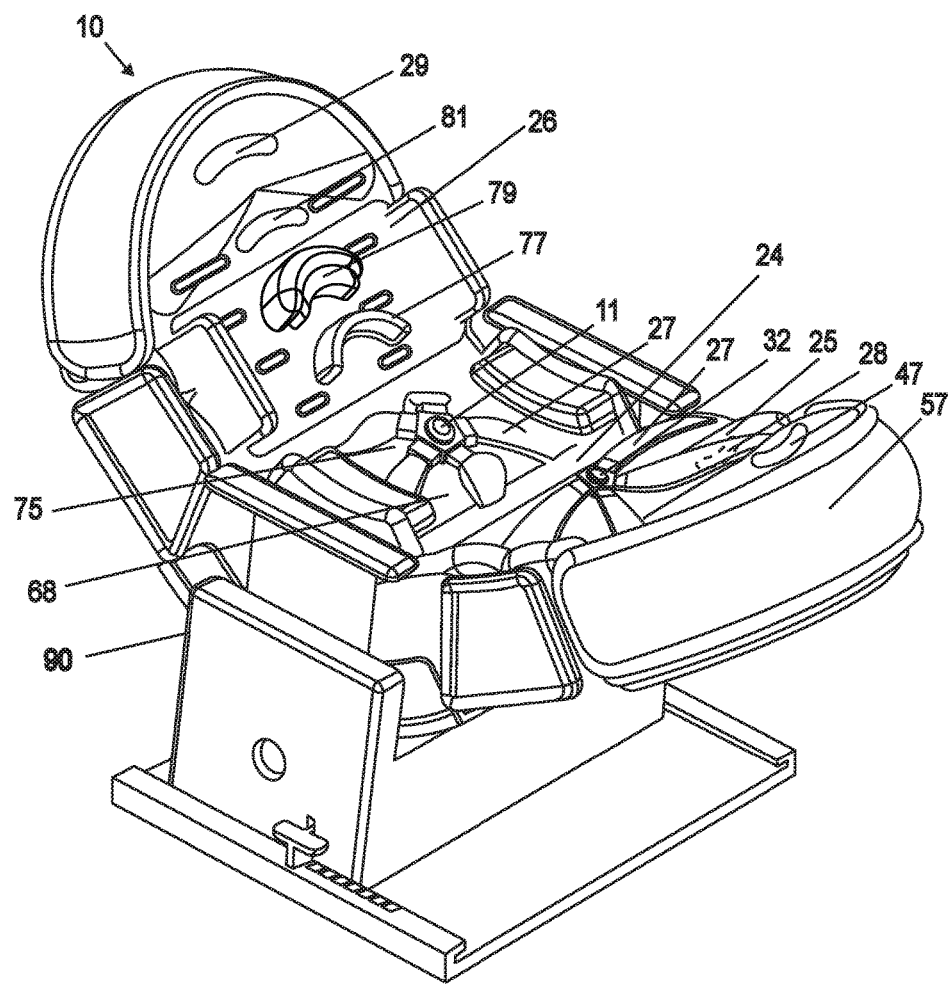

The seat bottom may be shorter in length than the back to serve occupants of different ages and sizes. FIG. 26B. The head/foot rests at the extremes 29 and 57 may incline independently or not to multiple angles and are a support of the integrated safety seat. They are controlled by buttons 39 for head/foot rest 29 and 17 for head/foot rest 57. The additional head/foot rests along the seat bottom and along the back of the integrated seat may raise and expand manually or electronically from the surface of the upholstery. FIG. 16B.

In the seat bottom 26 there are internal headrest and footrests are named 75, 77, 79, 81 controlled by buttons 83, 85, 87, 89, being 75 the head/rest configured for a newborn in the cradle area.

Figure 18:
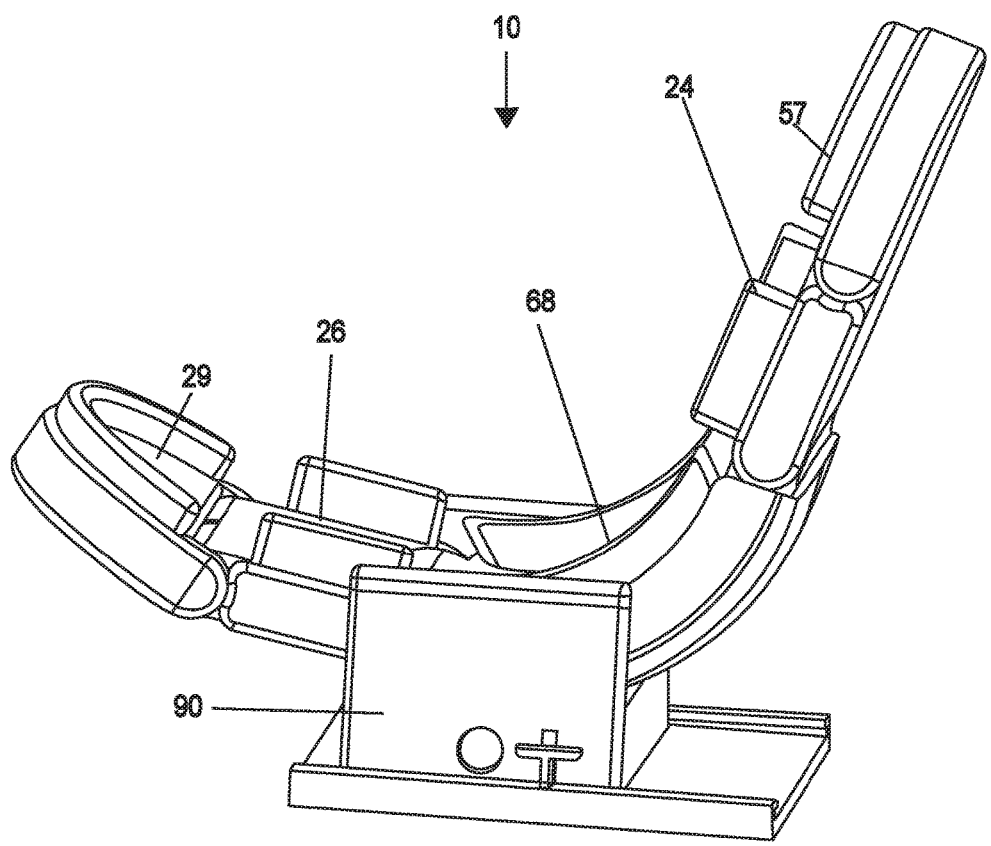
FIG. 18A is a view a view of the integrated safety seat configured for a child from 6 to 8 years old placed in a forward facing position.
FIG. 18B is another view of the integrated safety seat configured for a child from 6 to 8 years old placed in a forward facing position.
Figure 18:
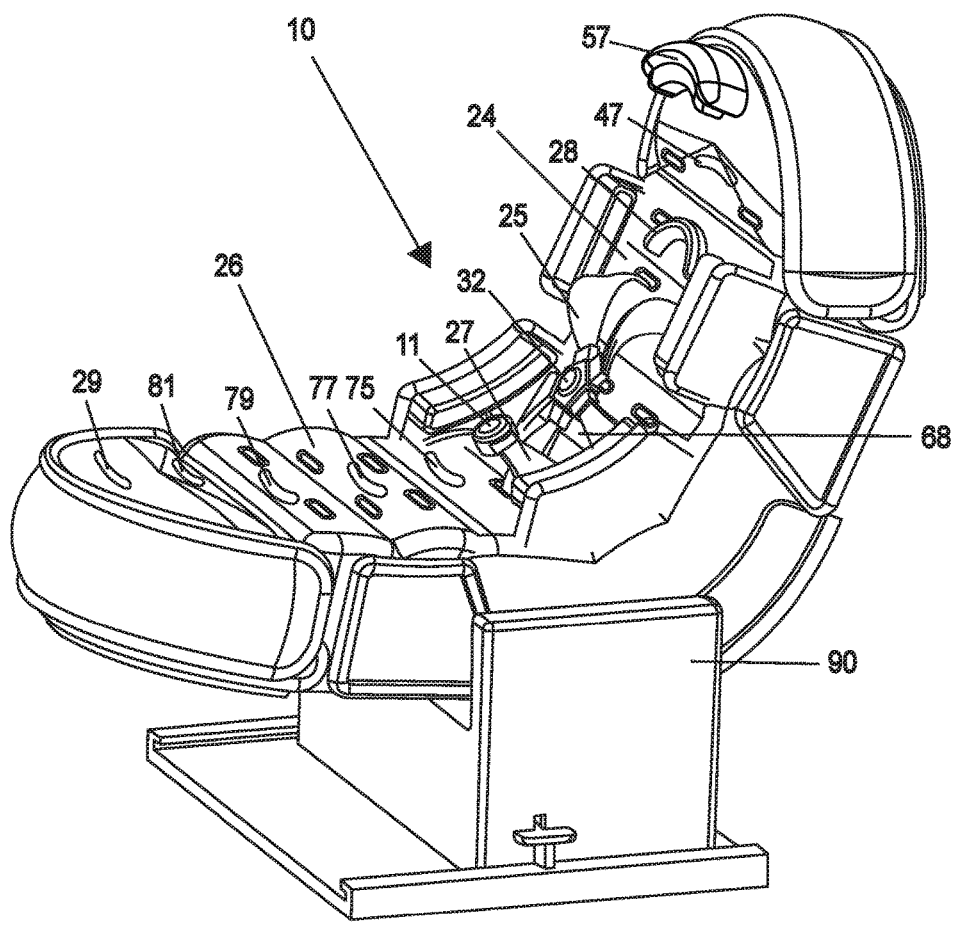

In the back 24 the internal headrest and footrests are named 28, 47, controlled by buttons 8, 7, being 8 the headrest configured for a child 2 to 4 years old. The headrests and footrests may be rounded, cushioned, with a protruding edge, and may raise and expand manually, electronically or by other means. FIG. 18B.

The protruding head/foot rests along the surface of the seat bottom and the protruding head/foot rest along the surface of the back are configured for each age and size group, a newborn, a baby, a toddler, an older child, and an adult.

The armrests 23 and 43 or side protections on both sides of seat bottom and back, provide protection against side impacts, and may elevate. The armrests may also be at the edges of head/foot rests supports 29 and 57 at the extremes of seat bottom and back. The armrests 23 may also be in the outer side of the cradle.

The armrests or side protections may elevate to different levels of 5, 10 or 15 inches approximately, manually, electronically, or by other means.
FIG. 22A, FIG. 22B, FIG. 22C, FIG. 22D.

In the seat bottom 26 the armrests 23 may elevate with button 65. In the back 24 the armrest 43 may elevate with button 69, in the outer side of the cradle the armrests 23 may elevate with button 67, manually or electronically or by other means.

There are harnesses with hasps and lap-belts with hasps all along the seat-bottom 26 and along the back 24, including cradle, in different sections. There are harness 22 with hasp(s) 46 in seat bottom, and harness (25 with hasp(s) 32 in back. The lap-belt(s) 27 with hasps 11 may also be in different sections, such as the cradle that is between and is part of the seat bottom and back, seat bottom 26 and back 24 and subsequent sections of seat bottom and back.

Harnesses and lap-belts may have a triangular shape, be cushioned and wide. The harnesses and hasps are extracted from, pulled from, or pinned, to different pairs of orifices 21 in the sections of the seat bottom 26 and back 24 with mechanisms such as retractable when they are pulled out by connector 66, or pinned when they are adjusted into the orifices by connector 66, such that the harnesses may be stored within an interior of the integrated seat. FIG. 21.

Other mechanisms can also adjust the harnesses and lap-belts. The orifices that are not in use may be covered by padding. There can be uniting buttons between each pair of harness configured to better secure them over the chest of the occupant of the integrated seat. The hasps may include openings for harnesses and lap-belts together, with at least five openings, in a diamond shaped hasp, with light, and may be electronic. FIG. 28.

There may also be harnesses in the shape of a vest. FIG. 25. Inserts and Padding protectors in the integrated safety seat are configured as part of the design. Inserts 74 are configured to make the integrated safety seat 10 more narrow or as barriers in at least 3 or 4 different sizes. There are at least 2 pairs of inserts 74 configured to be in the newborn section on the sides of the infant, and at least one insert 74 on the consecutive sections of seat-bottom 26 and back 24. The inserts may raise and expand from the surface of the upholstery or from the sides in the area of the armrests 23, and the inserts 74 may be raised by any technology. FIG. 24A, FIG. 24B.

The padding 76 protect the surface of the seat and may cover harnesses with hasps and lap-belts with hasps that are not in use. Inserts 74, padding 76 shown in FIG. 7.

In Position 1, an occupant may range in age from a newborn to an adult. The Position 1 of the integrated seat is configured to face opposite the driver. The reclined head/foot rest support 29 will move upward with an automatic button 39, as well as the seat bottom of the integrated seat 10 that moves with other button 37 placed on the seat bottom 26 to raise upward to other higher positions. The extreme of the seat bottom 26 and back 24 may also move to provide additional inclinations with button 41. The button 31 of back 24 may incline the first section consecutive to the cradle downward configured to place the extremities of the occupant. FIG. 20A-Y.

The extremes of seat bottom 26 and back 24 of the integrated safety seat also have additional inclinations with buttons 41 with hinges 33 which may be visible or invisible or any other inclination mechanism as may be appreciated by one reasonably skilled in the art.

There is side protection by armrests 23 and 43 that elevate controlled by buttons 65 and 69, and the outer armrests 23 controlled by button 67, configured on both sides of the child all along and within the integrated safety seat, tall enough to provide a barrier or separation wall to ensure side protection. The height of these armrests or separation side walls of the integrated safety seat design may vary, from 5 inches, 10, 15 and up. The side protection may also be at the edges of the extreme head/foot rests supports 29 and 57. The armrests 23 or side protection may be raised by any technology.
FIG. 9, FIG. 12B, FIG. 13B, FIG. 22A, FIG. 22B, FIG. 22C, FIG. 22D.

There are three or five point harness restraint systems: 22 with hasp 46 on seat bottom 26, and 25 with hasp 32 on back 24, as well as lap-belt(s) 27 with hasp(s) 11 along the integrated safety seat. Some three or five point harnesses begin on both extremes of the seat, and some lap-belts begin on the sides. FIG. 1A, FIG. 1B, FIG. 24A, FIG. 24B. The hasps 46 and 32 of these harnesses systems 22 and 25, may have cameras 44 and 62 connected to each of their hasps facing the configured occupant according to the position. FIG. 2. The pairs of harnesses part from orifices 21 in the extremes or other sections of each position.

Position Infant 1: harness 22, hasp 46, Position Infant 2: harness 25, hasp 32.

When using the orifices 21 according to the position of the occupant, the alternative one(s) will be covered with the insert 74 or protector, and the harnesses 22, 25, and lap-belts 27 may be retractable or pulled out from the surface of the seat bottom and the back.

The lap-belts 27 part from the sides in each position, with hasps 11 on each lap-belt 27, The harnesses 22, 25 and lap-belts 27 may be cushioned and wide. FIG. 23A, FIG. 23B.

The Position Infant 1 configured to be opposite to the driver is designed in the integrated safety seat 10 to abide by the law to protect the infants' central nervous system, skull and spine, from newborns to two years old or below the mandatory weight, and older children, in the event of a car collision or accident. Children from 2 years to 4 years old that are placed in a vehicle must abide by the law in the U.S and Europe respectively, and a child 8 years old and above including an adult may also sit in the rear facing position of the integrated safety seat 10 to benefit from more protection.

Figure 6:
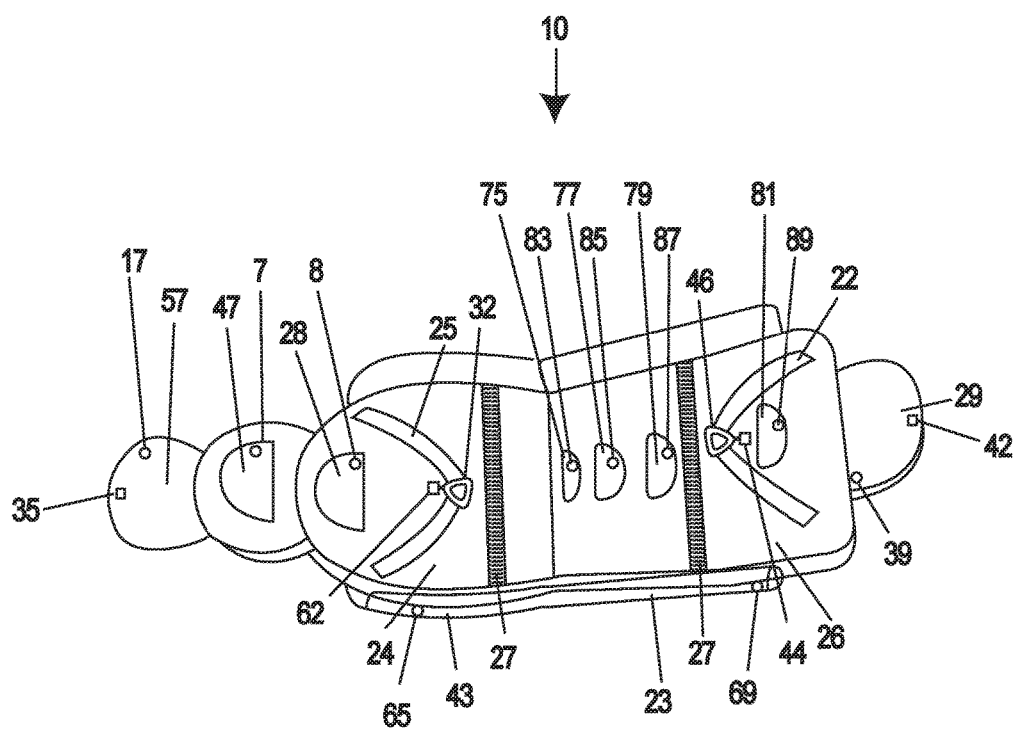
FIG. 6 is a top view of the integrated safety seat with an elevated seat inclination.

Safety harness 22 with hasp 46, position 1, in the seat bottom 26 and safety harness 25 with hasp 32, Position 2, in the back and lap-belts 27 with hasps 11 on both Positions, permanently integrated and internally connected to the seat bottom and to the back, are configured to secure the occupant in the integrated safety when he is seated on either Position or placement. FIG. 6. The integrated safety seat 10 provides the feature of inclination of the seat bottom 26 and the back 24. The seat 26 is configured to the area for the lower body of a person when sitting in a regular car seat also called bench 26, and 24 is configured for a back of a person sitting in a regular car seat also called back 24. FIG. 1A.

In an Integrated Safety Seat 10, seat bottom 26 and back 24 as well as the cradle serve as upper body placement and lower body placement alternatively according to the position of the infant—Position or placement 1 or Position or placement 2, for the occupant which may range in age from infancy to adulthood, in each of the positions, rear facing, and forward facing, in a seat that is united or separated with another or other seats. FIG. 1A, FIG. 1B.

The seat bottom 26 with the back 24 may move or slide from the center or cradle 68 if there is one, and incline upward and downward to a plurality of angles, on both positions, rear and forward.

The seat bottom 26 with the back 24, may not move from the center or cradle 68, and rotate upward and downward to a plurality of angles on both positions, rear and forward.

The seat bottom 26 with the back 24, may stay stationary in the base or cradle 68, and move upward and downward to a plurality of angles on both positions, rear and forward. These means of inclination and elevation are given by the embodiments in FIGS. 27.1 to 27.13 or by other mechanisms and technologies.

These means of inclination are controlled by buttons 31, 37 and 41 in the integrated safety seat or by other similar mechanisms, buttons or controls that provide pluralities of inclinations and elevations.

Button 37 will be located in the armrest of seat bottom 26 and will control the inclination or transition between the upward and inclined positions of seat bottom 26, and button 31 will be located on the armrest of back 24 and will control the inclination or transition between the upward and the inclined positions of back 24. For the inclinations of the extreme of seat bottom 26 and back 24, button 41 will be located in one or both sides of the extreme or upper armrests of seat bottom 26 and of back 24, and will control the inclination of the upper part of seat bottom 26 and upper part of back 24. FIG. 2.

The button 41 at the extreme of seat bottom 26 will give additional degrees of inclination on the extremes of the seat bottom 26 configured to provide more angles for either the small child's upper body, when sitting in Position 1, or for the lower extremities of a grown child, when sitting in Position 2.

The button 41 on the extreme part of back 24 will give additional degrees of inclination configured for a grown child upper body when sitting in position 2 or a small child's lower extremities when sitting in Position 1.

The buttons 37, 31 and 41 may vary and there may be different types of controls for all the inclinations of the seat, and may be placed in different sections, or elsewhere in the integrated safety seat. All these control buttons 37, 31, 41, or others, are configured to control the recline of the integrated safety seat, electronically or any other technological way. In the example in FIG. 1 the button 37 is on the armrest 23 of the seat bottom 26 seat but it could be located in any place configured for the convenience of the driver or caregiver. The buttons 31, 41, and 37 may be a rocker switch, similar to the type used in many powered windows, or may have a different technology related to different mechanisms of inclination that would provide the same type of inclinations in the integrated safety seat. All these buttons will have internal mechanisms of inclination and/or hinges, such as hinge 33 visible or not, or other internal element(s) to move these mechanisms of inclination, by any existent technology, such as in reclining chairs or mattresses available in the market. There will be internal mechanisms and/or internal hinges or mechanisms that will correspond to all the inclination control buttons, and will move accordingly to the buttons pressed or manipulated with any technology, manual, electronic, digital, remote control, or other. The internal mechanism of inclinations and elevations that responds to the buttons 37, 31 and 41 plus the independent buttons 83, 85, 87, 89, 39 for head/foot rests 75, 77, 79, 81, 29 in seat bottom 26, and buttons 8, 7, 17 for head/foot rests 28, 47, 57 in back 24, including the cradle, will provide a plurality of angles of inclination, as well as the elevation of armrests to different heights with buttons 65, 67 and 69 for armrests 23, outer armrest 23, and 43, will provide many elevations, in all these parts of the integrated safety seat 10, or in other areas of the integrated safety seat 10, configured to give adaptability and comfort for all the needs of the occupant, in Position 1 or rear facing and Position 2 or forward facing, as the occupant grows from newborn to 2, to 4, to 8 years old and above, and even an adult. FIG. 6.

To control the inclination of the head/foot rests in seat bottom 26 which are head/foot rest support 29, head/foot rest 75, head/foot rest 77, head/foot rest 79, head/foot rest 81 which are configured to accommodate a growing head or feet of the occupant, from infancy to adulthood according to the Positions 1 or 2 of placement, the head/foot rest support 29 will have button 39, the head/foot rest 75 will have button 83, the head/foot rest 77 will have the button 85, the head/foot rest 79 will have button 87, the head/foot rest 81 will have button 89. All these buttons will control the inclination of the head/foot rests in seat bottom 26. These head/foot rest 29, 75, 77, 79 and 81 will move in different angles with hinges 33 or other mechanism when using buttons 39, 83, 85, 87, 89. The head/foot rest support 29 at the extreme of the seat bottom will have an additional inclination of 90 degrees angle downwards for when it is not in use. FIG. 6.

The inclination of the head/foot rests in back 24 which are head/foot rests 28, 47 and head/foot rest support 57, configured for when a child 2, 4, 6, 8 years old and above and even an adult lays his head in Position 2, in back 24 which serves different accommodations for the growing head or feet of the occupant, according to the Position 1 or Position 2 of placement, button 8 will control the inclination for head/foot rest 28, button 7 will control the inclination of head/foot rest 47, button 17 will control the inclination of head/foot rest support 57. All these buttons will control the inclination of the head/foot rests in back 24, including cradle. FIG. 6.

These head/foot rests 28, 47 and 57 may move in different angles with hinges 33 or other mechanism when using buttons 8, 7 and 17. The head/foot rest 57 support at the extreme of back 24 will have an additional inclination of 90 degrees when it is not in use. The degree of inclination may vary as well as the number of head/footrests and buttons assigned for the inclination feature.

Figure 17:
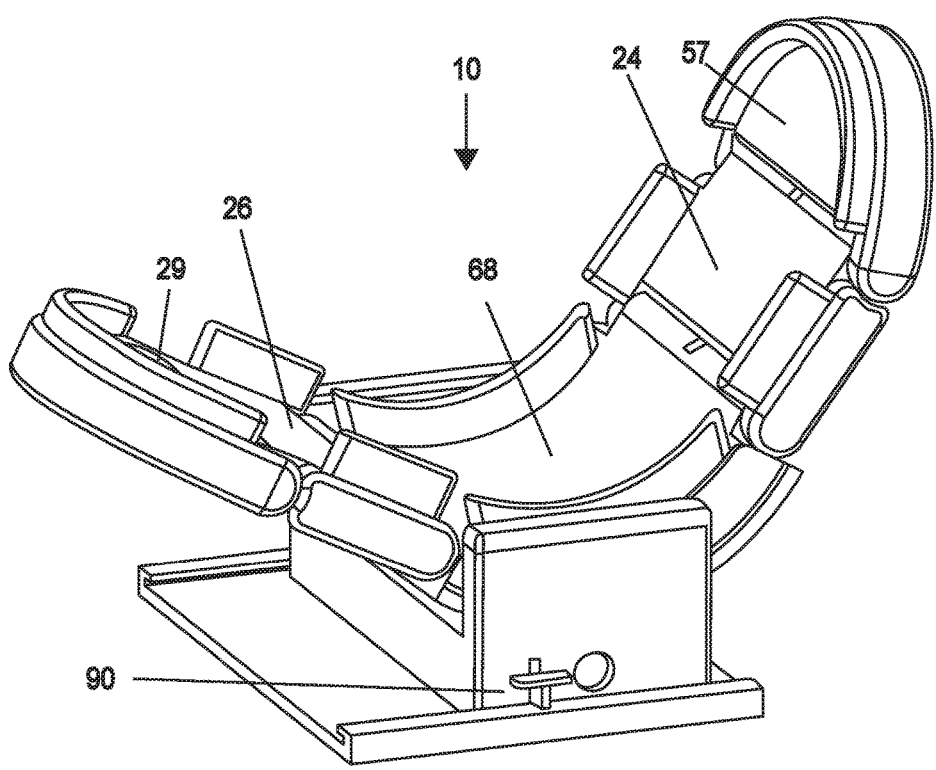
FIG. 17A is a view of the integrated safety seat configured for a child from 4 to 6 years old placed in a forward facing position.
FIG. 17B is another view of the integrated safety seat configured for a child from 4 to 6 years old placed in a forward facing position.
Figure 17:
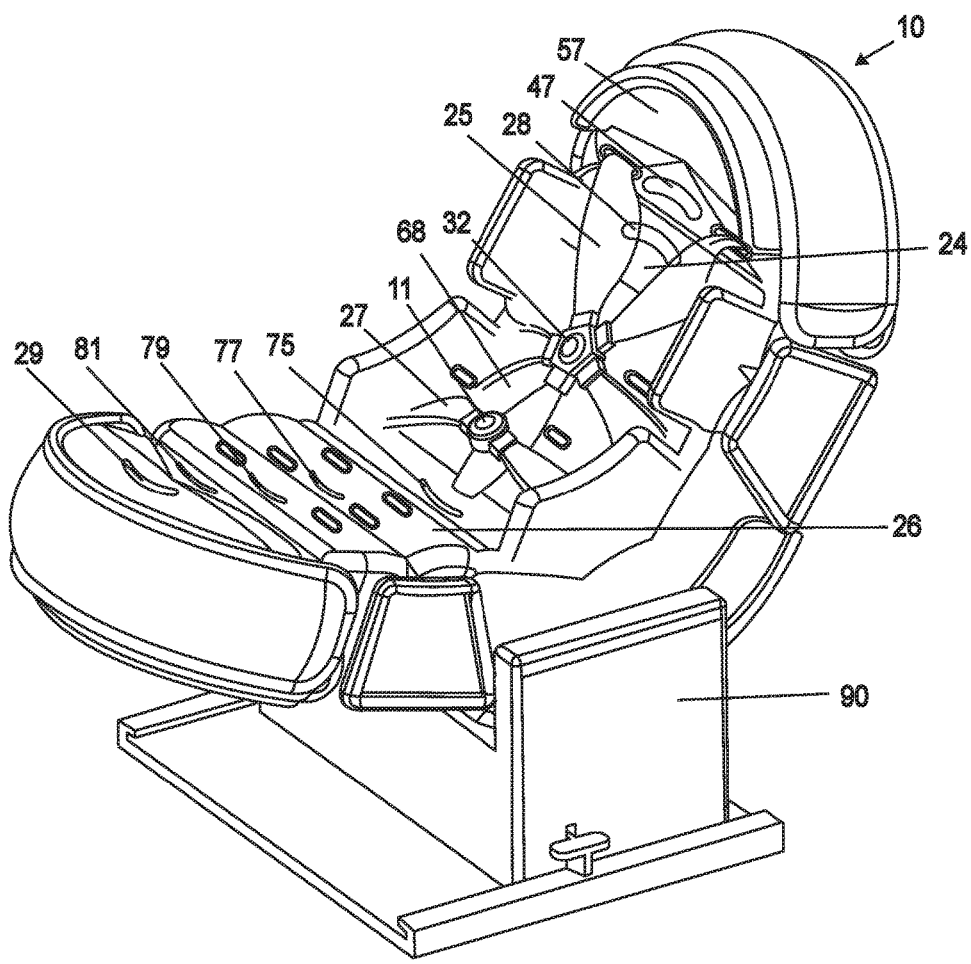

The inclinations of the seat bottom 26 and back 24 controlled by button 37 with buttons 31 and 41, together or independently and additionally with the inclinations of head/foot rests with buttons 39, 85, 87, 89 and 8, 7, and 57 will provide an array of multiple inclinations to seat bottom 26 and back 24 with reclined angles including 30, 40, 45 or 60, and 90 degrees (Approx.), configured to provide inclinations of semi-recumbent, recumbent, and upright positions all in various degrees that are standardized or convenient, in Position 1 and Position 2 including the cradle position in between, of the integrated safety seat. FIG. 12B. FIG. 17B.

The inclinations of the head/foot-rests support 29 and 57 at the extremes of seat bottom 26 and back 24 could provide reclined positions including 40, 50 or 70, or 90 degrees, (Approx.). These inclination alternatives are configured to adjust to the anatomy of the occupant. In this sense, for Position 1, when used as head-rests 75, 77 or 79, or 81 or 29 together with 28 or 47 or 57 used as foot-rests, and its inclinations, the integrated seat is configured to accommodate a child rear facing from newborn to 2, 4, 6, 8 years old, or above, and even an adult. FIG. 12B to FIG. 15B. FIG. 20B.

At the same time, when used as headrests 28 or 47 or 57 together with 29 or 75, 77, 79 or 81 used as foot-rests, and its inclinations, the integrated safety seat is configured to accommodate a child forward facing from 2 to 4, 6, 8 years old years old and above, and even an adult. The seat bottom together with head/foot rest at the extreme, and the back with head/foot rest at the extreme, provide an array of a plurality of inclinations from the upward to inclined angles, including 180 degrees. FIG. 16B to FIG. 18B, FIG. 19B.

The inclination mechanisms of the head/foot rests as well as all other inclinations in the integrated safety seat 10 could have hinges 33, knobs, electronic, digital, or any other technology, and be completely seamless or not, such as inclined mattresses, airplane seats, massage chairs, and others. The inclination buttons may also be in a separate remote control configured to be operated by the driver or caregiver present in the vehicle. The buttons can also be replaced by other means of controlling the inclinations.

FIG. 2 is an example of an integrated safety seat. Similarly the seat bottom 26 together with back 24 seamlessly and automatically move from the center and elevate to upward and inclined positions, and may move with a button 37 and button 31 respectively. Buttons 31 and 37 elevate the inner part of seat bottom 26 and back 24 respectively. Button 41 controls the inclination of the extreme of seat bottom 26 and of the back 24. Seat bottom 26 includes head/foot rest support 29 configured for the placing of the occupants' head, when in Position 1, that also incline with or without the seat bottom 26 with button 37 and with or without button 41, together or independently to different angles. Many inclinations are obtained by controlling the button 39, with or without button 41 as well. There are head/foot rests 28, 47, and head/foot rest support 57 configured for placing the occupants' feet, when in Position 1, that also incline with the back 24 or independently in different angles by controlling the buttons 8, 7, 17. The extreme of seat bottom 26 and the extreme of back 24 may be controlled to incline in different angles together or independently with button 41 configured for the head or for the child' lower extremities, according to the position in which he is seated. All the headrests and footrests of the integrated safety seat may raise manually or by other technology.

There is side protection that elevates to different heights provided by armrests 23, 43, configured on both sides of the child in seat bottom 26 and back 24, and may elevate or not, manually or by any other technology.

On both seat bottom 26 and back 24 there are buckling harness systems. The harness 25 with hasps 32 is shown, and on seat bottom and back, and cradle there are lap-belts 27. There may be various harnesses integrated and internally connected along the integrated safety seat to secure an occupant placed rear facing, and various harnesses integrated and internally connected to secure an occupant placed forward facing, including the cradle 68.

Position or placement 1 is configured to be opposite to the driver to abide by the law and configured to protect an infant's or small child's central nervous system—skull and spine—from newborns to 2 years old or 4 years old, or below the mandatory weight established by the A.A.P., or still sitting in the rear facing position when he is the age of 4, or 6 or 8 years old, or above to adulthood, in the event of a car collision. All the inclinations and elevations controlled by buttons in the integrated safety seat 10 work together and/or alternatively configured to adjust to the needs of the child while travelling in a vehicle since he is a newborn up to age 8 and above, even an adult. All buttons may be replaced by other technologies to control the inclinations.

The center or cradle which is a section that is part of the integrated seat bottom 26 and back 24 may have a concave shape or not. In the integrated safety seat 10 there are buttons to incline the concave or regular shaped center of seat bottom 26 together with back 24 for the transition between the upward and inclined positions, including the cradle position in between if there is one as well as there are buttons to incline the extreme of seat bottom 26 and the extreme of back 24, which are different than the buttons to incline the head/foot rests supports. The reason is to provide many more configured options to comply with the child's or the occupant's absolute safety and comfort, proper positioning and needs, such as sleeping, drinking from a bottle, or configured to keeping the upper body of the child or the occupant in the recumbent and/or semi-recumbent and/or upright manner, or in various angles of inclination, in all the stages of his development.

The cradle is considered a part of the seat bottom and back, it is where the seat bottom and back unite. The cradle which is part of the seat bottom and back can have different shapes. This ergonomic art configured for an occupant to be placed in the integrated safety seat 10 at all stages of his growth, since he is a newborn up to when he becomes an adult, is a novel concept for the industry.

The head/foot rests at the extremes are supports 29 and 57 of the seat bottom 26 and back 24, which means they are a prominent structure that holds the configured occupant in both Position or placement 1 and Position or placement 2. Each of these two head/foot-rests supports may measure approximately 10 inches in length, which provides enough space configured to serve as head placement or feet placement alternatively, for the head and neck as well as the for the end of the lower extremities or feet of an infant or a child up to 8 years old, and even an adult, according to the position he is placed in the integrated safety seat 10.

The integrated safety seat surface may be below the seat surface of other seats in the vehicle. The integrated safety seat is configured to have armrest 23 on both sides of the occupant in seat bottom 26, and armrest 43 on both sides of the occupant in back 24. The armrests 23 and 43 are used together for both Position 1 and Position 2. The armrests are used together at the same time and are configured to protect the complete body of the occupant. The height of armrests 23 and 43 is of approximately 5, 10, 15 inches, and is configured to provide protection and stability to the occupant in the lateral limits of the integrated safety seat 10. They may elevate to different heights according to the need, manually or electronically or by other means.

The armrests may have cavities to hold bottles on each side. The vertical space at the lower end of the integrated safety seat, which is perpendicular to the floor of the vehicle may have an opened or closed compartment for dippers or blankets as well as any other small artifact that might be handy.

In the integrated safety seat, the seat bottom 26 and back 24 and the cradle or center that may be in between as part of seat bottom and back, may be an independent seat, and is permanently built in the vehicle, united or separated from other seats, whereas the design of the contours, upholstery and texture match with other seats of the vehicle in both cases, when it is unified with other seats or separated from other seats. When the safety seat 10 is unified with the structure of the rear bench seat contour 36, or is united to another or another seat or other seats, the safety seat is built-in the structure of a vehicle, both for aesthetics and safety by strengthening the structure of the integrated safety seat 10. When the integrated seat 10 is a separate seat from other seats or bucket seat, the separate integrated safety seat is unified with the surface or the integrated seat itself, with the upholstery of the integrated seat itself and with the structure of the integrated seat 10 itself, and it is built in the structure of the vehicle, both for aesthetics and safety by strengthening the structure of the integrated safety seat. This is in contrast to the prior arts that strap external or independent detached infant car seats onto the rear bench seat with seatbelts or other available straps that connect to an attachment point.

For all the different adaptable parts that are presented in many of the figures of the integrated safety seat 10, in order to configure to the dimensions of a growing child and an occupant in various stages until he becomes an adult, a three-point or five point harness 22 with hasp 46 in seat bottom 26 and a three point or five point harness 25 with hasp 32 in back 24, including the cradle in between, provide a secure restraint system. This is enforced by the lap-belts 27 in both seat bottom 26 and back 24. Various other harnesses and lap-belts of any kind may also be internally connected and integrated along the surface of the integrated safety seats. Harnesses and lap-belts may be all fastened together in a hasp with several hooks, one on each Position or Placements of the seat, Position 1 and Position 2. Other strapping systems or available types of child restraint systems and methods may be employed as regulated by jurisdiction.

The shape of the seat bottom 26 and back 24 in the center and/or the consecutive sections, is ergonomic, and may be configured to surround the child for impact protection in the integrated safety seat 10. The seat bottom 26 and back 24 may be concave in shape.

Protruding and rounded head-rests supports in the extremes along the internal surface of the integrated safety seat are configured to protect the neck and skull of the occupant and raise or elevate and expand. The armrests that may elevate to different heights are configured to provide side protection. Harnesses with hasps and lap-belts with hasps are wide, in a triangular shape and cushioned to ensure restraint. Integrated inserts are configured to reduce the width of seat bottom 26 and back 24 for protection and raise or elevate and expand. Padding integrated into the seat bottom 26 and the back 24 are configured to further enhance comfort and impact survivability performance. The inclination internal mechanism of the seat bottom 26, together with back 24 is controlled by button 31 and 37 and is configured to transition between the upward and inclined positions of the integrated safety seat i.e. forward and rear facing configurations, Position 1 and Position 2, to provide safety and comfort while travelling in vehicles. The buttons may be replaced by other controls of inclination.

The integrated safety seat 10 is configured for occupants of different ages and sizes rear facing, and for occupants of different ages and sizes forward facing. The length of the seat bottom may be shorter than the length of the back. The cradle itself or area between the seat bottom and the back may have additional sections of inclination.

The safety seat may be united or separated from other seat(s).

The means of inclination and elevations to upward, downward positions of the seat are given by sliding, stationary center or cradle base, rotational, or other mechanisms. FIGS. 27.1-27.13.

FIG. 3. With regards to the integrated safety control features of the integrated safety seat 10, they will all together be reflected in the dashboard and/or configured to be viewed by a front seat driver, where a perspective view of an example of a dashboard is shown to include, among other features, a rearview mirror 48, a rear-view infant mirror 50, a display 49, an electronic signal infant in seat 51, an electronic signal buckled 53, a manual button unbuckle 59, a manual button infant in car 55, a screen 52, a radio 54, a steering wheel 56, a speaker 58, a windshield 60, a key-fob 61, a loudspeaker intercom 63.

The safety controls of the integrated seat have features specifically configured to the security of the child to be controlled by a forward facing driver whether the vehicle is in operation or not. The integrated safety seat 10 has at least one camera, and up to four cameras, camera 35 on back 24 on top of head/foot rest 57, camera 42 in seat bottom 26 on top of head/foot rest 57, camera 44 in seat bottom 26 on hasp

46, camera 62 in back 24 on hasp 32 or cameras in the armrests. A camera or cameras may be elsewhere, integrated to the safety seat. FIG. 6. These cameras are configured to allow the driver or the person next to the driver to view the infants' or child's face and body captured by the cameras reflected in the dashboard. FIG. 3. This is effective during an abrupt movement of the vehicle or a collision as well as general purpose configured to keep the infant or child from unwanted movement about the vehicle during driving, or to control any need of the child.

A hasp 46—Position 1, and a hasp 32—Position 2, are configured to allow fastening or buckling of the child into the harness 22—Position 1, and harness 25—Position 2, as well as hasps 11 on armrests 27 on both seat bottom 26 and back 24 restraint systems. FIG. 5.

There may be different harnesses and hasps elsewhere also internally connected to the integrated safety seat. These hasps will have sensors 13 to indicate they are fastened when the vehicle is in operation, and when the vehicle is not in operation, and will be reflected in the dashboard.

As part of the electronic, digital or other safety features, a scale 30 or weight detector or pressure detector, FIG. 1A, FIG. 1B, is configured as part of a safety control system in the integrated safety to avoid leaving a child in seat reflected in sign Infant in Seat, and/or a child unfastened reflected in sign Infant Buckled while the vehicle is in operation, as well as a child buckled when the vehicle is not in operation, as well as children left in unattended vehicles reflected in notification sign Infant in Car. If a predetermined weight or pressure is detected by the scale 30, which has detectors all along the seat bottom 26 and back 24 of the integrated safety seat, then the monitoring system is on alert and awaiting additional signals to avoid these risks. The weight or pressure needed to activate the scale may be configured to be that of the infant or older child. It is generally minimally more than a few pounds when the infant is a newborn. Each of the features that detect if a child is in vehicle or not, if a child is in the integrated seat or not and if the child is buckled or not, will have independent signals in the dashboard and independent alerts for each of the situations, intertwined with one another in a sequence for when the vehicle is in operation and for when the vehicle is not in operation.

The feature of Infant in Seat is configured to better err on the lighter side and risk a false alert of an infant or child improperly left in the vehicle than to not trigger and risk human injury.

The cameras named 35 and 42 may be configured to be on the top surface of the headrests, on the hasps, in the armrests, or elsewhere, directed to the integrated seat so that the child's face may be seen when facing rear or forward. The cameras 44 and 62 may be configured to be integrated into the hasp 46 and the hasp 32 or in any other area such as the armrests of the integrated safety seat to cover a close-up view of the two directions the infant or child is facing.

All the safety features of the integrated safety seat are configured with controls and tools accessible to the driver of the vehicle into which the system is installed.

All of them are configured to be reflected in the dashboard, or conveniently for the driver to monitor all the features that comprise the utmost security of the infant or the child in the integrated safety seat, or seats, when there are more than one integrated safety seats in the rear of a vehicle.

The safety system of the integrated safety seat is based on a series of detectors or controls that are intertwined with one another and work together progressively in a sequence. FIG. 3. This is configured to allow the driver and/or the caregiver to take action when required in every possible status confined to the safety of the infant or the child, when the vehicle is in operation, and when the vehicle is not in operation.

These safety features of the integrated safety seat, reflected in the dashboard are:

Rear-view infant mirror 50—placed between the screen and the display.

Screen 52—shows images of cameras in the safety seat in head/foot rests, hasps, etc.

Display 49—of electronic, digital, automatic, manual or other internal signals and buttons.

The display 49 shows the following controls:

INFANT IN SEAT 51—Weight or pressure of infant detected by scale 30 in safety seat.

BUCKLED 53—Buckling Systems—hasp(s) of harnesses in safety seat fastened and sensors.

UNBUCKLE 59 Unbuckle button of the hasp(s) in the display configured for driver.

INFANT IN CAR. 55—Manual control: Infant or child left in car button.

Alerts: lights regular and intermittent, alarms, tunes, voices for 51, 53, 55.

Manual Key fob—61 alert connected to INFANT IN CAR 55 of display.

Loudspeaker Intercom 63—connected to integrated seat and driver.

A rear-view infant mirror 50 is placed on the dashboard below the screen of the cameras or elsewhere, as an additional feature configured to view the child in the integrated safety seat 10 without requiring the driver to turn around to check on the child, which could be a distraction and could lead to an accident. FIG. 3.

Figure 4:
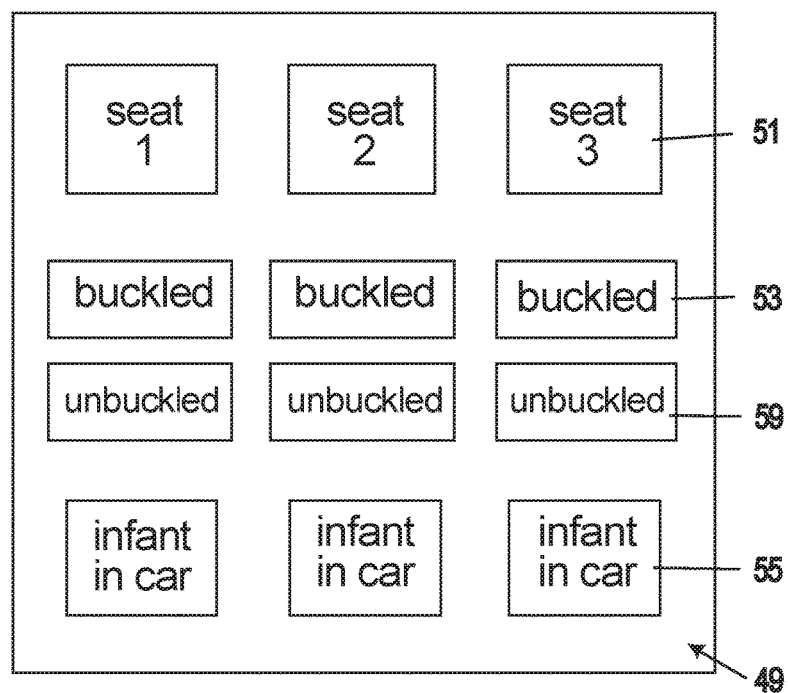
FIG. 4 illustrates the security control elements in a control or instrument panel of a vehicle.

Alternatively, the screen 52 that is part of the dash infotainment or navigation system, or the dashboard, or the display, can be used to show the data captured by the camera or all the cameras 35, 42, 44, 62, of the integrated safety seat 10. FIG. 3. The images captured by the cameras are selectively viewable from the front seat of the vehicle. If more than one infant or child is placed in a vehicle that contains more than one integrated safety seat 10, then it will read, camera 1 for child 1, camera 2 for child 2, camera 3 for child 3 etcetera. FIG. 4. Similar to how a backup camera will show the area behind the vehicle configured to aid the driver in safely backing up, the screen 52 can be used for viewing the images captured by camera(s) of the integrated safety seat 10 as needed. When the camera(s) are not monitoring the configured child, the screen 52 may remain useful for its other traditional functionalities, like the radio and navigation, or the screen 52 can be split to show all these functions mentioned at once.

A camera 35 is optionally configured and positioned in head/foot rest 57 of back 24 and directed to the seat bottom 26, to view the head of the infant or child when secured in a rear facing position into the integrated safety seat 10. A camera 35 may be configured in the head/foot rest 29 at the extreme of seat bottom 26 of the integrated safety seat, or another location such as the armrest where it can image the child's head in the back 24 when secured in a forward facing position. FIG. 2. FIG. 6. There may be one or more cameras showing different angles in different places integrated into the seat for direct viewing of forward or rear facing seat configurations. The associated screen or the dashboard or display may show multiple angles or can cycle through the different perspectives of the cameras. For example, one camera can be on or near the rear back bench facing forward configured to image a child in a rear-facing position. A camera may also be configured to be on the child integrated safety seat, the armrests, or on the rear of the front driver seats pointing back to view the face of a forward facing child. Cameras may also be integrated into the fastening mechanisms such as hasps 46 and 32 of harnesses 22 and 25 on both ends of them, or buckles, configured to provide a close-up view of the infant or child strapped therein and also to visually verify in the screen 52 that the hasp are fastened, or camera(s) may be in the armrests, or elsewhere. The camera(s) should be configured to view all aspects of a child of any age and size in the integrated safety seat and in the vehicle, at all times.

The display 49 reflects specific integrated safety features of the seat 10, intertwined with one another. FIG. 3, FIG. 4.

INFANT IN SEAT 51 is a feature reflected on display 49 related to the scale 30 of seat bottom 26 and back 24 of the integrated safety seat 10.

The scale or pressure detector 30 may provide data to a processor and the dashboard or the display configured to aid in determining whether there is a child occupying the seat bottom 26 or back 24 or if the seat bottom 26 or back 24 is vacant, for example, it is configured that infants with clothing may weight from about three kilograms or more. Therefore, the detector of scale 30 is configured to indicate an occupied seat if about two or more kilograms are detected on the scale 30. This would avoid having an occupied determination if a lighter blanket or some other object is in the seat bottom 26.

An unfortunately frequent contributor configured to child safety risk relates to leaving an infant or child unbuckled which refers to not being secured with fastening systems, when a vehicle is in operation, both of the detached seats that are to be strapped to the vehicle seat with seat belts and latches and tethers and poles, as well as with the buckling system that holds or restraints the infant or child to the detached seat itself.

When the detached seat is not configured to be properly secured to the vehicle seat, children are exposed to be injured, as well as when they are un-buckled or not properly fastened to their detached car seat itself, in the event of the vehicle stopping abruptly, speeding, as well as in vehicle collisions and accidents.

Often, in vehicles configured without control systems, children have died from exposure to excessive heat and cold while alone in a car for protracted periods, when the vehicle is unattended. An effective aid to avoid such tragedies should be included in all vehicles configured where a child is reasonably expected to be. Both situations, that often occur in vehicles with no configured controls of infant left unbuckled or unfastened when the vehicle is in operation, and infants left in vehicle when the vehicle is not in operation, are very common in daily life in which there is an overwhelming number of activities in which an infant or a child is incorporated to, by travelling in cars configured to drivers that have an enormous distraction increased by the excessive use of cell phones when accessing or exiting a vehicle and even while driving. The present design specifically adapted and configured for use with young or non-verbal infants should preferably include automatic safety measures as part of the internal integrated safety system reflected on dashboard to avoid exposure or other injuries that can result from children unbuckled or unfastened and children left in a vehicle. FIG. 3, FIG. 4.

BUCKLED 53 is a safety feature reflected in display 49 related to the fastening of the hasps 46 and 32 of the harnesses 22 and 25, as well as fastening the hasp(s) 11 of lap-belt(s) 27 or other hasps of the integrated safety seat. Fastenings will be detected by a sensor on each hasp. In an integrated safety seat 10, in addition to the configured inherent safety of securely strapping the child into the integrated seat with harnesses 22, and 25 and fastening hasps 46 and 32, and lap-belts with hasps 11, and/or other harnesses with hasps and lap-belts with hasps, there will be sensors 13, FIG. 28, on each one of the hasps to make sure the fastening of hasps 46, 32 and 11 and/or others are registered in the controls with sign BUCKLED 53. FIG. 3, FIG. 4.

Regarding the sign BUCKLED 53 which is a safety feature in display 49 in one embodiment of the invention, BUCKLED 53 is related to the hasp 46 as part of the harness 22, and the hasp 32 as part of the harness 25 as well as the hasps 11 as part of the seat-belts 27, in which all the hasps each include a sensor to detect when the hasp 46 and the hasp 32 and the hasps 11 or others are fastened, thereby, likely configured to have a child strapped and secured in the seat sitting rear facing, or secured sitting forward facing.

The sensors 13 can send data to the electronic control signal BUCKLED 53 for the hasp 46 and 32 and the hasps 11 that are fastened or unfastened. This is configured to be expressed in the display 49 or the dashboard, as BUCKLED 53, accordingly to the light, illuminated or not, and this sign will also have an intermittent light if the previous button INFANT IN SEAT 51 that responds to the scale 30 determines a child is actually seated, therefore actions of fastening need to be taken in BUCKLED 53. FIG. 3, FIG. 4.

This integrated safety seat 10 is configured to include the buckling safety feature as well as all other safety features reflected in dashboard as features that are internally connected with any technology to the integrated seat that is part of the car itself, built in when the vehicle is manufactured, not a feature connected to a detached car seat or not any other external artifact that is adapted or incorporated after the vehicle is assembled as an external feature or instrument connected in any technological way to an infant car seat that is detached.

INFANT IN CAR 55 is a safety feature reflected in display 49 or dashboard configured to relate to a child present in vehicle in the integrated safety seat 10 or anywhere inside the vehicle. FIG. 3, FIG. 4.

In order to address situations in which an infant or child is left in a car, be it in the integrated safety seat 10 or elsewhere in the vehicle, and then forgotten, the presence of a child in vehicle will be configured to be indicated in the control of the display INFANT IN CAR 55. This button will be configured to be controlled manually by the driver in display 49 or the dashboard when accessing a car with a child, configured to establish awareness and a reminder of the presence of the child in vehicle and to pay attention to the steps to follow in order to ensure his safety. The infant protection system of the integrated safety seat 10 includes features and functionality configured so as not to distract drivers while operating the vehicle.

If a processor determines that a vehicle is on and moving, the system is configured to indicate that the infant or child is in seat 51 with a signal and an alert, and to indicate that the child is buckled 53 with a separate signal and a separate alert, in an attended vehicle. Both signals are intertwined with a sequence. The processor may be attached to the engine control systems, speedometer, transmission or other car data source to determine with a reasonable degree of certainty whether the vehicle is in movement or not, when stopping, or the ignition is turned off, and therefore it is configured to indicate whether the infant or child is attended to or might be alone, INFANT IN CAR 55. FIG. 3, FIG. 4.

The cameras 35, 42 in head/foot rests 57, 29 and cameras 44, 62 in hasps 46, 32, or in armrests, or anywhere in the integrated safety seat or elsewhere inside the vehicle are also configured to prevent unwanted infant left in car situations. A camera or all cameras 35, 42 and 44, 62 connected to head/foot rests, and/or hasps, armrests, and/or elsewhere in the integrated safety seat, or other parts inside the vehicle, are configured to detect infant or child in movement, facial recognition or other sense-able information to provide a reasonable probability that a child occupies the integrated safety seat. These images captured by camera(s) will be reflected in the screen 52, or the dashboard, or in display. FIG. 3, FIG. 4.

Any individual or combination of the scale 30, camera(s) 35, 42, 44, 62 or fastening sensors 13 of hasp 32, hasp 46 and hasp(s) 11 or other hasps, are configured to determine whether a child is in the integrated safety seat.

All the steps in the display 49 or in dashboard are configured to be followed when an infant or grown child is present in the vehicle and/or in the integrated seat 10 to make sure the safety control features are in place when the vehicle is in operation and when the vehicle is not in operation. For this reason, independent alerts for each feature intertwined with each other are issued to bring awareness of the steps to cover and follow. The alerts are configured to be anything to signal to a person who may be able to verify the safety of the infant or child. The alerts may be connected electronically or by any technology to the display 49 or dashboard, could broadcast through the speakers as lights, sounds such as buzzer, or pre-recorded statement to the effect of: "check the car seat" or "infant potentially at risk", an alarm, or a melody such as a lullaby or other tune. The alerts of display 49 can manifest as (a) lights that can be intermittent or not, in the corresponding button or signal 51, 53, 55, and also honking the horn, sending a text, disabling the car's ability to lock remotely in a key fob or other notification means alone or in combination with other means and types of alerts. FIG. 3, FIG. 4.

Figure 7:
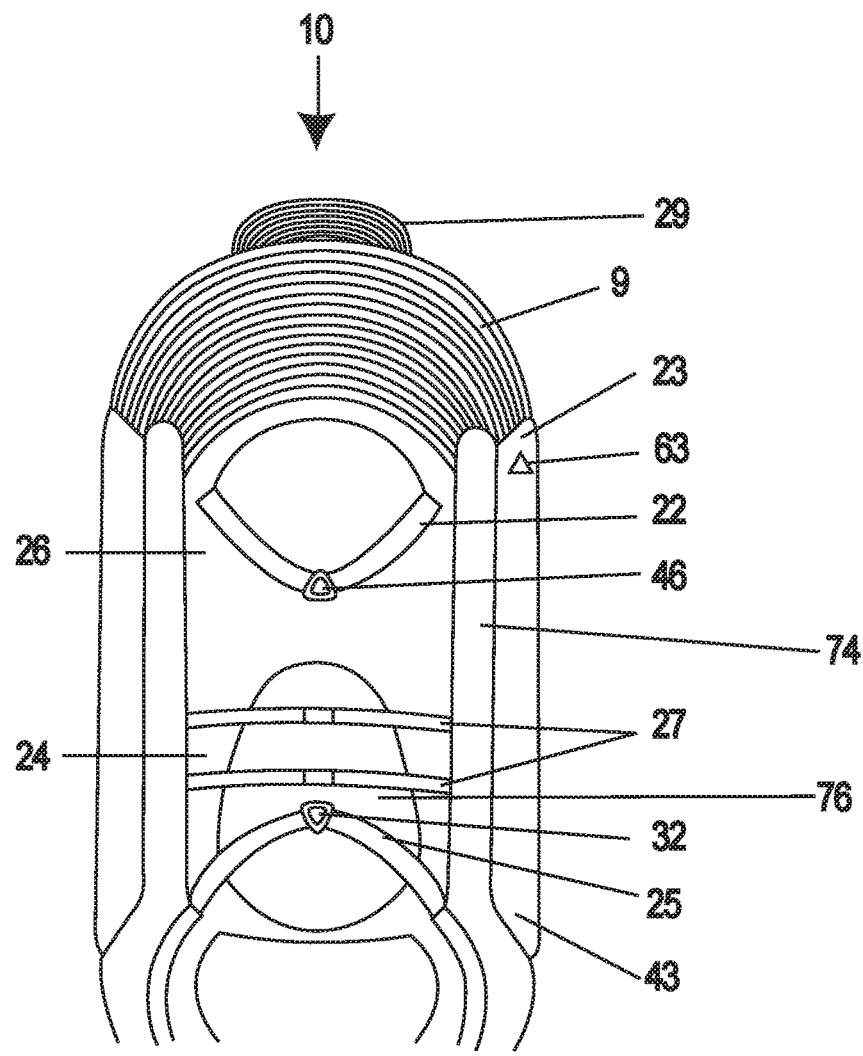
FIG. 7 is a top and back view of the integrated safety seat configured for a newborn, in the cradle position, with canopy.

The Key-fob 61, FIG. 3A, is configured as a control when leaving the vehicle to reassure no child is left in vehicle. It can also serve to unbuckle the child remotely. The Loudspeaker Intercom 63, FIG. 7, is configured to be integrated and connected in the integrated safety seat between the occupant and the driver, to magnify the voice of a small infant, as well as for the driver to speak to the infant without needing to turn back.

FIG. 4 shows by way of example, to indicate the intertwined system of the safety control features expressed in the display 49 or the dashboard, this is one of the possible programmed actions of the art 10 including all the security control features working together in a sequence:

The safety controls are configured to be activated when the driver or caregiver places the child in the integrated safety seat 10. The safety controls are configured for the driver or caregiver to buckle or fasten the infant or child at that moment. Three-point harnesses 22 and 25, with hasps 46 and 32 should be fastened according to the position in which the occupant is placed, one harness when he is placed on the rear facing position, and one harness when he is placed in the forward facing position, including the cradle, complemented with lap belts 27 fastened with hasps 11. Each hasp has a sensor 13.

The safety controls are configured for the driver that sits in his driver seat and start the ignition the vehicle, and the vehicle is in operation.

The safety controls are configured for the driver to use the screen 52 to view images in camera(s), or the dashboard or the display. The safety controls are configured for the driver to use the rear infant view mirror 50 to observe the child when he is in the integrated safety seat. FIG. 3.

The safety controls are configured for the driver to press in the button INFANT IN CAR 55 manually as a reminder that child is present. The safety controls are configured for the light of this manually controlled button 55 to be illuminated.

The safety controls are configured that if the scale or pressure detector 30 determines if the infant is in the seat bottom 26 and back 24 or the center or cradle in between if there is one, then the light of the signal INFANT IN SEAT 51 is illuminated.

The safety controls are configured so that the feature INFANT IN SEAT 51 may also be activated in connection to the camera(s) 35, 42, 44, 62 or other cameras reflected in the screen 52, responding to the images captured of the child.

When the signal INFANT IN SEAT 51 is illuminated internally it is configured to transmit an indication to the sign BUCKLED 53 to become intermittently illuminated. The light of the second sign BUCKLED 53 is configured to be illuminated, because the driver or caregiver fastened the child to the buckling system.

The safety controls are configured so that in the case the driver or caregiver did not buckle the infant, child or occupant, then the sign BUCKLED 53 will emit an alert such as an intermittent light, sounds and/or alarms, and/or voices, and/or lullaby tunes, etc.

The safety controls are configured so that when the occupant is buckled or fastened, the sign BUCKLED 53 is continuously lit and not intermittent. The sign INFANT IN SEAT 51 remains lit. The sign INFANT IN CAR 55 is still pressed down and lit. When the vehicle is turned off or is not in operation, the sign BUCKLED 53 is illuminated intermittently.

The safety controls are configured so that alerts such as sounds, and/or alarms, and/or voices, and/or lullaby tunes or others, are activated as a reminder to un-buckle or unfasten the infant, child or occupant.

The sign INFANT IN SEAT 51 is illuminated. The INFANT IN CAR 55 is still lit. The safety controls are configured so that when an occupant, such as an infant or child is un-buckled or the hasps are unfastened, the sign BUCKLED 53 is not intermittent and is not illuminated. The un-buckling or unfastening can be done either with control button UNBUCKLE 59 on the display 49 or the dashboard to be activated either manually or electronically which will open the hasps 46 and 32 and 11 or others by pressing the button in the display or the dashboard, or directly by unfastening the hasps of harnesses and lap-belts on the buckling system of the seat, or by unfastening the buckles remotely in the key fob.

The sign INFANT IN SEAT 51 is lit. The sign INFANT IN CAR 55 still remains pressed down lit. An alert, such as sounds, and/or alarms, and/or voices, and/or lullaby tunes or others are activated as a reminder of INFANT IN SEAT 51 and INFANT IN CAR 55.

The safety controls are configured so that when the infant or child is removed from the seat by a caregiver the sign INFANT IN SEAT 51 is not illuminated. The button INFANT IN CAR 55 remains lit. An alert such as sounds, and/or alarms, and/or voices, and/or lullaby or other tunes are activated configured to be a reminder to take the infant or child out of the vehicle.

The safety controls are configured so that when the driver is about to leave his seat, and he or she is the person that will remove the infant or child from the seat once he has unbuckled or unfastened the infant or child electronically or manually, the driver presses out the manual button INFANT IN CAR 55, and it is configured that an alert such as sounds, and/or alarms, and/or voices, and/or lullaby or other tunes which have been a reminder that the infant or child is in car before he can lock the vehicle, or no longer active. At the same time, the driver will have a key fob in which the button INFANT IN CAR 55 is still lit until he presses out the button INFANT IN CAR 55 either in dashboard or in Key fob 61, as a secondary reminder of a child left in car, since it is connected to the actions in the display 49 or the dashboard. FIG. 3, FIG. 4.

The safety controls are configured so that the driver must press out the button in key fob of INFANT IN CAR 55 so the alerts such as sounds, and/or voices, and/or lullaby or other tunes are no longer needed and he may lock the vehicle. The key fob 61 may also have a control for the driver to unbuckle the child remotely, as an alternative from the UNBUCKLE sign in the dashboard, in order to allow him to remove the child more easily from the integrated safety seat and the vehicle. FIG. 3, FIG. 4.

FIG. 5 shows some optional elements that may be included in an integrated safety seat 10, a seat bottom 26, a back 24, a harness 22, a harness 25, a hasp 46, a hasp 32, an insert 74, a padding 76, a head/foot rest support 29, an head/foot rest 28, a head/foot rest 47, a head/foot rest support 57, an inclination control button 37 for the seat bottom 26, an inclination control button 31 for of the back 24, an inclination control button 41 for extreme of seat bottom 26 and back 24, an inclination control button 39 for head/foot rest support 29, an inclination control button 8 for head/foot rest 28, an inclination control button 7 for head/foot rest 47, inclination control button 17 for head/foot rest support 57, a hinge(s) 33, a lap belt(s) 27, a hasp 11.

The seat bottom 26 and back 24 may be adjusted with button 37 and 31 to transition between the upward and inclined positions of the safety seat (i.e. forward and rear facing position), as button 41 adjusts the extremes to the needed angle. The hinge 33 laterally bisects the integrated safety seat to adjust the tilt or recline of the seat. By lifting the forward end with headrest 29 the seat becomes rear facing. Lowering the headrest support 29 with the end of seat bottom 26 completely downward essentially turns that headrest support 29 functionally into a footrest. The head/rests support 29 and 57 bend vertically downward to 90 degrees when they are not in use, and do not take space vertically when bend down through the inclination button. The ends of the integrated safety seat terminate in headrests supports 29 and 57, and the seat may also have internal hinges or other mechanisms to recline or adapt the headrests 28, 47 and 57 along the back so that headrest 28, 47 and 57 act as a footrest when the seat is configured for rear facing seating.

When the head/foot supports 29 and head/foot rests supports 57 are in use, they are configured to provide the necessary space to accommodate the child's head and neck, or feet, alternatively, and give support for an occupant to sit comfortably as he/she grows from infancy to adulthood. The head/foot rests support 29 and 57 incline 90 degrees upward and 90 degrees downward, and 180 degrees from the upward position to the downward position, together or separately with the multiple inclinations of the seat bottom and of the back. FIG. 5. FIG. 19B, FIG. 20B.

Insert 74 may also be configured to be used with padding 76 nested inside insert 74 to further diminish the size inside the safety seat for yet a smaller infant or child. The inserts 74 and padding 76 are configured to accommodate a growing infant or child so that the integrated safety seat may be used for several years of development of the child and even through his adulthood when all the internal features of the seat are configured to be adapted to sit a grown child, a teenager or even an adult. FIG. 5.

FIG. 6 shows a top and backwards view of the integrated safety seat 10, in which head of infant is configured to be facing opposite to the driver, between a newborn and 2 years old, or 4 years old, or below mandatory weight, as well as for an occupant from infancy to adulthood—Position 1.

The occupant's upper body is configured to lay in seat bottom 26. The occupant's head is configured to lay on head/foot rest 29, or 75, 77 or 79 or 81. The occupant's lower body is configured to be in back 24 and the occupant's feet are in head/foot rest 57, or 28 or 47. The head/foot rests are controlled by buttons 39, 83, 85, 87, 89, 8, 7, 17. An armrest 23 on both sides of seat bottom 26, and armrest 43 for both sides of back 24, a button 65 to control elevation of arm rest 23, a button 69 to control elevation of armrest 43, a harness 22, a hasp 46, a harness 25, a hasp 32, lap-belts 27, a camera 35 connected to head/foot rest 57, a camera 42 connected to head/foot rest 29, a camera 44 connected to hasp 46, a camera 64 connected to hasp 32. The buttons for the inclinations may be substituted by other technologies.

The armrests 23 and 43 or side protections may surround the periphery of the integrated safety seat to provide all around protection. All the inserts, padding and armrests are from the same fabric as the upholstery or match with the upholstery of the integrated seat and the surface.

FIG. 7 shows a top rearward view of an integrated safety seat 10 configured to support infants up to the age of 6 months approx., in which the infant lays in the seat bottom 26, or in the cradle, in Position Infant 1. There is a canopy 9 that covers the area of the extreme and middle of seat bottom 26, and it is attached on the sides of armrests 23. The top of the canopy 9 is also attached to the base of the head/foot rest support 29. The canopy is configured to allow the newborn infant to sleep comfortably being sheltered from noise and light.

The canopy 9 is made with the same or matching fabric as rest of the upholstery and it could be opened and closed in an accordion shape. It is configured so that there is a three-point or a five-point harness 22 and a hasp 46 to restrain the infant, as well as lap-belts. There are inserts 74 to reduce the space or be a barrier in the integrated safety seat on seat bottom 26 and back 24, as well as cradle, and padding 76 to cushion the surface all along the integrated seat configured to protect the infant or child. All inserts and padding are from the same or matching upholstery and décor as the integrated seat. There are lap-belt(s) 27 configured to secure the infant or child below his waist to the integrated seat. Back 24 with harness 25 and hasp 32 as well as armrest 23 and armrest 43 are also shown.

Figure 8:
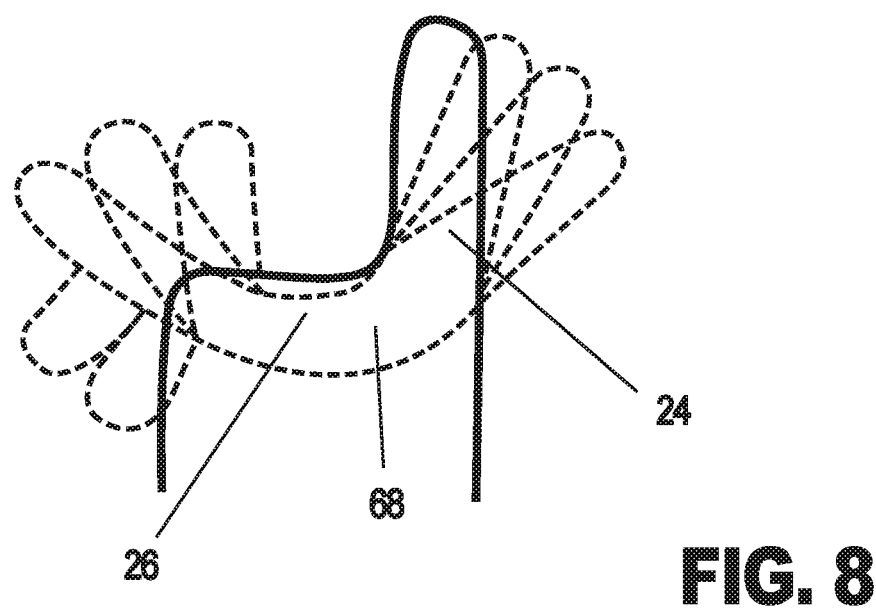
FIG. 8 is a side view of the integrated safety seat different inclinations in a plurality of angles provided by the internal mechanisms in the center of a seat bottom together with a back.

FIG. 8 shows the integrated safety seat 10. The concave shape or regular shape of seat bottom 26 and back 24 including the cradle 68, transition between the upward and downward inclined positions, with inclinations provided by the internal mechanism of seat bottom 26 together with back 24, which gives a plurality of angles of inclination on both Position 1 or rear facing placement and Position 2 or forward facing placement configured to provide the adequate seating to an occupant from infancy up to adulthood. The integrated safety 10 seat provides the feature of inclination of the seat, on seat bottom 26 and back 24, including the cradle 68.

Figure 9:
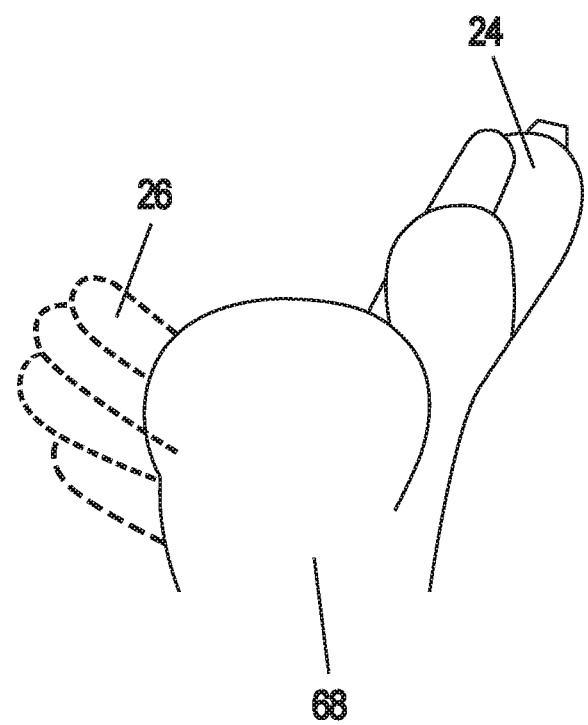
FIG. 9 is a side view of the armrests of integrated safety seat, on the sides of seat bottom and back, that elevate from below manually, electronically, or by other means, to different heights configured to protect the child.

FIG. 9 shows the armrests or side protections of the integrated safety seat 10, on both sides of the seat bottom 26 and the back 24, with different heights of elevation. The elevations have different levels reaching a height of Approx. 15 inches. These armrests are configured to protect the child all along the seat 10 through the growing stages of his development, especially against side impacts. The armrests raise electronically, manually, or by other means, and may have a remote control together with the features of inclination of the seat 10. The armrests before the elevation have a height of approximately 5 inches.

Figure 10:
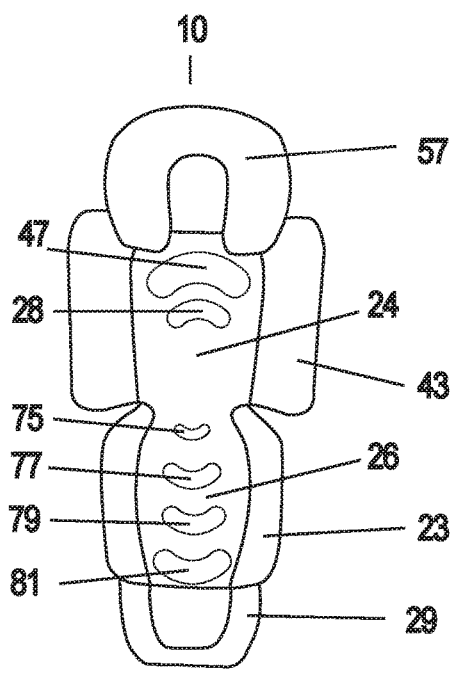
FIG. 10 is a view of head/foot rests in the integrated safety seat.

FIG. 10 shows the integrated safety seat 10 head/foot rest 29 support at the extreme of seat bottom 26 and head/foot rest support 57 at the extreme of back 24, with a rounded shape and a protruding edge of approximately 7 to 10 inches with a soft and cushioned interior texture, configured to protect the skull and neck of the child, as he develops and grows from infancy to adulthood. All other head/foot rests in seat 10, which are head/foot rests 75, 77, 79, 81, 28, 47, are integrated into the upholstery and lifted out as needed, are from the same or a matching texture as head/foot rests support 29 and 57, covered with the same upholstery, or matching, as the rest of the seat 10 as well as the seat décor of the regular seats in the vehicle. The head foot rest support 29 and the head/foot rest support 57 may have additional internal head/foot rests also named 29 and 57 respectively, configured for an occupant who requires more support. FIG. 25.

Figure 11:
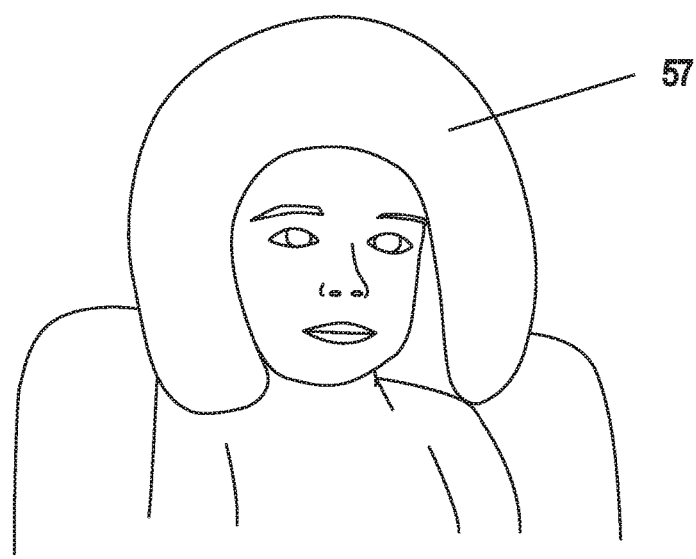
FIG. 11 is a view of the head/foot rests in the integrated safety seat.

FIG. 11 shows the integrated safety seat 10 detail of head/foot rests 57 rounded shape and protruding edge of approximately 7 to 10 inches, with a soft and cushioned interior texture.

FIG. 12A-12B show a view of a concave shape or regular shape, seat bottom 26 and back 24 transition between an upward and downward inclined position configured for a newborn infant from when he is born until 6 months, placed in the Cradle Position 68 in the integrated safety seat 10, a base 90 is shown. In FIG. 12B the integrated safety seat 10 is shown with base 90 in which the internal mechanisms of the device are structured, in the seat bottom 26 harness 22 with hasp 46 and lap-belts 27 with hasps 11, head/foot rests 75, 77, 79, 81, 29 are shown. In the back 24 lap-belts 27, head/foot rest 28, 47, 57 are shown, armrests 23 and 43 are shown with buttons 65 and 69 respectively, a button 67 for external armrest 23 is shown.

FIG. 12A shows the bare structure of the integrated safety seat 10 and FIG. 12B shows the complete integrated safety seat 10.

The means of inclination to upright and downward positions are given by sliding, rotational, stationary base with elevations, amongst other mechanisms. FIG. 27.

FIG. 13A-13B shows a view of a concave or regular shape, seat bottom 26 and back 24 transition between an upward and downward inclined position configured for an infant from 6 months to 1 year placed in a rear facing position—Position 1, in the integrated safety seat 10.

Cradle 68 is shown. The seat bottom 26 and back 24 are provided with a mechanized recline to convert the seat to rear facing, with head/foot rests 29 and 57 that also recline in multiple angles. A base 90 is shown.

The means of inclination to upright and downward positions are given by sliding, rotational, stationary base with elevations, amongst other mechanisms. FIG. 27.

In FIG. 13B the integrated safety seat 10 is shown with base 90 in which the internal mechanisms of the device are structured, in the seat bottom 26 harness 22 with hasp 46 and lap-belt 27 with hasp 11, head/foot rests 75, 77, 79, 81, 29 are shown. In the back 24 lap-belts 27, head/foot rest 28, 47, 57 are shown. The safety seat may be united or separated from other seats.

FIG. 13A shows the bare structure of the integrated safety seat 10.

FIG. 13B shows the complete integrated safety seat 10.

FIG. 14A-14B shows a view of a concave or regular shape seat bottom 26 and back 24 transition between an upward and downward inclined position configured for a child from 1 to 2 years old placed in a rear facing position—Position 1, in the integrated safety seat 10. Cradle 68 is shown. The seat bottom 26 and back 24 are provided with a mechanized recline to convert the seat 10 to rear facing, with head/foot rests that also recline in multiple angles. A base 90 is shown.

The means of inclination to upright and downward positions are given by sliding, rotational, stationary base with elevations, amongst other mechanisms. FIG. 27.

In FIG. 14B the integrated safety seat 10 is shown with base 90 in which the internal mechanisms of the device are structured, in the seat bottom 26 harness 22 with hasp 46 and lap-belts 27 with hasp 11, head/foot rests 75, 77, 79, 81, 29 are shown. In the back 24 lap-belt 27, head/foot rest 28, 47, 57 are shown. The safety seat may be united or separated from other seats.

FIG. 14A shows the bare structure of the integrated safety seat 10.

FIG. 14B shows the complete integrated safety seat 10.

FIG. 15A-15B shows a view of a concave or regular shape seat bottom 26 and back 24 transition between an upward and downward inclined position configured for a child from 2 to 4 years old placed in a rear facing position—Position 1, in the integrated safety seat 10. Cradle 68 is shown. The seat bottom 26 and back 24 are provided with a mechanized recline to convert the seat to rear facing, with head/foot rests that also recline in multiple angles. A base 90 is shown.

The means of inclination to upright and downward positions are given by sliding, rotational, stationary base with elevations, amongst other mechanisms. FIG. 27.

In FIG. 15B the integrated safety seat 10 is shown with base 90 in which the internal mechanisms of the device are structured, in the seat bottom 26 harness 22 with hasp 46 and lap-belts 27 with hasp 11, head/foot rests 75, 77, 79, 81, 29 are shown. In the back 24 harness 25 with hasp 32, head/foot rest 28, 47, 57 are shown. The safety seat may be united or separated from other seats.

FIG. 15A shows the bare structure of the integrated safety seat 10.

FIG. 15B shows the complete integrated safety seat 10.

FIG. 16A-16B shows a view of a concave or regular shape seat bottom 26 and back 24 transition between an upward and downward inclined position configured for a child from 2 to 4 years old placed in a forward facing position—Position 2, in the integrated safety seat 10. Cradle 68 is shown. The seat bottom 26 and back 24 are provided with a mechanized recline to convert the seat 10 forward facing, with head/foot rests that also recline in multiple angles. A base 90 is shown.

The means of inclination to upright and downward positions are given by sliding, rotational, stationary base with elevations, amongst other mechanisms. FIG. 27.

In FIG. 16B the integrated safety seat 10 is shown with base 90 in which the internal mechanisms of the device are structured, in the seat bottom 26 lap-belts 27 with hasps 11, head/foot rests 75, 77, 79, 81, 29 are shown. In the back 24 harness 25 with hasp 32, lap-belt 27, head/foot rest 28, 47, 57 are shown. The safety seat may be united or separated from other seats.

FIG. 16A shows the bare structure of the integrated safety seat 10.

FIG. 16B shows the complete integrated safety seat 10.

FIG. 17A-17B shows a view of a concave or regular shape seat bottom 26 and back 24 transition between an upward and downward inclined position configured for a child from 4 to 6 years old placed in a forward facing position—Position 2, in the integrated safety seat 10. Cradle 68 is shown. The seat bottom 26 and back 24 are provided with a mechanized recline to convert the seat 10 from forward facing, with head/foot rests that also recline in multiple angles. A base 90 is shown.

The means of inclination to upright and downward positions are given by sliding, rotational, stationary base with elevations, amongst other mechanisms. FIG. 27.

In FIG. 17B the integrated safety seat 10 is shown with base 90 in which the internal mechanisms of the device are structured, in the seat bottom 26 lap-belt 27 with hasp 11 is shown, head/foot rests 75, 77, 79, 81, 29 are shown. In the back 24 harness 25 with hasp 32, head/foot rests 28, 47, 57 are shown. The safety seat may be united or separated from other seats.

FIG. 17A shows the bare structure of the integrated safety seat 10.

FIG. 17B shows the complete integrated safety seat 10.

FIG. 18A-18B shows a view of a concave or regular shape seat bottom 26 and back 24 transition between an upward and downward inclined position configured for a child from 6 to 8 years old and above placed in a forward facing position—Position 2, in the integrated safety seat 10. Cradle 68 is shown. The seat bottom 26 and back 24 are provided with a mechanized recline to convert the seat forward facing, with head/foot rests that also recline in multiple angles. A base 90 is shown.

The means of inclination to upright and downward positions are given by sliding, rotational, stationary base with elevations, amongst other mechanisms. FIG. 27.

In FIG. 18B the integrated safety seat 10 is shown with base 90 in which the internal mechanisms of the device are structured, in the seat bottom 26 lap-belt 27 with hasp 11, head/foot rests 75, 77, 79, 81, 29 are shown. In the back 24 harness 25 with hasp 32, head/foot rest 28, 47, 57 are shown. The safety seat may be united or separated from other seats.

FIG. 18A shows the bare structure of the integrated safety seat 10.

FIG. 18B shows the complete integrated safety seat 10.

FIGS. 19A-X, 19A-Y, 19B show a view of a concave or regular shape seat bottom 26 and back 24 transition between an upward and inclined position configured for a child from 2 to 4, to 6, to 8 years old, to adulthood placed in a forward facing position—Position 2, in the integrated safety seat, and inclinations of lower extreme of the seat bottom 26 and additional inclination of the head/foot rests 29. Cradle 68 is shown. The seat bottom 26 and back 24 are provided with a mechanized recline to convert the seat forward facing, with head/foot rests that also recline in multiple angles. Additional inclinations in the last ⅓ of lower extreme of seat bottom 26 is shown. Independent inclination of head/foot rest support 29 is shown. A base 90 is shown.

The means of inclination to upright and downward positions are given by sliding, rotational, stationary base with elevations, amongst other mechanisms. FIG. 27.

In FIG. 19B the integrated safety seat 10 is shown with base 90 in which the internal mechanisms of the device are structured, in the seat bottom 26 hasp 11, head/foot rests 75, 77, 79, 81, 29 are shown. In the back 24 harness 25 with hasp 32, lap-belts 27, head/foot rest 28, 47, 57 are shown. The safety seat may be united or separated from other seats.

FIG. 19A-X-FIG. 19A-Y show the bare structure of the integrated safety Seat 10.

FIG. 19B shows the complete integrated safety seat 10.

FIGS. 20A-X, 20A-Y, 20B show a view of a concave or regular shape seat bottom 26 and back 24 transition between an upward and downward inclined position configured for a child from newborn to 2, to 4, to 6, to 8 years old, to adulthood, placed in a rear facing position—Position 2, in the integrated safety seat 10. Cradle 68 is shown and inclinations of lower extreme of back 24 and additional inclination of the head/foot rests 57 are shown. The seat bottom 26 and back 24 are provided with a mechanized recline to convert the seat 10 to rear facing, with head/foot rests that also recline in multiple angles. Additional inclination in the last one-third of lower extreme of back 24 is shown. Independent inclination of head/foot rest support 57 is shown. A base 90 is shown.

The means of inclination to upright and downward positions are given by sliding, rotational, stationary base with elevations, amongst other mechanisms. FIG. 27.

In FIG. 20B, the integrated safety seat 10 is shown with base 90 in which the internal mechanisms of the device are structured, in the seat bottom 26 harness 22 with hasp 46 and lap-belt 27 with hasps 11, head/foot rests 75, 77, 79, 81, 29 are shown. In the back 24 head/foot rest 28, 47, 57 are shown. The safety seat may be united or separated from other seats.

FIGS. 20A-X, 20A-Y show the bare structure of the integrated safety seat 10.

FIG. 20B shows the complete integrated safety seat 10.

The means of inclination to upright and downward positions are given by sliding, rotational, stationary base with elevations, amongst other mechanisms. FIG. 27.

FIG. 21 shows a view of the headrests and footrests within the integrated safety seat 10.

The head/foot rest supports at the extremes 29 and 57 that incline independently to multiple angles of the integrated safety seat 10 are shown. The internal head/foot rests of the seat-bottom and back of the seat 10 may raise and expand manually or electronically from the surface of the upholstery.

The headrests or footrests may be rounded, with a protruding edge, and cushioned, at the extremes of the integrated seat, and in the internal seat bottom 26 and back 24 including the cradle.

In the seat bottom 26 the internal headrest and footrests are 75, 77, 79, 81 controlled by buttons 83, 85, 87, 89, being 75 configured to be the headrest for a newborn. In the back 24 the internal headrest and footrests are 28, 47 and 57 controlled by buttons 8, 7 and 17, being 8 the headrest configured for a child from the ages of 2 to 4 years old.

The headrests and footrests in use in seat bottom 26 and back 24 may raise and expand manually or electronically or by other means, and the protruding head/foot rests along the surface of the seat bottom and the protruding head/foot rest along the surface of the back are configured for each age and size group, from infancy to adulthood.

The inclinations and elevations of head/foot rests supports, and internal head/foot rests are given by the means of inclinations described in the FIG. 27, or other mechanisms.

FIGS. 22A, 22B, 22C, 22D show a view of the armrests 23 and 43 or side protections within the integrated safety seat 10—FIG. 9, that may elevate to different heights on both sides of the seat 10, configured to provide protection to the occupant against side impact, and the armrests may also surround the edges of the headrests and/or footrests supports at the extremes 29 and 57. The armrests or side protections may elevate to different levels of approximately 5, 10 or 15 inches manually or electronically, by pneumatic inflatable bladders, by power, or by other means. In the seat bottom 26 the armrests 23 may elevate with button 65. In the back 24 the armrest 43 may elevate with button 69. A base 90 is shown.

Figure 22:
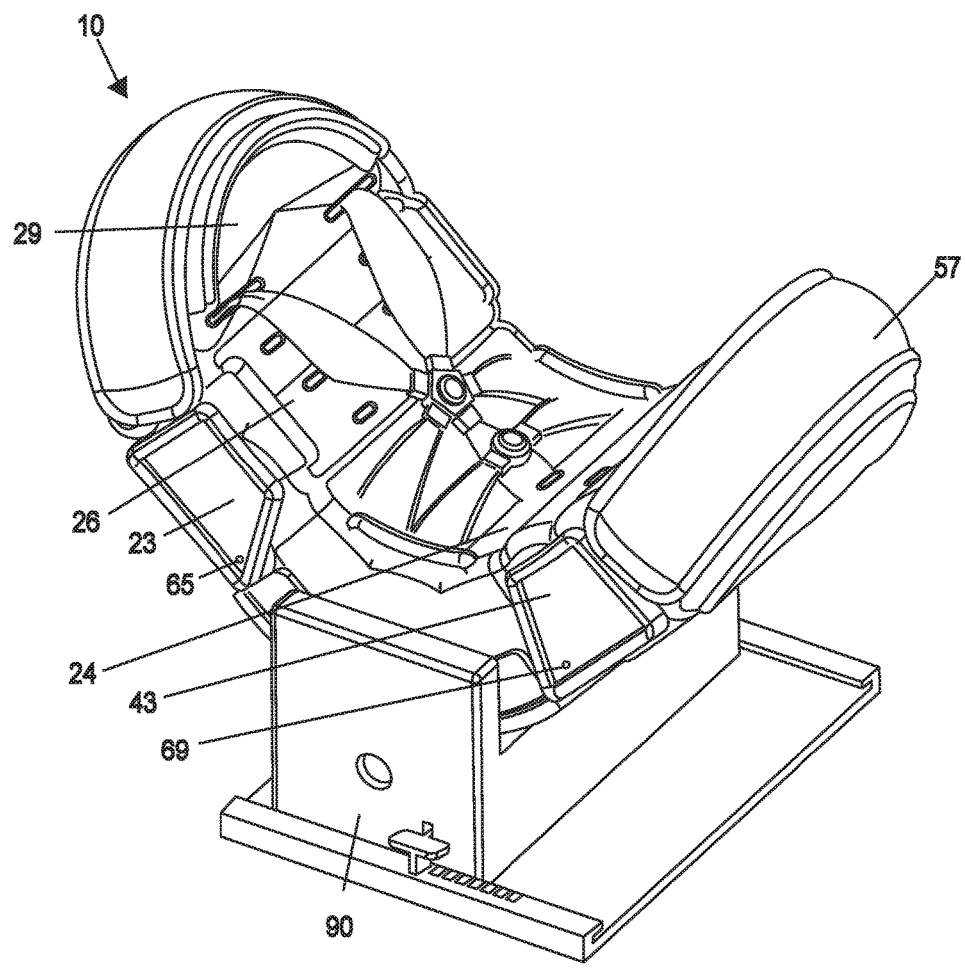
Figure 22:
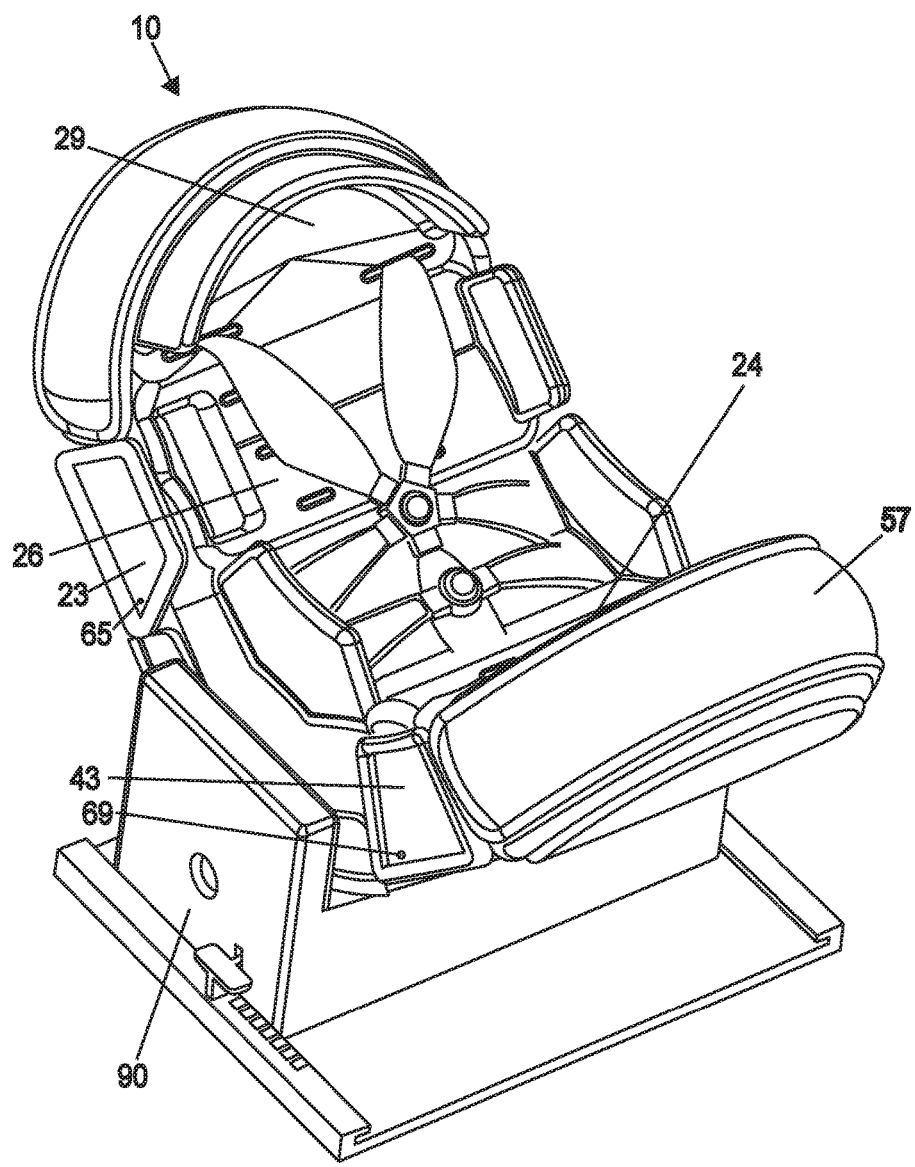
Figure 22:
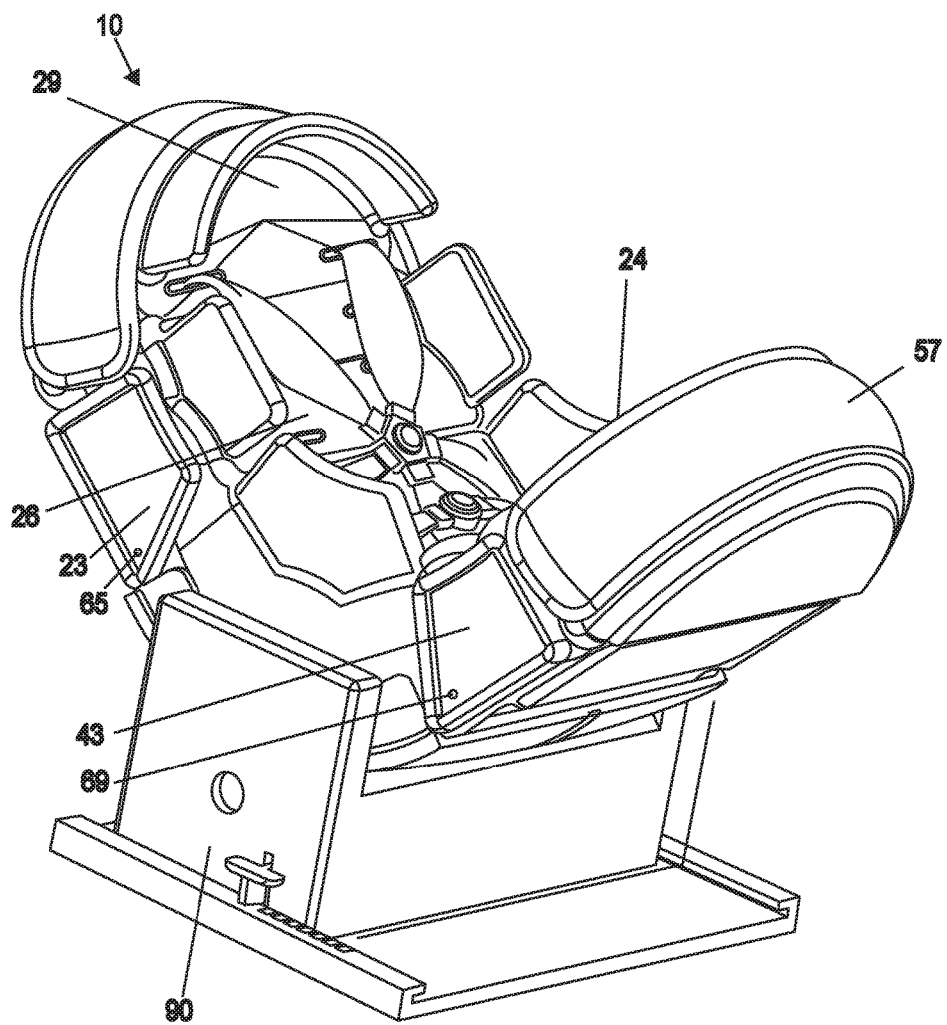
Figure 22:
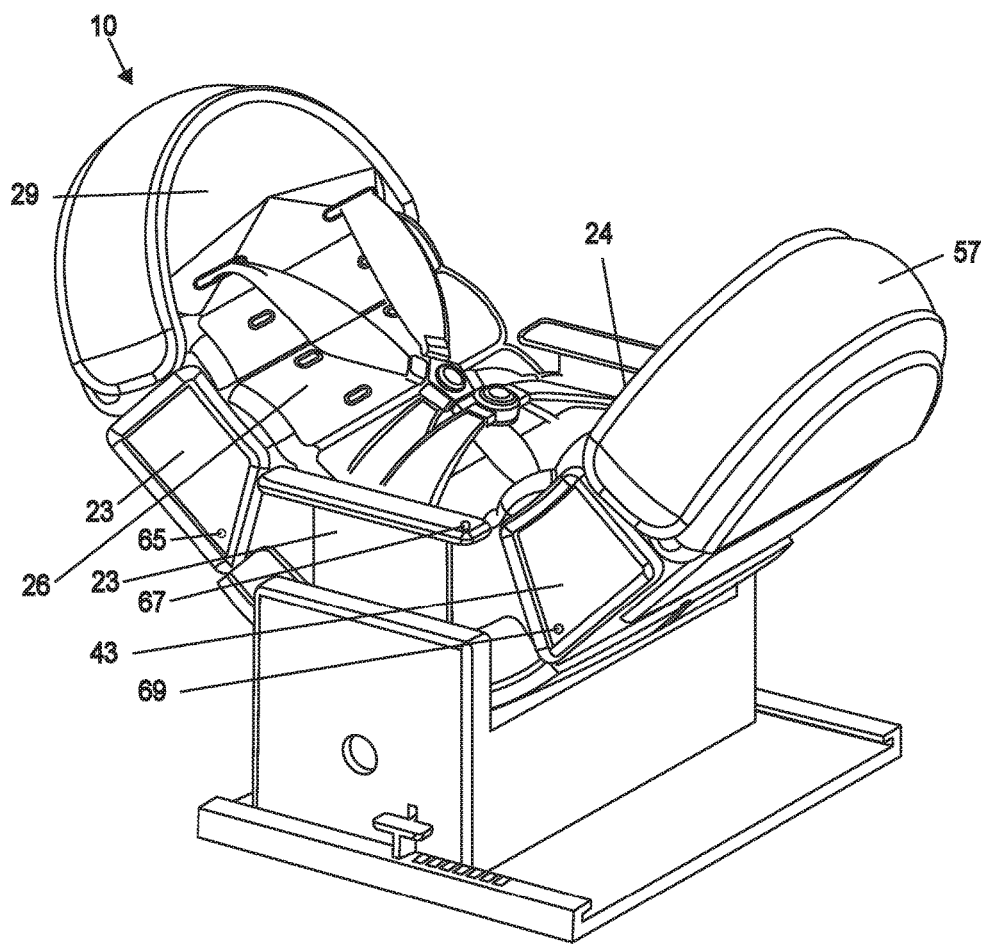

In FIG. 22D there is an additional armrest 23 that elevates with button 67 from the outer sides of the armrests of the center of seat bottom 26 and back 24 in the cradle area to provide an alternative barrier of side protection.

The elevations of armrests are given by the means of elevations described in FIG. 27 or other mechanisms.

FIG. 23A, 23B show a view of the harnesses with hasps and lap-belts with hasps that may be all along the seat-bottom 26 and back 24 in different sections, including the cradle, within the integrated safety seat, in which the straps of harnesses and lap-belts may have a triangular shape, be cushioned and wide, and may have the same or matching upholstery of the seat. The harnesses and lap-belts may be pulled out of the orifices in the upholstery.

The harnesses and hasps are extracted from different orifices 21 in the sections of the seat bottom 26 and back 24, including the cradle, secured by a pinned mechanism when they are connected or adjusted into the orifices by connector 66 or by a retractable mechanism when they are pulled out by connector 66, or by other means. The orifices that are not in use may be covered by a cap with the same upholstery, while harnesses not in use may be covered with padding. Other mechanisms can also extract the straps or harnesses from the upholstery.

There may be one pair or four or more pairs of harnesses on seat bottom 26 and one pair of harnesses up to four or more pairs of harnesses on back 24 configured to secure the occupant's size, as well as at least a pair of harnesses in the cradle area. The harness or harnesses 22 with hasp 46 in seat bottom 26 and harness or harnesses 25 with hasp 32 in back 24 internally integrated into the safety seat 10, may be integrated outside the surface of the upholstery, or may be internal in a conveyor belt and extracted by connector 66 from the pair of orifices in use and be retractable. There can be an independent pair of harnesses for each pair of orifices, or harnesses that adapt to all sizes. There can be buttons between the harnesses configured to better secure the harnesses' straps on both sides of the occupant's chest. The lap-belts 27 with hasp 11 that are pulled out from the sides in different sections of seat bottom 26 and back 24 including the cradle between them, may also be retractable. The harnesses or lap-belts not in use may be covered by padding adjusted to the internal edges of the seat bottom 26 and back 24 and are cushioned with upholstery. All harnesses and lap-belts can be fastened into an integrated hasp with multiple hooks in a diamond shape, FIG. 28, one for the seat bottom 26 and one for the back 24, including the cradle.

FIG. 24A, 24B show a view of inserts and padding protectors within the integrated safety seat 10 provided as part of the design configured to make the seat 10 narrower or wider in at least 3 or 4 different sizes, or to create barriers. There are at least two inserts configured in the section for newborns on the sides of the cradle section of seat bottom 26 and back 24 and at least one insert on the consecutive sections of seat bottom 26 and back 24.

The inserts are 74 for all, the padding is 76 for all. The paddings may serve to cover areas that are not in use in the integrated seat bottom 26 and back 24 such as harnesses and hasps and lap-belts and hasps that or not in use, while other of the restraints configured to the age and size of the occupant are utilized. Orifices for harnesses 21 are shown. The elevations of inserts are described in the means of internal mechanisms of FIG. 27.

FIG. 25 shows a view of an integrated safety seat 10 with integrated cushioned vest(s) 72 with the same or a matching fabric of the upholstery rolled up internally in the edges of the inner sides of the seat, or pulled out with a mechanized system, configured for every size group of occupants' upper body, which is unrolled from each side accordingly and both sides are closed together on top of the center of the occupant's upper body by a zipper or buttons, adherent fabric or by other means, and may be cushioned, or inflatable, for more protection. The vest may have an opening for the arms, in order to protect the shoulders, or it may be in the shape of a strip for the upper body. The vest is an additional complement to the harnesses and lap-belts. In seat bottom 26 head/foot rest 29, 75, 81, hasp 46, lap-belts 27, hasp 11, armrest 23, button 65, external armrest 23, button 67 are shown. In back 24 head/foot rest 28, 47, 57, armrest 43 button 69, a base 90 are shown.

Figure 26:
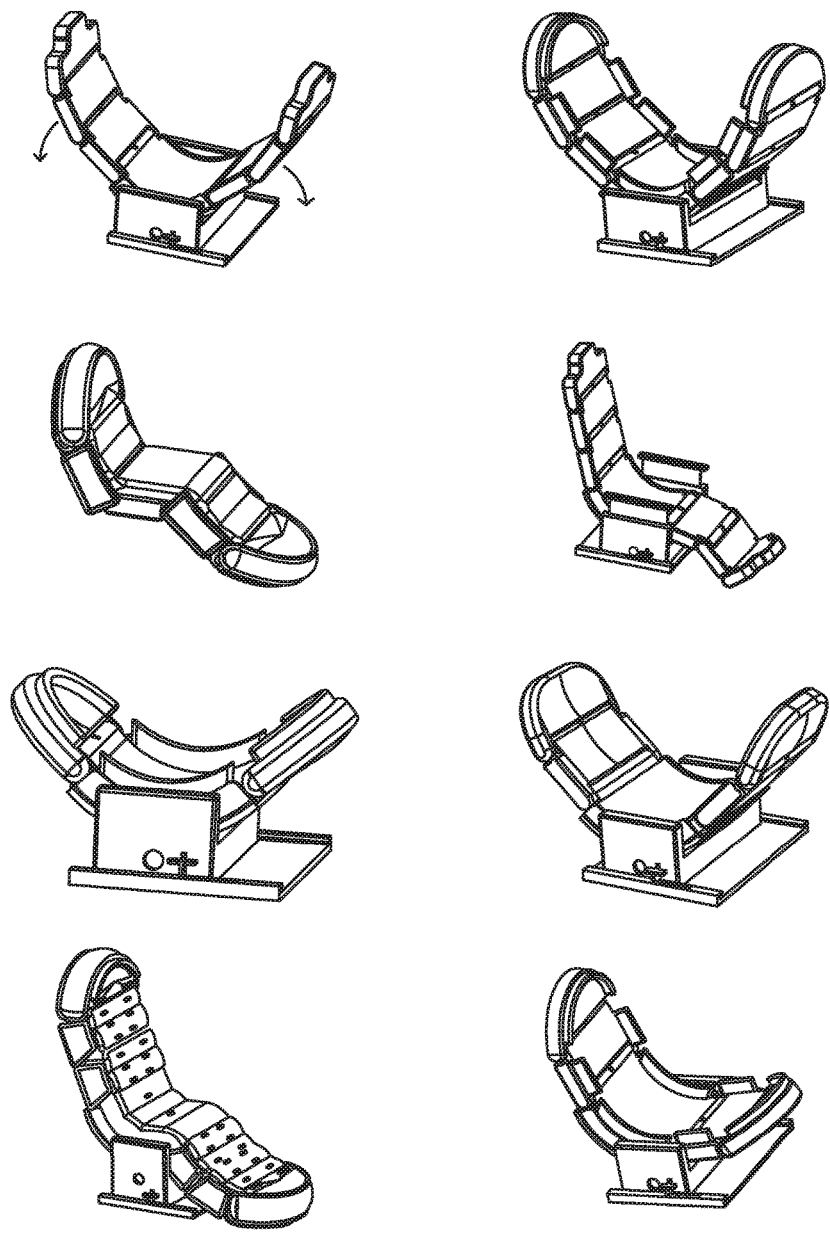
Figure 26:
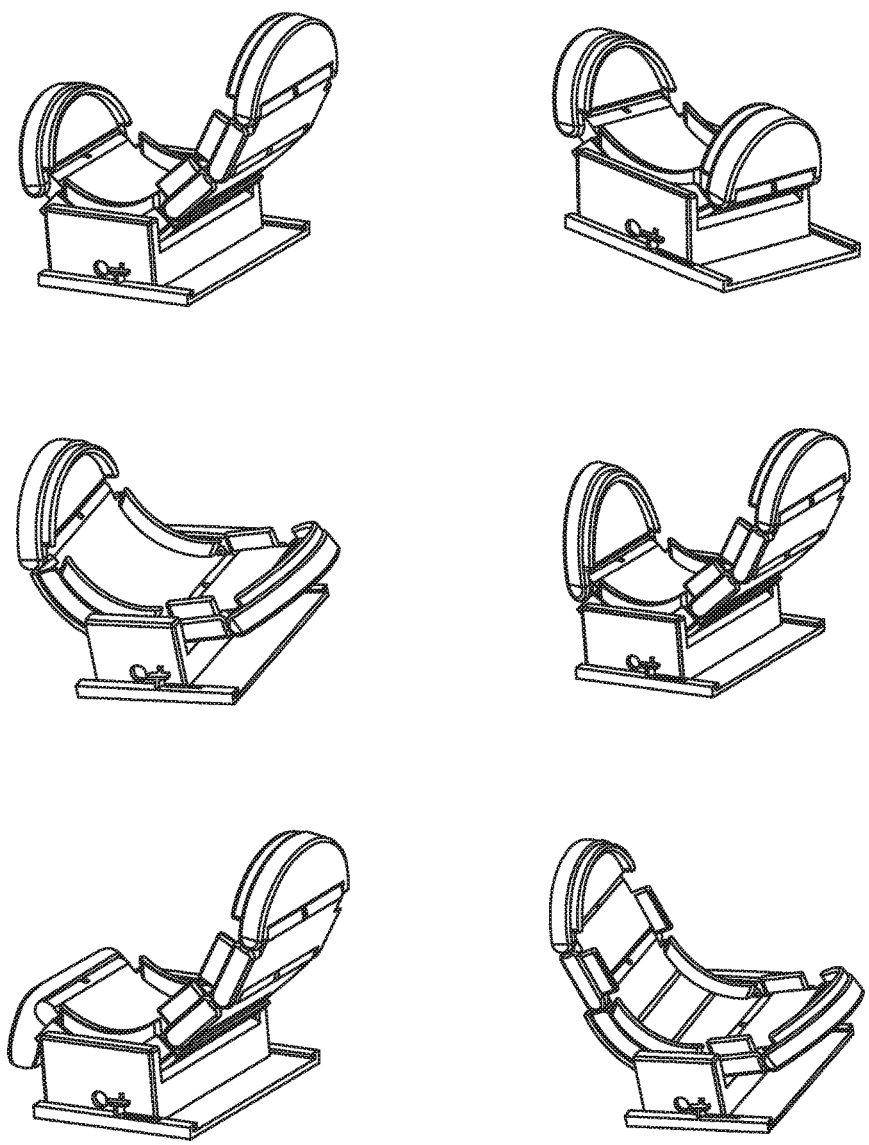

FIG. 26 A, 26B show a view of the integrated safety seat in different models and sizes, configured for an occupant from infancy to adulthood, to be built into vehicles of different sorts and dimensions, and different designs of preferences, for regular, semi-autonomous or autonomous vehicles, as well as other means of transportation. There may be small, medium and large sizes, according to the number of inclination sections of the integrated seat, or according to the length of each section as well as different models according to the design of each vehicle.

FIG. 26B shows the integrated safety seat with a shorter seat bottom. For example, the aircraft model can be the small size or have a shorter seat bottom, etc.

FIGS. 27 (27-1 to 27-13) show a view of the integrated safety seat 10 means of internal inclination mechanisms configured to provide the rear facing position or placement opposite to the driver, and the forward facing position or placement facing the driver, including the cradle position in between for newborns if there is one, all the angles of inclination and elevation are provided smoothly by an internal mechanism that could be defined by the following three embodiments or by others, and all the parts and components of each mechanism hereby described may vary as well as the assembly may vary in the way these inclinations and elevations are provided. Elevations of armrests 23 and 43 are also included in the internal mechanisms, as well as elevations from within the seat bottom and the back.

In the integrated safety seat, the seat bottom 26 together with the back 24 move from the center or cradle 68 and elevate to upward and downward inclined positions. The buttons 31 and 37 control the inclinations and elevations of the center of the seat 68 and part of 26 and 24 in the sections close to the center to upward and inclined positions.

The buttons 41 control the inclinations of the extremes of the seat. Elevations of head/foot rests, inserts and armrests within the seat are given by internal mechanisms.

The internal mechanisms that provide the inclinations and elevations of the seat which are buttons 31, 37, 41 together with the inclinations of the head/foot rests 29, 75, 77, 79, 81, 28, 47, 57, given by buttons 39, 83, 85, 87, 89, 8, 7, 17 and together with armrest 23 and 43 with buttons 65, 69, in addition to other buttons for inserts 74, including other inclinations and elevation buttons or controls to provide inclinations and elevations of the integrated safety seat given by any technology.

The integrated seat 10 has a continuous seat bottom 26 and back 24 and a cradle 68 section in between, wherein the center or cradle 68 between the seat bottom 26 and back 24 may have a concave shape or a regular shape. The integrated seat 10 has a plurality of angles that may be controlled. The seat bottom 26 and back 24 and cradle 68 in between have independent inclinations together or distinct from the center cradle 68 between the seat bottom 26 and back 24, as well as head/foot rests supports 29 and 57 at the extremes of seat bottom 26 and back 24 that also incline together or independently.

The means of inclinations and elevations that move the seat bottom and back include sliding mechanisms of the integrated safety seat given in the First Embodiment.

The means of inclinations and elevations that move the seat bottom and back include a stationary base with elevation mechanisms of the integrated safety seat given by the Second Embodiment.

The means of inclinations and elevations that move the seat bottom and back that include rotation mechanisms of the integrated safety seat given by the Third Embodiment.

There may be other means of inclinations and elevations that include the same or similar inclinations and elevations of the integrated safety seat given by other embodiments.

Means of Inclinations and Elevations

First Embodiment: Sliding Mechanism

There are different embodiments or means of the internal mechanisms included for all the inclinations and elevations of the integrated safety seat 10. The first embodiment or mean of inclination internal mechanisms, is a sliding mechanism, in which the center or cradle 68 of seat bottom 26 and back 24 rests on top of internal base 90 and all the center or cradle 68 of seat bottom 26 and back 24 slides and elevates to upward and inclined positions to Position 1 and Position 2, smoothly moving to a plurality of angles of inclination on both sides.

In the sliding mechanism of the first embodiment, 90 acts as the main rotary support with an affiliated seat base or cradle 68 that rests on bearings 91 and is held in place by a guide rail 92, with a drive wheel 93 that is attached to drive motor 94 and held in location by a spring 95. The Drive wheel 93 ultimately engages seat base or cradle 68, and a Plunger 96 can be pushed in to cause the drive wheel 93 to slide on motor shaft, this disengages drive and allows manual manipulation of seat base while a lever 97 allows fore/act location of the cradle 90 on base. FIGS. 27-1.

The seat assembly 99 has a gear motor/servo 104 in each section that engage gear drive 107 via splined hollow shaft 105. Drive gear 107 engages in to rack 109 in associated seat section. To disengage gear drive slide 103 is released thereby compressing spring 106 by moving splined shaft 105 away from gear and disengaging spline teeth 108.

The seat assembly 110 has curved seat section 112 that nests into cradle 68, this curved receiver allows the seat to face front or rear facing. Consequently the cradle 68 is free to translate fore and act once lever 97 is raised thereby releasing locking interface between cradle 68 and base plate 111. Seat sections 98 can adjust accordingly either electronically by activating motors or manually through releases. FIGS. 27-2.

In the main seat-gear drive, the drive wheel 93 is engaged with the toothed track 113 in seat 112. When plunger 96 is depressed and drive gear 93 goes in to pocket 114, it allows the drive wheel to spin freely. FIGS. 27-6.

In the integrated seat 10, rear facing, the seat assembly is configured such to allow the occupant to face towards the rear, and forward facing, it allows the occupant to face towards the front. The armrests elevations internal mechanisms given by the seat assembly 98 is comprised of sections 99 and that of 100 that are free to rotate around rotary axis 101. Section 100 is similar to 99 except for its shape. The pneumatic bladders 102 can be inflated to provide a side support configured for individuals, or side support may be given by other means. FIG. 27-3. In the cradle 68 with retractable armrests, there are elevations in which the cradle 68 has the option of retractable armrests 115. The armrest height is controlled by gear motor 116 that has a gear 117 that positions track 118 thereby raising and lowering armrest. FIGS. 27-7. The sliding embodiment internal mechanism can also be given by hinges of assembly 99 that make the seat scroll from the rear facing to the forward facing position and from the forward facing position to the rear facing position and all their inclinations. FIG. 27-5.

Second Embodiment—Stationary Center

The $2^{nd}$ Embodiment of internal mechanisms or means of inclinations and elevations of the integrated safety seat, includes a stationary base mechanism.

In the stationary second embodiment of internal mechanisms, a fixed cradle mechanism, in which the center or cradle 68 of seat bottom 26 and back 24 stays stationary over internal cradle or base that supports it, while the other consecutive sections of seat bottom 26 and back 24 move with a plurality of angles of inclination in the different sections. The cradle may also elevate in its place.

In the stationary seat with movable sections of the second embodiment, the seat is very similar to the previous embodiment where the independent sections can all move around their respective axes. The center seat 120 in this embodiment stays stationary whilst everything pivots in relationship to it. Elevations of stationary cradle are shown. FIGS. 27-9.

Third Embodiment: Rotating Mechanism

The $3^{rd}$. Embodiment of inclinations and elevations of the integrated safety seat, includes a rotational mechanism.

In the Rotating third embodiment of inclination internal mechanism, the center of the cradle 68 of seat bottom 26 and back 24 inclines by rotating over the main axis 122, and seat bottom 26 and back 24 incline to a plurality of angles on both sides, with security barriers included in mechanism, whereas the motor 128 of seat assembly 121 is placed below the main axis 122.

Figure 12:
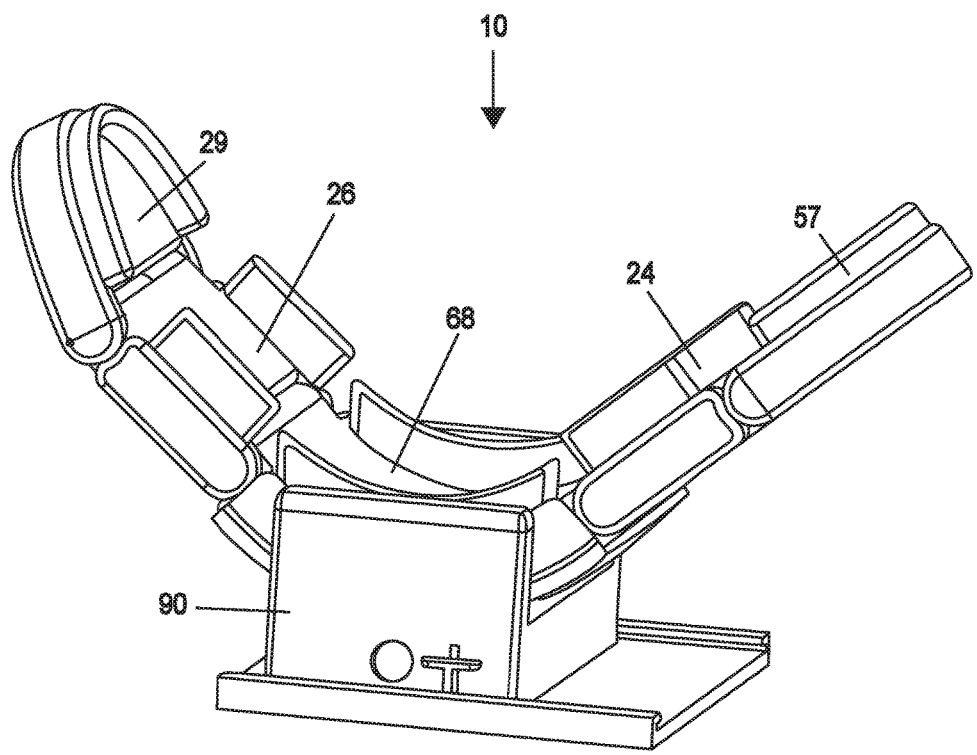
FIG. 12A is a side view of the integrated safety seat configured for a newborn infant from the time he is born until 6 months old placed in the cradle position in the cradle area of the seat.
FIG. 12B is another view of the integrated safety seat configured for a newborn infant from the time he is born until 6 months old placed in the cradle position or placement in the cradle area of the seat.
Figure 12:
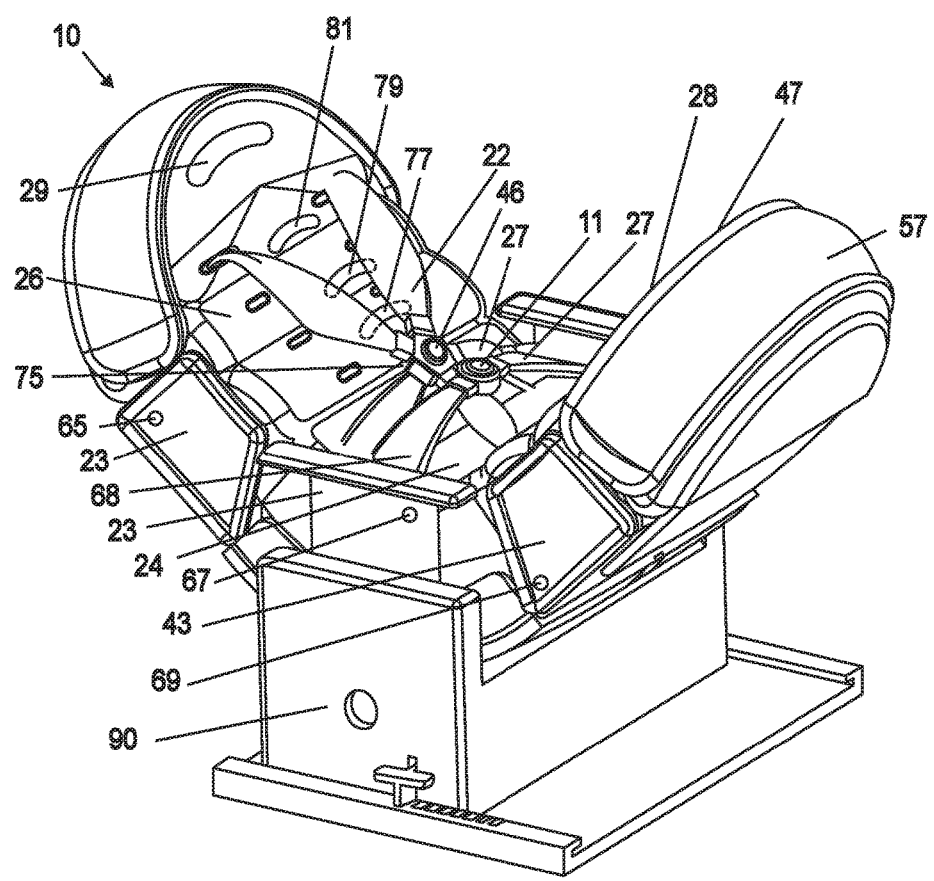

FIGS. 27-10. In the rotating mechanism of the third embodiment, the seat assembly 121 rotates over a main axis 122 with two bearings 123 on each side. FIGS. 27-12. A toothed spring 124 is fixed to the main base of seat which is the center of seat bottom and back, as well as to the main axis. The tooth spring 124 is activated by a spline teeth long gear 125. Two steel pins 126 block the toothed spring 124 to adjust the seat to the required position as a security barrier. Another security barrier is the clutch 127 that connects and disconnects the motor of the gear system, enabling manual action. It is mechanically united to the steel pins 126. If the clutch 127 is engaged the steel pins 126 are released. Another security barrier are proximity sensors that block the feeding of the motor, as well as the solenoid that activates the clutch 127 with torsion sensors. The motor 128 is placed below the main axis 122. FIGS. 27-11.

Other means of inclination and elevation mechanisms can be used to provide the same inclinations and elevations, additionally from these three embodiments, in the center or cradle, in the other sections of the seat, in the armrests, and other parts. The functionality of the integrated safety seat and its inclinations is provided as a unified structure without any construction or openings or detachments.

Detailed Description of FIG. 27: Internal Mechanisms

FIG. 27-1, 1st Embodiment Cradle Assembly

The internal base 90 acts as the main rotary support for cradle 68 and the seat bottom and back of the integrated safety seat. The affiliated seat base rests on bearings 91 and is held in place by guide rail 92. Drive wheel 93 is attached to drive motor 94 and held in location by spring 95. Drive wheel 93 ultimately engages seat base. Plunger 96 can be pushed in to cause the drive wheel to slide on motor shaft. This disengages drive and allows manual manipulation of seat base. Lever 97 allows fore/act location of cradle 68 on base 90, as well as up/down movement of cradle 90.

FIGS. 27-2 $1^{st}$ Embodiment Seat Assembly

Seat assembly 99 has gear motor/servo 104 in each section that engage gear drive 107 via splined hollow shaft 105. Gear drive 107 engages in to rack 109 in associated seat section. To disengage gear drive 107, it is required to simply slide release 103 thereby compressing spring 106 by moving splined hollow shaft 105 away from gear drive 107 and disengaging spline teeth 108.

FIG. 27-3 $1^{st}$ Embodiment Seat Assembly

Seat assembly 98 is comprised of sections 99 and that of seat section 100 that are free to rotate around rotary axis 101. Seat section 100 is similar to seat section 99 except for its shape. Pneumatic bladders 102 can be inflated to provide a side support for occupants.

FIG. 27-4 $1^{st}$ Embodiment Main Seat

Seat assembly 110 has a curved seat section 112 that nests into cradle 68. This curved receiver allows the seat to face front or rear facing. Consequently 68 is free to translate fore and aft once lever 97 is raised thereby releasing locking interface between cradle 68 and base plate 111. Seat sections 98 can adjust accordingly either electronically by activating motors or manually through releases. The bladders 102 extended for side support are shown.

FIGS. 27-5 The sliding embodiment internal mechanism can also be given by hinges or the same assembly 99 that make the seat scroll from the rear facing to the forward facing position and from the forward facing position to the rear facing position and all their inclinations.

FIG. 27-6 $1^{st}$ Embodiment Main Seat-Gear Drive

Drive wheel 93 is shown in both positions. One where it is engaged with the toothed track 113 in seat 112. The other when plunger 96 is depressed and drive gear 93 goes in to pocket 114 allowing the drive wheel to spin freely.

FIG. 27-7 $1^{st}$ Embodiment Cradle Assembly with Retractable Armrests.

Cradle assembly 90 is shown with the option of retractable armrests 115. Armrest height is controlled by gear motor 116 that has a gear 117 that positions track 118 thereby raising and lowering armrest.

FIG. 27-8 $1^{st}$ Embodiment Cradle Assembly with Retractable Armrests.

The retractable armrests 119 that is external to the seat is shown on both sides of the cradle section of the integrated safety seat, as it elevates.

The means of elevation of the head/foot rests 75, 77, 79, 81, 28, 47 within the integrated safety seat along the seat bottom and back and the cradle in between, are given by any technology, including inflatable pneumatic bladders, manual extraction of a cushioned rest, or any other technology.

The means of elevation of the inserts 74 within the integrated safety seat along the seat bottom and back and the cradle in between, are given by any technology, including inflatable pneumatic bladders, manual extraction of cushioned inserts, or any other technology.

FIG. 27-9 $2^{nd}$ Embodiment Stationary Seat with Movable Sections.

The Second Embodiment of Inclinations and elevations of the integrated safety Seat includes a stationary seat in the central area or cradle, with movable sections.

The means of inclination of the seat is very similar to the previous embodiment where the independent sections can all move around their respective axes. The center seat 120 in this embodiment stays stationary whilst everything pivots in relationship to it.

FIG. 27-10 $3^{rd}$ Embodiment—Rotation Unblocked Position.

FIG. 27-11 $3^{rd}$ Embodiment—Rotation Blocked Position.

FIG. 27-12 3rd Embodiment—Rotation—Seat Inclinations.

The $3^{rd}$ Embodiment of the integrated safety seat includes a rotation mechanisms. The third embodiment or means of inclination internal mechanism is a rotating mechanism, in which the center of the cradle of seat bottom 26 and back 24 inclines by rotating over the main axis 122, and seat bottom 26 and back 24 incline to multiple angles on both sides, with security barriers included in mechanism, whereas the motor 128 of seat assembly 121 is placed below the main axis 122. In the rotating mechanism of the third embodiment, the seat assembly 121 rotates over a main axis 122 with two bearings 123 on each side. A toothed spring 124 is fixed to the main base of seat which is the center of seat bottom and back, as well as to the main axis. The tooth spring 124 is activated by a spline teeth long gear 125. Two steel pins 126 block the toothed spring 124 to adjust the seat to the required position as a security barrier. Another security barrier is the clutch 127 that connects and disconnects the motor of the gear system, enabling manual action. It is mechanically united to the steel pins 126. If the clutch 127 is engaged the steel pins 126 are released. Another security barrier are the proximity sensors that block the feeding of the motor, as well as the solenoid that activates the clutch 127 with torsion sensors. The motor 128 is placed below the main axis 122.

Figure 13:
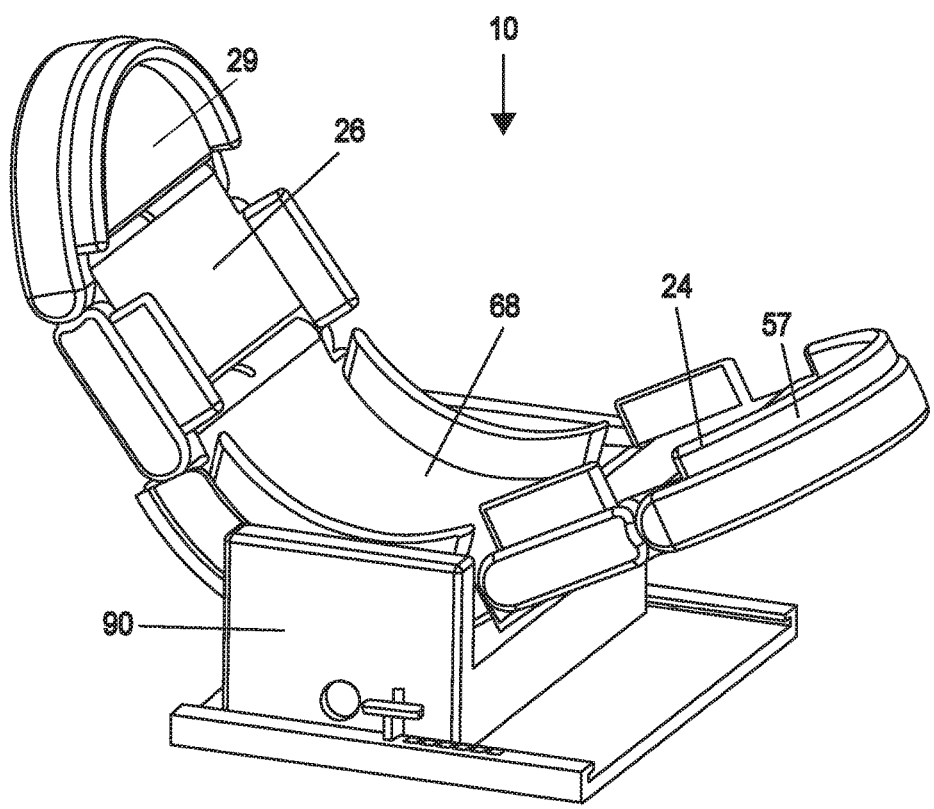
FIG. 13A is a view of the integrated safety seat configured for an infant from 6 months to 1 year placed in a rear facing position.
FIG. 13B is another view of the integrated safety seat configured for an infant from 6 months to 1 year placed in a rear facing position.
Figure 13:
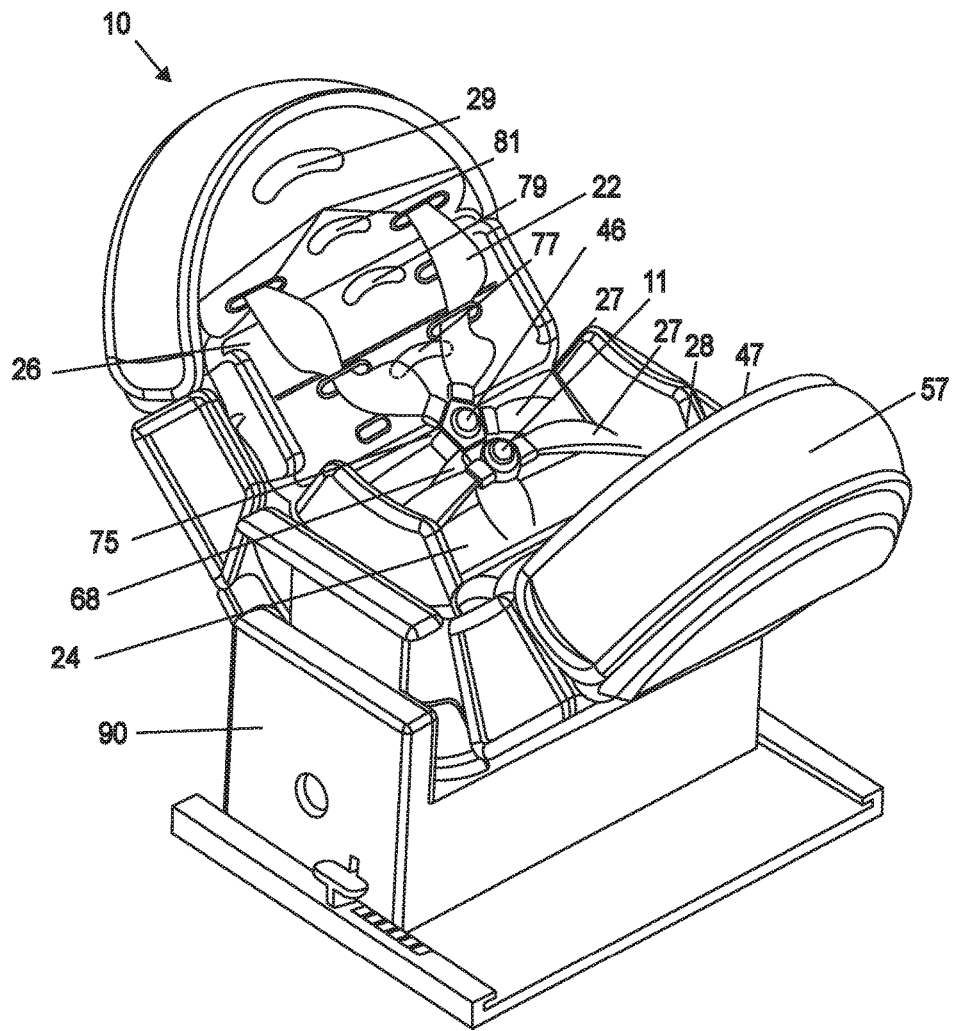
Figure 14:
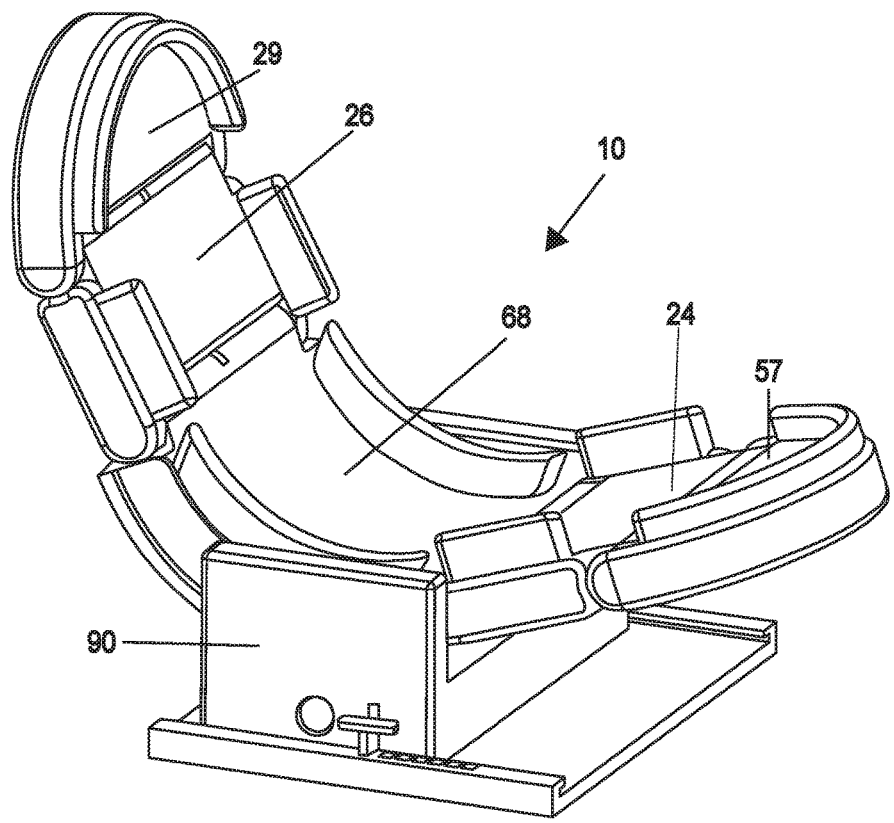
FIG. 14A is a view of the integrated safety seat configured for a child from 1 to 2 years old in a rear facing position.
FIG. 14B is another view of the integrated safety seat configured for a child from 1 to 2 years old in a rear facing position.
Figure 14:
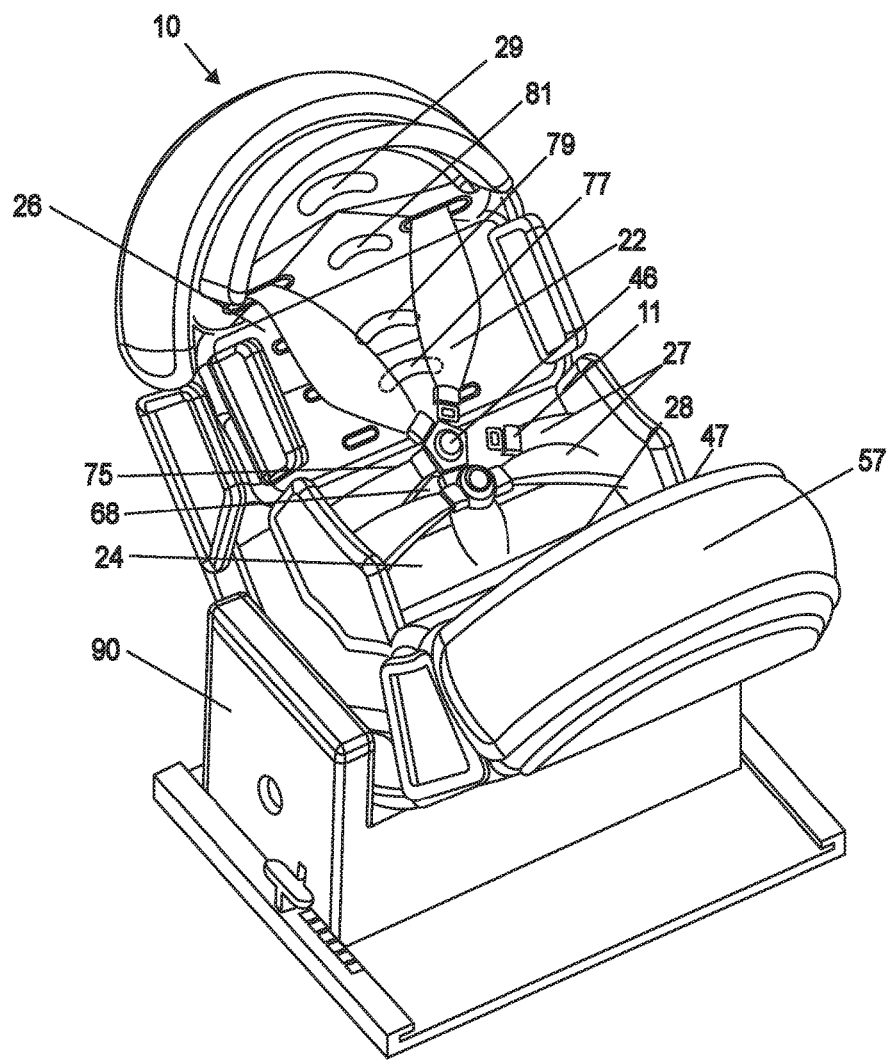
Figure 15:
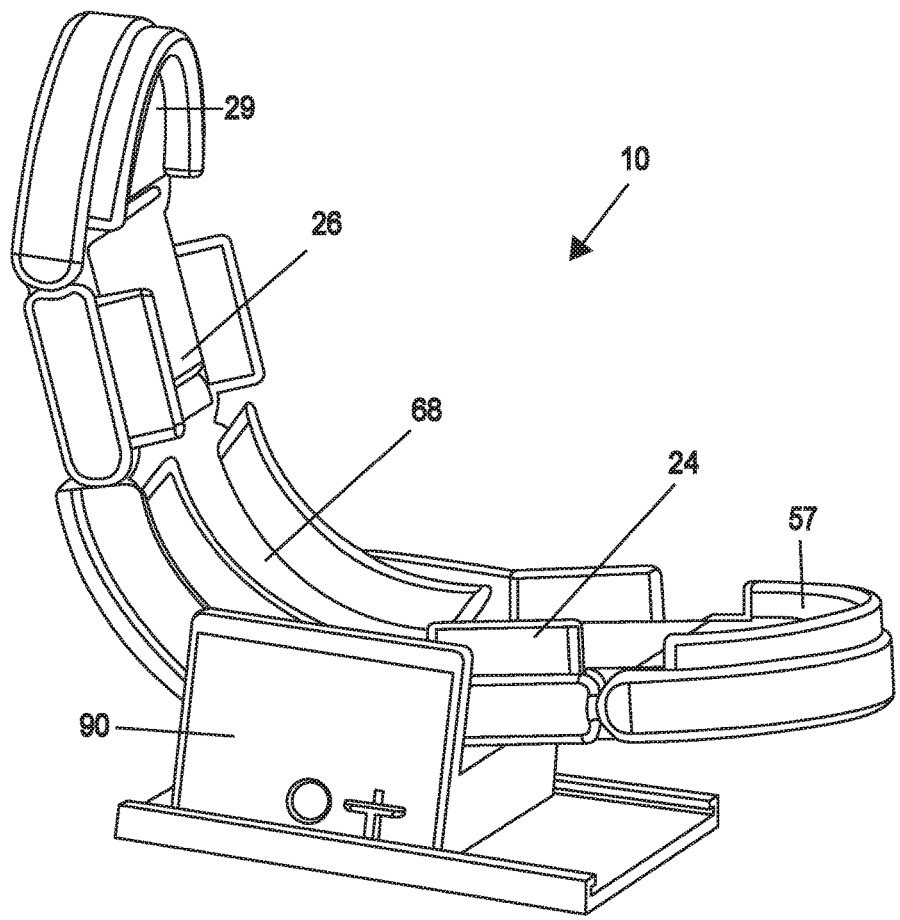
FIG. 15A is a view of the integrated safety seat configured for a child from 2 to 4 years old placed in a rear facing position.
FIG. 15B is another view of the integrated safety seat configured for a child from 2 to 4 years old placed in a rear facing position.
Figure 15:
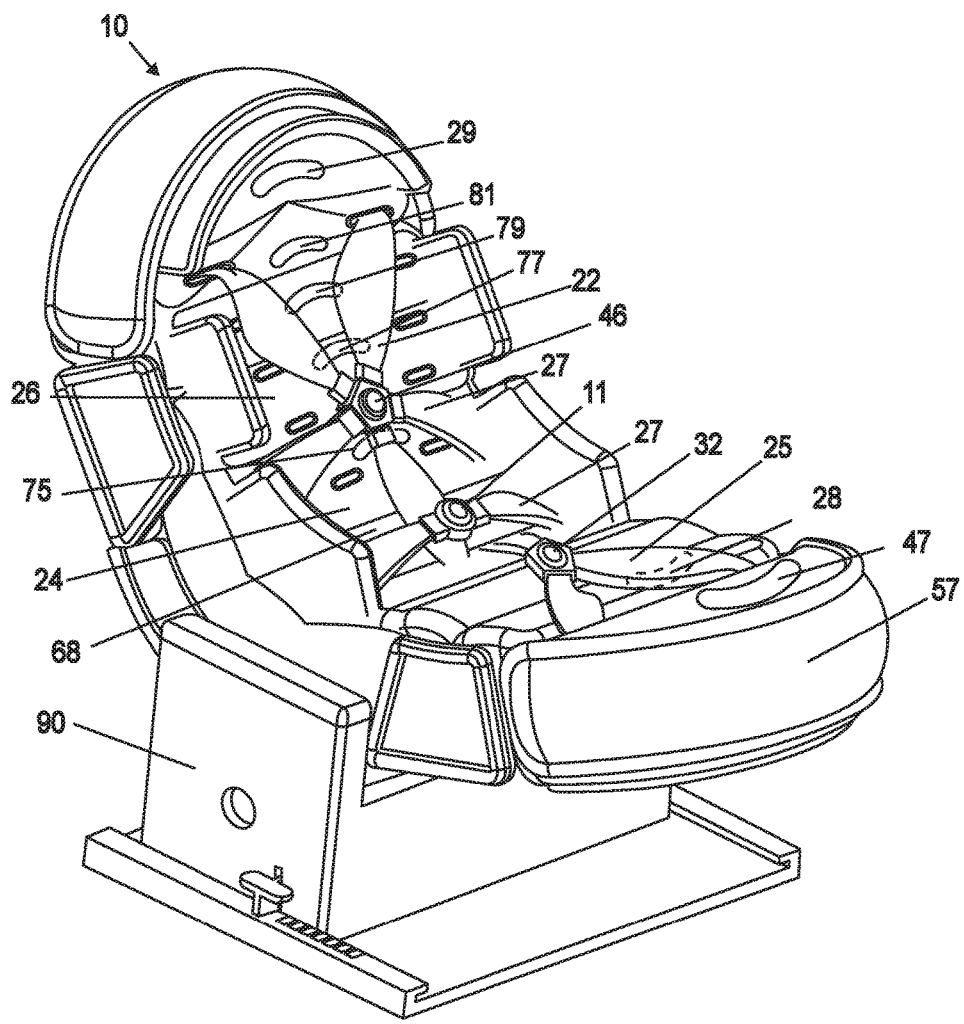

FIG. 27-13 The integrated safety seat may move from the base 90 that is built into the vehicle, forward or backward, as well as upward or downward, by levers 97 or other mechanisms, and may move sideways facing any angle of the vehicle, in order to provide more space in the front of the integrated safety seat or the back of the integrated safety seat, or more or less height for the occupant.

A view is shown of the base 90 of the integrated safety seat which moves the seat upward and downward in FIGS. 27-13*a*, FIG. 27 13*b*, as well as forward and backward in FIGS. 27-13*c*, FIGS. 27-13*d*, and/or sideways in FIGS. 27-13*e*, FIG. 27-13*f*, by lever 97 or any other technology. Base plate 112 and concave or curved section 112 are shown.

All the components or mechanical parts of the means of inclination may vary or be of a different technology.

FIG. 28 shows a hasp with multiple openings to secure harnesses and lap-belts, which may have a diamond shape, and a light in the center indicating the harnesses and lap-belts are fastened into hasp, connected to the controls of the integrated safety seat. The hasps which are numbered 32, 46 for harnesses 22 and 25, and 11 for lap belts 27, are internally connected, and sensors 13 emit signals of the hasps being connected.

An important version of the inventive concept can be fairly generally described as an integrated safety seat permanently built into a rear area in a passenger vehicle united or separated from another seat or other seats, configured for a child from a newborn to adulthood in the rear facing position, and for a child two years old and above including an adult in the forward facing position. There may be more than one integrated safety seats in a vehicle.

The integrated safety seat has an upholstery that matches and smoothly integrates the seat bottom and back of the integrated seat with the other seats in the vehicle. The integrated safety seat may be united, with another seat, or separated from other seats. The integrated safety seat, when it is separated from other seats, has an upholstery that smoothly integrates with the surface, the contours and the structure of the integrated safety seat itself.

The integrated safety seat smoothly inclines and elevates to upward and inclined positions by internal mechanisms to provide the rear facing position, configured for an occupant from newborn infants to adulthood, and the forward facing position for an occupant from newborn infants to adulthood, and the cradle position in between that is part of the seat bottom and back configured for the placement of a newborn, all of these inclinations provide a plurality of angles configured for different ages and sizes.

There may be more than one integrated safety seat 10 in a vehicle. The seat bottom 26 and the back 24 including the cradle 68 in between if there is one, may have a concave shape or a regular shape. The cradle 68 in between the seat bottom 26 and back 24 whether it is concave shape or regular shape has additional inclinations that may be controlled with buttons, or by other means, and the other consecutive sections of the seat bottom 26 and back 24 have separate inclinations together or independently from the center cradle 68 between the seat bottom 26 and back 24 that provide a plurality of angles of inclinations, as well as head/foot rests supports 29 and 57 at the extremes of seat bottom 26 and back 24 that also incline together and/or independently to a plurality of angles, with internal protruding headrests and footrests 75, 77, 79, 81 along the surface of seat bottom 26 and internal head/foot rests 28, 47 along the surface of the back 24 which may elevate or raise and expand and are configured for each age and size group, from a newborn infant to adulthood, with armrests 23 and 43 or side protections on both sides of seat bottom 26 and back 24 which may also be in the edges of the headrests and/or footrest supports 29 and 57 at the extremes of the integrated seat 10 that may elevate to different heights, and one or more harness 22, with hasps 46, and lap-belts 27 with hasp 11 are configured to secure the occupant of the seat bottom 26 and one or more harness 25 with hasps 32 and lap-belts 27 with hasps 11 are configured to secure the occupant of the back, including the cradle 68 with one or more harness with hasp and lap-belt with hasp, and the harness with hasps one on each harness may be wide and cushioned, while inserts 74 reduce the internal space of the integrated seat for protection or are barriers and may elevate or raise and expand from the seat surface or the sides, in which all inclinations and elevations may be controlled with buttons 83, 85, 87, 89, 39, 8, 7, 47, 65, 69 or any other means, manually and/or electronically and/or with a remote control, while padding 76 cover areas for protection, in the integrated seat that has safety control features to monitor the occupant integrated to the vehicle.

The integrated safety seat 10 is configured for occupants of different ages and sizes rear facing, and for occupants of different ages and sizes forward facing. The length of the seat bottom may be shorter than the length of the back. The cradle 68 itself or area between the seat bottom 26 and the back 24 may have additional sections of inclination.

The seat bottom together with the back move from the center or are stationary in the center and elevate to upward and downward inclined positions. The buttons 31 and 37 control the inclinations and elevations of the center of the seat, and sections close to the center. The buttons 41 control the inclinations of the extremes of the seat.

The internal mechanisms that provide the inclinations and elevations of the seat which are buttons 31, 37, 41 together with the inclinations of the head/foot rests 29, 75, 77, 79, 81, 28, 47, 57, given by buttons 39, 83, 85, 87, 89, 8, 7, 17 and together with armrest 23 and 43 with buttons 65, 69, in addition to other buttons for inserts 74, including other inclinations and elevation buttons or controls to provide inclinations and elevations of the integrated safety seat given by any technology, are the following:

The functionality of the integrated safety seat 10 and its means of inclinations and elevations is provided as a unified structure without any construction or detachments.

The means or embodiments of inclination and elevation internal mechanisms of the integrated safety seat include the sliding, the stationary base, and the rotational mechanisms, amongst other mechanisms that may provide the same inclinations and elevations.

The inclination internal mechanisms have different embodiments, in which the first embodiment for the internal mechanisms refers to a sliding mechanism of inclination that moves the body of the seat 10 in the cradle section 68 that is where seat bottom 26 and back 24 unite as one piece with or without separation to the center of the integrated seat, and through the internal mechanisms on the base 90 that provide the inclinations of the integrated safety seat 10 from the rear facing position placement to the forward facing position placement and from the forward facing position placement to the rear facing position placement, the seat bottom 26 and back 24 together with cradle incline smoothly to both sides for the rear facing position and forward facing position and from the forward facing position to the forward facing position to a plurality of angles.

In the sliding embodiment inclination mechanism, the seat bottom 26 and 24 and the cradle that is part of the seat bottom and back have complete support as they slide to both sides, resting on the cradle or base beneath them, therefore it is very secure as well as ergonomic. For this first embodiment of sliding mechanism, there are internal mechanisms for all the inclinations of the integrated safety seat 10, including the cradle assembly 90 in which the acts as the main rotary support with an affiliated seat base 68 that rests on bearings and is held in place by a guide rail 92, with a drive gear wheel 93 that is attached to drive motor 94 and held in location by a spring 95. The drive wheel 95 ultimately engages seat base or cradle 68 and a plunger 96 can be pushed in to cause the drive gear wheel 93 to slide on motor shaft and disengages drive and allows manual manipulation of seat base while a lever 97 allows fore/aft location of the cradle on base as well as up/down elevation of seat base. The seat assembly is comprised of sections and that are free to rotate around a rotary axis 101. The pneumatic bladders 102 can be inflated to provide a side support configured for occupants, or side support is given by other means. The seat assembly 99 and seat assembly 110 have a gear motor/servo 104 in each section that engage gear drive 93 via splined hollow shaft 105. Drive gear wheel 93 engages into rack in associated seat section. To disengage, gear drive slide 103 is released thereby compressing spring 95 by moving splined hollow shaft 105 away from gear 107 and disengaging spline teeth 108. In the main seat in which the seat assembly may have a curved seat section that nests into the cradle 68, the curved receiver allows the seat bottom 26 and back 24 to face front or rear facing. Consequently it is free to translate to fore and aft once the lever 97 is raised thereby releasing locking interface between cradle 68 and base plate 111. Seat sections can adjust accordingly either electrically by activating motors or manually through releases by any technology. In the main seat-gear drive 107, the drive wheel 95 works in both positions. One where it is engaged with the toothed track 113 in seat. The other when plunger 96 is depressed and drive gear 107 goes into pocket allowing the drive wheel 93 to spin freely. In the integrated safety seat 10, rear facing, the seat assembly 99, 110 is configured such to allow the occupant to face towards the rear, and forward facing the seat assembly 99, 110 is configured to allow the occupant to face towards the front. The sliding embodiment internal mechanism can also be given by hinges or the mechanisms of assembly 99 that make the seat scroll from the rear facing to the forward facing position and from the forward facing position to the rear facing position and all their inclinations. In the cradle assembly with retractable armrests 115, the armrest height is controlled by a gear motor that has a gear that positions track thereby raising and lowering armrest 115.

The second embodiment of inclination of seat bottom 26 and back 24, refers to the cradle 68 between seat bottom 26 and back 24 that stays stationary in the center, without moving from the base 120, and only the consecutive sections of the seat provide the inclinations.

In the second embodiment of a stationary seat with movable sections, the independent sections can all move around their respective axes. The center seat 120 in this embodiment stays stationary whilst everything pivots in relationship to it.

The third embodiment of inclination internal mechanism is a rotating mechanism, in which the center of the cradle 68 of seat bottom 26 and back 24 inclines by rotating over the main axis, and seat bottom 26 and back 24 incline to a plurality of angles on both positions, rear and forward, with security barriers included in the mechanism, whereas the motor of the third embodiment seat assembly is placed below the main axis. In the rotating mechanism of the third embodiment, the seat assembly rotates over a main axis 122 with two bearings 123 on each side. A toothed spring 124 is fixed to the main base of seat which is the center of seat bottom 26 and back 24, as well as to the main axis 122. The tooth spring 124 is activated by a spline teeth long gear 125. Two steel pins 126 block the toothed spring 124 to adjust the seat 10 to the required position as a security barrier. Another security barrier is the clutch 127 that connects and disconnects the electric motor of the gear system, enabling manual action, and is mechanically united to the steel pins 126. If the clutch 127 is engaged the steel pins 126 are released. Another security barrier are the proximity sensors that block the feeding of the motor, as well as the solenoid that activates the clutch 127 with torsion sensors. The motor 128 of the third embodiment assembly is placed below the main axis 122.

The means of elevation of the head/foot rests 75, 77, 79, 81, 28, 47 within the integrated safety seat along the seat bottom and back and the cradle in between, are given by any technology, including inflatable pneumatic bladders, manual extraction of a cushioned rest, or any other technology. The means of elevation of the inserts 74 within the integrated safety seat along the seat bottom and back and the cradle in between, are given by any technology, including inflatable pneumatic bladders, manual extraction of cushioned inserts, or any other technology.

The integrated safety seat base 90 allows seat to move upward and downward, forward and backward or sideways, with lever 97 or any mechanisms or technology.

Other inclination and elevation mechanism can be used to provide the same inclinations and elevations to upward and inclined positions of all areas of the integrated safety seat 10. The integrated safety seats 10 provides the rear facing position opposite to the driver and the rear facing position facing the driver, which include the cradle position in between for newborns. The plurality of angles of inclination are provided smoothly by an internal mechanism that could be defined by these embodiments or by others, and all the parts and components of each mechanism hereby described may vary as well as the assembly may vary in the way these inclinations and elevations are provided. The integrated safety seat base 90 has mechanisms that allow the seat to move upward and downward, forward or backward or sideways to any angle in the vehicle provided by lever 97 or other mechanisms. The head/foot rests support 29 and 57 at the extremes of seat bottom and back incline independently to a plurality of angles. The internal head/foot rests within the integrated safety seat along seat bottom and back including cradle provide support to the occupant's head or feet according to the position they are facing, rear or forward, the inserts within the integrated safety seat reduce the space in the seat bottom and in the back, and padding provide protection in the safety seat.

The armrests 23 and 43 within the integrated safety seat provide protection for side impacts in the seat bottom and back and also surround the extremes of the integrated safety seat. There may be additional armrests that elevate from the outer sides of the armrest of the center or cradle 68 of seat bottom 26 and back 24 to provide an alternative barrier of side protection.

In the seat bottom 26 the armrests 23 may elevate with a button 65 or by other means. In the back, the armrest 43 may elevate with a button 69 or by other means. In the cradle 68 area the armrests 23 may elevate with a button 43 or by other means. The armrests 23 and 43 may raise by power with any technology or manually. The armrests may be covered with the same or matching upholstery and be cushioned with padding 76.

There are harness 22 with hasps 46 in seat bottom, and harness 25 with hasps 32 in back, as well as lap-belt(s) 27 with hasps 11, all along the seat bottom 26 and back 24 in the internal surface. There are pairs of orifices 21 along the seat bottom 26 and back 24. The pairs of harness 22, 25 part from the pairs of orifices 21 and are adjusted to the hasps 46 and 32 by adaptor 66. The harnesses may also be integrated on the surface of seat bottom 26 and the back 24 and may be pinned to the different orifices 21 by adaptor 66. The harness 22, 25 may be pulled from the interior of the upholstery and be retractable. There may be only a pair of harnesses 22, 25 internally connected. The harness 22, 25 and hasps 32, 46 may be fastened together or independently and may be fastened into a multiple hasp that includes more hooks or openings in harness and lap-belts, in which the hasp with more hooks may have a diamond shape with electronic sensor 13 with a light that turns on when adaptors are connected, integrated to the safety seat 10. For those harness 22, 25 not in use, a cap may be used over the orifices, in which the caps may be surrounded by the same upholstery of the seat bottom 26, and back 24, and for harness and lap-belts on the surface of seat bottom and back padding may be used to protect and cushion the surface. There may be vests 72 that part from the sides of the integrated seat for every age group, configured to protect and restrain the upper body of the occupant. There are inserts 74 within the integrated safety seat, to limit the internal width of the seat bottom 26 and back 24, or as barriers, in each side of the cradle area 68, and at the other sections of seat bottom 26 and back 24, which may raise or elevate from the surface by any technology. The inserts reduce the internal space for a smaller occupant and may raise and expand form the surface of the seat bottom and back including cradle, or part from the armrests towards the inside of the safety seat.

There is padding to protect and cushion the internal surface of seat bottom 26 and back 24, of the same upholstery or matching the upholstery of seat bottom 26 and back 24 and also to cover the harnesses 22, 25 with hasps 32, 46, lap-belts 27 with hasps 11 that are not in use.

There may be a canopy 9 attached to the seat bottom configured to protect a newborn baby. Safety features are integrated and internally connected to the integrated safety seat 10, which intertwine with one another in a sequence and are reflected in the dashboard on screen and display, configured to protect the child in the integrated safety seat(s) 10 for when the vehicle is in operation, and when the vehicle is not in operation, which include a rear-view mirror 50 which is configured to view the occupant of the integrated seat 10. A camera 35, 42, 44, 62 is integrated in the safety seat to view a seated occupant. Cameras 35, 42, 44 and 62 are placed at the top of seat bottom and back, cameras are placed in the hasps 32, 46 of harnesses 22, 25 for a close-up view of the occupant, in the armrests 23 and 43, or elsewhere in the integrated safety seat 10 and/or vehicle. A screen 52 is configured visible to a forward facing driver of the vehicle. The screen 52 selectively shows an image(s) from the camera(s) 35, 42, 4, 62. There is a display 49 in the dashboard showing the safety controls of the integrated seat 10. The seat bottom 26 and back 24 include an integral scale or pressure detector 30 configured to determine that an occupant is in the integrated seat. Harness 22, 25 with a hasp 32, 46 and lap-belts 27 with hasps on each harness are configured to secure an occupant of the seat bottom 26 and in the back 24, the hasps 32, 46 each include a sensor 13 to determine whether the hasps 32, 46 are fastened. A processor is connected to the display 49 that determines whether the vehicle is in operation or whether the vehicle is or is not in operation based on any of: a speedometer, a transmission or an engine computer, or by other means. A button in the display to indicate that a child is in vehicle is configured to be pressed by the driver. If the detector determines that there is weight or pressure in the seat bottom 26 and back 24 an alert is made in order to fasten the hasps when the vehicle is in operation. If the processor determines that the vehicle is not in operation and the scale or weight or pressure detector indicates to the display a preselected threshold weight and the hasps sensors indicate fastened then an alert is made in order to unfasten the hasps and an alert is configured to remove child from the vehicle and release button with sign of child in vehicle as a reminder. The display 49 is configured to be visible to a forward facing driver of the vehicle. The display 49 shows the signals of the scale, and of the hasps 32, 46, while the vehicle in operation or not in operation, as well as a sign configured as a reminder that an infant or child is in the vehicle is pressed, plus an unbuckling or unfastening electronic remote button internal feature is used, as safety controls of the built in integrated seat 10.

Optionally, inserts 74 are provided that are adapted to fit within the back 24 and seat 26 to reduce the available size of the seat bottom 26 and back 24 configured to fit a smaller child or as barriers. Optionally the inserts raise and expand. Optionally padding is provided in the seat bottom 26 and back 24 configured to cushion and protect an occupant.

Optionally, the alerts from the display are any individual or combination of: a light/and/or a sound, and/or an alarm, and/or a lullaby or other tune, and/or disabling of a vehicle system or a wireless message, or other. Optionally there is a key fob 61 connected to the display as a reminder of a child left in vehicle.

Optionally there is a rear mirror 48, 50 configured to view an occupant of the third seat bottom and third seat back. Optionally, there are different models and sizes of the integrated safety seat 10 configured to be built in different types of vehicles of different dimensions and designs, such as regular vehicles and autonomous vehicles, as well as for buses, boats, aircraft.

A version of the invention can be fairly described as an integrated safety seat 10 permanently built into a rear seat area in a vehicle, united with other seat(s) or separated as a bucket from other seats. The integrated safety seat 10 is configured for an occupant of any age and size on both positions, rear facing and forward facing. The integrated seat may be together with other seat(s) as an independent seat. The integrated safety seat may be next to other seats in a bench, united or not, or may have a distance from other seats as a separate unit. The integrated safety seat 10 has an upholstery that matches and smoothly integrates with the other seats in the vehicle. When the integrated safety seat 10 is separated from other seats, all the upholstery, surface and structure is unified within the integrated safety seat itself 10. There may be more than one integrated safety seat 10 in a vehicle.

The integrated safety seat 10 in all the models and sizes has a concave shape or a regular shape and has inclinations on the center or cradle 68 of seat bottom 26 and back 24 when there is a cradle in between that is part of the integrated seat, with a plurality of inclinations on both sides of the seat bottom 26 and back 24, in different positions and angles configured for occupants of different ages and sizes from infancy to adulthood on both positions of the seat, rear and forward, with controls for the inclinations that are manual or electronic, digital, or any other technology. The integrated safety seat may have a continuous seat bottom 26 and back 24 and a cradle 68 section in between, or not continuous, and have different sections including the center or cradle 68 in between the seat bottom 26 and back 24, wherein the integrated seat 10 has a plurality of inclinations in the seat bottom and back including cradle in between towards the rear facing position and the forward facing position, that may be controlled, whereas seat bottom and back and cradle in between have separate inclinations together or independently from the center cradle between the seat bottom and back, as well as head/foot rests supports 29 and 57 at the extremes of seat bottom and back.

The seat bottom 26 with head/foot rest 75, 77, 79, 81, and back 24 with head/foot rest 28, 47, incline 90 degrees upward and 90 degrees downward, and 180 degrees from the upward position to the downward position, and the head/foot rests incline together or separately with a plurality of inclinations of the seat bottom 26 and together or separately with a plurality of inclinations of the back 24.

The functionality of the integrated safety seat 10 and its inclinations is provided as a unified structure without any further construction or openings or detachments. The integrated safety seat 10 provides the rear facing position opposite to the driver and the forward facing position facing the driver, including the cradle 68 position in between for newborns facing rear, all the angles of inclination are provided smoothly by an internal mechanism that could be defined by the following three embodiments or by others, and all the parts and components of each mechanism hereby described may vary as well as the assembly may vary in the way these inclinations and elevations are provided.

The seat bottom 26 and the back 24 may have additional sections of inclination.

The seat bottom together with the back move from the center and elevate to upward and inclined positions. The buttons 31 and 37 control the inclinations and elevations of the center of the seat, and sections close to the center. The buttons 41 control the inclinations of the extremes of the seat. The internal mechanisms that provide the inclinations and elevations within the seat which are buttons 31, 37, 41 together with the inclinations of the head/foot rests 29, 75, 77, 79, 81, 28, 47, 57, given by buttons 39, 83, 85, 87, 89, 8, 7, 17 and together with armrest 23 and 43 with buttons 65, 69, in addition to other buttons for inserts 74, including other inclinations and elevation buttons or controls to provide inclinations and elevations of the integrated safety seat given by any technology, include the sliding, the stationary base, and the rotational, amongst others.

The first embodiment or mean for the internal mechanisms refers to a sliding mechanism of inclination of the body of the seat from the cradle that is where seat bottom 26 and back 24 unite in the center of the integrated seat 10, and through the internal mechanisms on the base 90 of the integrated seat 10 which supports the cradle 68 that is in between and is part of seat bottom 26 and back 24 that slides smoothly to each of the sides for the rear facing position and forward facing position, to a plurality of angles of inclination.

In this first embodiment that refers to the sliding inclination mechanism, the seat bottom 26 and back 24 with the center or cradle if there is one have complete support as they smoothly slide to both sides rear and forward facing resting on the complete cradle 68 or base 90 beneath them, therefore it is very secure as well as ergonomic. For this first embodiment or sliding mechanism, there are internal mechanisms for all the inclinations of the integrated safety seat 10, including the cradle assembly in which base 90 acts as the main rotary support with an affiliated seat base that rests on bearings and is held in place by a guide rail, with a drive wheel that is attached to a drive motor and held in location by a spring. The drive wheel ultimately engages seat base and a plunger can be pushed in to cause the drive wheel to slide on motor shaft and disengages drive and allows manual manipulation of seat base while a lever allows fore/aft location of the cradle on base. The seat assembly is comprised of sections that are free to rotate around a rotary axis, in which pneumatic bladders can be inflated to provide a side support or armrests configured for the occupants, or side support is given by other means. The seat assembly has gear motor/servo in each section that engages gear drive via splined hollow shaft. Drive gear engages into rack in associated seat section. To disengage, gear drive slide is released thereby compressing spring by moving splined shaft away from gear and disengaging spline teeth.

In the main seat in which the seat assembly has a curved seat section that nests into the cradle 68, the curved receiver allows the seat to face front or rear facing. Consequently it is free to translate fore and after once lever is raised thereby releasing locking interface between cradle and base plate. Seat sections can adjust accordingly either electrically or by activating motors or manually through releases. In the main seat-gear drive, the drive wheel works in both options. One where it is engaged with the toothed track in seat. The other when plunger is depressed and drive gear goes in to pocket allowing the drive wheel to spin freely. In the integrated safety seat 10, rear facing, the seat assembly is configured such to allow the child to face towards the rear. In the cradle assembly with retractable armrests 23 and 43, the armrest height is controlled by gear motor that has a gear that positions track thereby raising and lowering armrest 23 and 43. The second embodiment of inclination of seat bottom 26 and back 24, refers to the cradle 68 between seat bottom 26 and back 24 that stays stationary in the center, without moving from the base, and only the consecutive sections of the seat provide the inclinations.

In the second embodiment of stationary seat with movable sections, the independent sections can all move around their respective axes. The center seat in this embodiment stays stationary whilst everything pivots in relationship to it. The stationary base can include elevations of the cradle.

The third embodiment of internal mechanisms of inclination of seat bottom 26 and back 24 refers to a rotating mechanism, in which the center of the cradle 68 of seat bottom 26 and back 24 inclines by rotating over the main axis, and seat bottom 26 and back 24 incline to a plurality of angles on both positions, rear and forward, with security barriers included in mechanism, whereas the motor of the third embodiment seat assembly is placed below the main axis.

In the rotating mechanism of the third embodiment, the seat assembly rotates over a main axis with two bearings on each side. A toothed spring is fixed to the main base of seat which is the center of seat bottom and back, as well as to the main axis. The tooth spring is activated by a spline teeth long gear. Two steel pins block the toothed spring to adjust the seat to the required position as a security barrier. Another security barrier is the clutch that connects and disconnects the electric motor of the gear system, enabling manual action. The clutch 127 is mechanically united to the steel pins 126. If the clutch is engaged the steel pins 126 are released. Another security barrier are the proximity sensors that block the feeding of the motor, as well as the solenoid that activates the clutch 127 with torsion sensors. The motor of the third embodiment assembly is placed below the main axis.

The integrated safety seat 10 may move from its base, forward or backward, upward or downward or sideways.

The head/foot rests 29 and 57 on each extreme of the integrated safety seat 10 are configured to be a support for the occupant's head and feet alternatively, and are the inclination sections of the seat that are at the extremes of seat bottom and back, which incline to multiple angles by control buttons, or by other technologies, configured to hold an occupant of the integrated seat 10. The head/foot rests support 29 and 57 may be rounded with protruding edges and cushioned. There are internal protruding head/foot rests 75, 77, 79, 81 within the integrated safety seat along the surface of the seat bottom 26 and protruding head/foot rest 29 and 57 along the surface of the back 24 configured for each occupant from a newborn to an adult, which raise and elevate from the surface of the safety seat in which they are integrated with means of elevation such as inflatable bladders.

The armrests 23 and 43 within the integrated safety seat on the each of the sides of seat bottom and back are configured to provide protection to the occupant of the integrated seat 10. The may also surround the extremes of seat bottom 26 and back 24, and armrests 23 and 43 may raise to different elevations manually, electronically or by other means including pneumatic bladders. Harness 22 and 46 with hasps 25, 32 and lap-belt(s) 27 with hasps 11 along the seat bottom 26 and back 24 within the integrated safety seat are configured to restrain the occupants, and there may be more than one of them on seat bottom 26 and more than one of them on back 24 configured for the adequate restraint system of any size of occupant of the integrated seat 10. The hasps 25, 32 or harness and hasps 11 of lap-belt(s) 27 may fasten into a multiple hasp of various hooks, together or separately, and the hasps may have an electronic sensor 13 for the connectors of harness and lap-belts(s). The harness and lap-belts(s) may be wide, in a triangular shape and cushioned, and may be covered with the same or matching fabric as the upholstery of seat bottom and back. Harness and lap-belt(s) may part from pairs of orifices 21 in the seat bottom 26 and back 24 in retractable mechanisms, or are pinned to the orifices 21. Orifices 21 may be covered with padding 76 when not in use. Vests 72 may be integrated in the sides of the seat 10 for every age group, for additional protection.

Inserts 74 within the integrated seat are configured to reduce the space to better accommodate an occupant in the seat bottom 26 and back 24, or as barriers, and may raise and expand to reduce the space, parting from the surface of seat bottom 26 and back 24 or from the inner sides of armrests 23 and 43. Padding 76 cover the surface of the seat 10 in areas that are not in use to provide protection and comfort. All the features within the integrated safety seat such as head/foot rest within the seat, inserts, and armrest, may elevate with means described herein or with other mechanisms given by any technology.

Control features are configured in the integrated safety seat 10 to monitor the status of an occupant, in particular, infants and children, regardless that the vehicle is operating, including a rear view mirror 48, camera(s) 35, 42, 44, 62, to capture images and reflect them to be visible to driver, in which a camera 42 is directed to the back, another camera 35 is directed to the seat bottom, and other set of cameras 44, 62 are in hasps of harness, in the armrests and/or elsewhere. A screen 52 is configured to be visible to a forward facing driver of the vehicle. The screen selectively shows image(s) from the cameras. A display 49 with internal and also manual signs is configured to be visible to a forward facing driver. The seat bottom 26 and back 24 include an integral scale or a weight detector 30 as an internal part of the integrated safety seat 10 that is part of the vehicle. The harness 25, 22 with hasps 32, 46 and lap-belt(s) 27 with hasps 11 are provided to secure an occupant of the seat bottom 26 and the back 24. The hasps 32, 46, 11 each include a sensor 13 to determine whether the hasps 11 are fastened. A processor is connected to the display 49 to determine whether the vehicle is in operation based on any of: a speedometer, a transmission or an engine computer, or by any technology. A sign in the display 49 is configured to indicate if a child is in the vehicle. A sign in the display 49 connected to a scale or pressure detector 30 on the seat bottom and back is configured to indicate if a child is occupying the integrated safety seat 10. A sign in the display 49 is connected to each of the sensors 13 in the hasps 32, 46 and 11 of the harness 22, 25 and lap-belt(s) 27 of the seat bottom 26 and back 24 of integrated safety seat 10. Signs visible to a driver are configured to indicate if the child is fastened, if he is in the safety seat, if he is in the vehicle, when the vehicle is in operation and when the vehicle is not in operation. If the processor determines that the vehicle is not in operation and the scale indicates in the display a preselected threshold weight and each of the hasps sensors indicate fastened in the display, then an alert is made. When the vehicle is in operation the sign of Infant in Vehicle, Infant in Seat, and Infant Buckled, are equally activated in an intertwined system, and emit alerts. The alerts are activated lights and/or sounds and/or alarms connected to the controls of the integrated safety seat 10. A sign Unbuckle the hasps remotely from the display or a dashboard, connected internally to integrated safety seat. A key fob configured to emit signal of Infant in vehicle, and may also unbuckle the child remotely, connected internally to the integrated safety seat 10. The integrated safety seat 10 has adaptable positions configured to be opposite to the driver and facing the driver, with inclinations of the concave shape or regular shape seat bottom 26 and back 24 provided by an internal mechanism with the extremes of seat bottom 26 and back 24 or independently to a plurality of angles of inclination on the rear facing position and the forward facing position, and elevations of armrests 23, 43 on both sides of seat bottom 26 and back 24 to different heights, all controlled with buttons, or any technology, and with remote control. The integrated seat 10 is featured in different models and sizes to comply with the size of the vehicle, the design of the vehicle in which it will be permanently built-in, or the preference, therefore the integrated safety seat may have more or less sections of inclination. Optionally, the integrated safety seat 10 further has inserts 74 and padding 76 provided to reduce and cushion the available size of the seat bottom 26 and the back 24 configured to fit a smaller child. Optionally, the alert is any individual or combination of: a light and/or an intermittent light in display, and/or an alarm, and/or a sound, and/or a tune, and/or disabling of a vehicle system, and/or a wireless message, and/or other, internally connected to the integrated safety seat, Optionally the seat bottom and back have a concave shape or a regular shape provided with a mechanized recline to convert the seat from forward facing to rear facing, A canopy 9 configured for the newborn infants. Optionally the armrests 23, 43 elevate to different heights. Optionally the headrests and footrests within the seat bottom 26 and back 24 raise and expand when in use. Optionally the inserts 74 raise and expand to reduce the internal space or to be a barrier in seat bottom 26 and back 24 including cradle 68. Optionally there could be orifices 21 in seat bottom 26 and back 24 to retract or pin harnesses. Optionally the harnesses 22, 25 and hasps 32, 46 and lap-belts 11 with hasps are cushioned, may have a triangular shape or a shape of a vest 72, and may be covered by the same or matching upholstery as the seat, and configured to adapt to the age and size of the occupant of the integrated safety seat 10. Optionally there could be more than one harness 22, 25 and lap-belt(s) 27 along the seat bottom 26 and more than one harness 22, 25 and lap-belt(s) 27 along the back 24 with mechanisms that could be inside or outside the upholstery, and may be retractable. Optionally there could be independent hasps 32, 46 for harnesses 22, 25 and lap-belts 27, with hasps 32, 46, 11 in which harnesses and lap-belts are connected together. Optionally the hasps 32, 46, 11 may be electronic with the sensors 13 connected to emit signals of child buckled, internally connected and configured to be visible by a forward facing driver when the vehicle is in operation and when the vehicle is not in operation. Optionally padding could cover and protect areas in seat bottom 26 and back 24 that cover harnesses that are not in use. Optionally the orifices 21 can be covered by caps. Optionally there could be different models and sizes of integrated safety seats 10 configured for an occupant from infancy to adulthood, as well as different models to comply with the dimension and design of the vehicle in which they are built in, and different kinds of upholstery such as fabric or leather, for vehicles that are regular or autonomous. Optionally the integrated seat 10 can be built-in when a vehicle is assembled, or can be built into the vehicle after the vehicle is assembled. Optionally the integrated safety seat 10 may be for all vehicles, for cars such as vans, crossovers, SUVs, sedans, buses trains, as well as boats, aircraft.

Another version of the device embodied in its inventive concept may be fairly described as an integrated safety seat 10 permanently built into a rear area of a vehicle, united or separated from another seat or other seats. The integrated seat has a seat bottom 26 and a back 24, and may have a cradle 68 in between that belongs to seat bottom and back. The seat bottom 26 and back 24 are configured to support an occupant from infancy to adulthood, in each of the positions, rear facing or forward facing.

The integrated seat 10 has an upholstery that matches and smoothly integrates the seat bottom 26 and back 24. The integrated safety seat may be part of the other seats in the vehicle.

In an Integrated safety seat 10 that is separated from the other seats, the upholstery, surface and structure is smoothly integrated with the integrated safety seat itself 10 and built into the vehicle. There may be more than one integrated safety seat 10 in a vehicle.

The integrated seat 10 has inclinations to upward and inclined positions to the rear facing position or placement, forward facing position or placement, including the cradle position placement in between that is part of the seat bottom and back, with head/foot rests supports 29, 57 in the extremes, in a plurality of angles configured for different ages and sizes.

The integrated safety seat 10 provides the rear facing position opposite to the driver and the forward facing position which faces the driver, including the cradle position in between for newborns, all the angles of inclinations and elevations are provided smoothly by an internal mechanism that could be defined by the following three embodiments or means, or by others, and all the parts and components of each mechanism herein described may vary as well as the assembly may vary in the way these inclinations and elevations are provided.

The seat bottom together with the back move from the center and elevate to upward and inclined positions. The buttons 31 and 37 control the inclinations and elevations of the center of the seat, and sections close to the center. The buttons 41 control the inclinations of the extremes of the seat.

The internal mechanisms that provide the inclinations and elevations of the seat which are buttons 31, 37, 41 together with the inclinations of the head/foot rests 29, 75, 77, 79, 81, 28, 47, 57, given by buttons 39, 83, 85, 87, 89, 8, 7, 17 and together with armrest 23 and 43 with buttons 65, 69, in addition to other buttons for inserts 74, including other inclinations and elevation buttons or controls to provide inclinations and elevations of the integrated safety seat given by any technology, include sliding, stationary base and rotational, amongst other mechanisms.

All the components or mechanical parts of the means of inclination may vary or be of a different technology.

The first embodiment or means for the internal mechanisms refers to a sliding mechanism of inclination of the body of the seat 10 from the cradle 68 that is where seat bottom 26 and back 24 unite, in the center of the integrated seat 10, and through the internal mechanisms on the base 90 of the integrated seat 10 the cradle 68 or the area that unites seat bottom 26 and back 24 slides smoothly to both positions upward and downward for the rear facing position and forward facing position, to a plurality of angles of inclination.

In the first embodiment or mean that refers to the sliding inclination mechanism, the seat bottom 26 and back 24 have complete support as they slide to both sides resting on the complete cradle 68 or base beneath them. For this reason it is very secure as well as ergonomic.

The second embodiment of inclination of seat bottom 26 and back 24, refers to the cradle 68 between seat bottom 26 and back 24 that stays stationary in the center, without moving from the base, and only the consecutive sections of the seat provide the inclinations. Elevations can be given in the stationary base by means of any technology.

The third embodiment of internal mechanisms of inclination of seat bottom 26 and back 24 refers to a rotating mechanism, in which the center of the cradle 68 of seat bottom 26 and back 24 inclines by rotating over the main axis, and seat bottom 26 and back 24 incline to a plurality of angles on both positions, with security barriers included in mechanism, whereas the motor of the third embodiment seat assembly is placed below the main axis.

The integrated safety seat base 90 has mechanisms that allow the seat to move upward and downward, forward or backward or sideways to any angle in the vehicle provided by lever 97 or other mechanisms.

Other inclination and elevation mechanisms can be used to provide the same inclinations and elevations of the seat bottom and back of the safety seat, with the same or other components.

The integrated safety seat 10 has headrests supports that act like footrests supports as well 29, 57 in the extremes, and has head/foot rests within the safety seat along the surface of the seat bottom 26 and along the back 24, and the cradle 68, configured for different ages and sizes. The headrests and footrests support 29, 57 in the extremes and along the seat bottom 26 and back 24 may be rounded, with protruding edges and cushioned, and are configured to accommodate the different ages and sizes of the occupants. The internal head/foot rests within the integrated safety seat along the seat bottom and back may raise and expand from the surface of seat bottom 26 and back 24 when in use, with elevations mechanisms described herein or by any technology, such as inflatable or pneumatic bladders.

The integrated safety seat 10 is configured to have armrests 23 and 43 or side protection within the safety seat, on both sides and edges of the headrests and/or footrests supports 29, 57 at the extremes of seat bottom 26 and back 24, configured to provide complete protection to the occupant, which may elevate to different heights manually or powered assisted, electronically, or by any technology. There may be additional armrest externally for side protection.

The integrated seat 10 has harnesses 22, 25 with hasp 32, 46 and lap-belts 27 with hasps 32, 46 that may be triangular in shape, and may have a vest, and are cushioned and wide. They are located all along the seat bottom 26 and back 24 configured for different ages and sizes.

The pairs of harnesses 22, 25 and lap-belts 27 part from pairs of orifices 21 along the seat 10, they may be retractable or adjusted by pins or with other mechanisms, and have hasps with hooks to fasten the harnesses 22, 25 and lap-belts 27, with sensors 13, and electronic light.

The integrated seat 10 has inserts 74 within to reduce the space or as barriers, all along the seat bottom 26 and back 24 including the cradle 68 area, which may raise and expand from the surface of seat bottom 26 and back 24 or from the internal sides or the armrests, configured to reduce the internal width of the seat 10 for different ages and sizes, and padding 76 that provide comfort in the surface of the safety seat that may cover the harnesses 22, 25 that are not in use. The means of elevation of the inserts may be given by any technology.

The integrated safety seat 10 has control features are configured to protect the status of the child at all times while he is travelling in the vehicle, and when the vehicle is stopped, including amongst other features: a rear-view mirror, cameras directed to the integrated safety seat 10 to be reflected in screen configured to be viewed by a forward facing driver, wherein the display has electronic and manual control signals. All the safety features are reflected to be visible by a forward facing driver. The integrated safety seat 10 includes an integral scale or pressure detector 30. The harnesses with hasps 32, 46 on each harness 22, 25 as well as the lap-belts 27 with hasps 11, are provided to secure an occupant of the seat, internally connected to the integrated safety seat 10. The hasps 32, 46, 11 each include a sensor 13 internally connected to determine whether all the hasps 32, 46, 11 are fastened; a processor is connected to the display 49 that determines whether the vehicle is in operation or not based on any of: a speedometer, a transmission or an engine computer, or by any other technology. If the button "infant in car" configured to indicate that a child is in the vehicle is pressed, and the scale determines there is a preselected threshold weight in the seat bottom and back reflected in the sign configured to indicate a child being in the integrated safety seat 10, an alert is made to fasten all the hasps 32, 46 reflected on button to indicate child buckled for the occupant of the integrated seat 10 in order for the vehicle to be in operation. If the processor determines that the vehicle is not in operation and the scale indicates to the display 49 a preselected threshold weight indicates an infant is in the seat and each of the hasp sensors 13 indicate fastened then an alert is made configured to unbuckle or unfasten a child, to remove child from seat, and to not leave child alone in vehicle. Electronic, digital or other technology signs of configured infant in seat, and configured infant buckled or fastened are reflected to be visible to a forward facing driver, which may be in the dashboard or in the display or the screen or elsewhere, which are internally connected to the integrated safety seat 10.

Manual buttons or signs configured as a reminder of Infant in Vehicle are reflected and visible to a forward facing driver in the dashboard or the display, internally connected to the integrated safety seat 10. Electronic button to unbuckle, is reflected in the dashboard or the display, internally connected to the safety seat 10. Electronic control configured to indicate Infant in Vehicle in key fob is internally connected to the display of Integrated Safety Seat 10. Alerts such as: lights and/or intermittent lights and/or sounds such as a lullaby and other alarms, and/or voices, and/or others, are configured to be activated and deactivated according to status of the infant or child in vehicle, the actions taken, and the control signs, when the vehicle is in operation and when the vehicle is not in operation, internally connected to the safety seat 10.

Optionally, an insert 74 and padding 76 are provided that are adapted to fit within the integrated seat to reduce and cushion the available size of the seat bottom 26 and back 24 configured to fit a smaller infant or child. Optionally, the rear area of a vehicle includes more than one integrated safety seat 10. Optionally, the seat bottom 26 together with the back 24 including the cradle 68 in between with concave shape or regular shape are provided with a mechanized recline to convert the seat bottom 26 and back 24 and cradle 68 in between from forward facing to rear facing, and from rear facing to forward facing, with head/foot rests supports 29 and 57 at the extremes that also recline in multiple angles, to accommodate an occupant from newborn to an adult in each position.

Optionally, there are a plurality of inclinations in the seat bottom 26 and back 24. Optionally there are armrests 23 and 43 that elevate to different heights on both sides of seat bottom 26 and back 24 to provide side protection configured to the occupant of the integrated safety seat 10, manually or electronically. Optionally, all the inclinations and elevations are controlled manually, electronically or by other technology, directly in the integrated seat 10 or in remote control or elsewhere. Optionally, there is a canopy 9 for newborns. Optionally, there is a rear infant mirror in dashboard. Optionally there is a key fob with a sign of child in vehicle connected to the display 49 and the lock of the vehicle with an alert such as a sound, and/or an alarm, and/or a message. Optionally the "unbuckle" button is connected to the key fob. Optionally, there are more than one integrated safety seats 10 in vehicle. Optionally, the integrated safety seat(s) 10 matches the upholstery, design and décor of the rests of the seats in the vehicle. Optionally, there are different models and sizes of integrated safety seats 10 for regular and autonomous vehicles, and other vehicles such as buses, boats, aircraft.

What is claimed is:

1. A safety seat permanently integrated into a vehicle, wherein the integrated safety seat comprises:
    a seat bottom and a back, wherein the seat bottom and the back incline in a plurality of angles, whereby inclinations of the seat bottom and back cause the configuration of the safety seat to change from a plurality of forward facing positions to a plurality of rear facing positions, and from a plurality of rear facing positions to a plurality of forward facing positions, thereby allowing an occupant ranging in age from a newborn to an adult positioned in the safety seat to face a driver when the safety seat is in a forward facing position or face a rear of the vehicle when the safety seat is in a rear facing position;
    a first support positioned at a first end of the seat bottom, wherein the first support serves as a footrest configured to the occupant in the safety seat when in a forward facing position and wherein the first support serves as a headrest configured to the occupant in the safety seat when in a rear facing position;
    a second support positioned at a first end of the back, wherein the second support serves as a headrest configured to the occupant in the safety seat when in a forward facing position and wherein the second support serves as a footrest configured to the occupant in the safety seat when in a rear facing position; and
    a means for inclining the seat bottom and back.

2. The safety seat of claim 1, wherein the safety seat includes a cradle section positioned between the seat bottom and back, the cradle section comprising a first section of the seat bottom and a first section of the back, and wherein the cradle section inclines to a plurality of angles ranging from a forward facing position to a rear facing position.

3. The safety seat of claim 2, wherein the seat bottom, the back, and the cradle section incline independently of one another.

4. The safety seat of claim 2, wherein the cradle further comprises a plurality of sections and wherein each of the plurality of sections is configured to incline independently of the remaining sections of the plurality, and wherein each of the plurality of sections incline in a plurality of angles.

5. The safety seat of claim 2, further comprising a first harness with a hasp and a first lap belt with a hasp in the seat bottom configured to secure an occupant in a rear facing position, a second harness with a hasp and a second lap belt with a hasp in the back configured to secure an occupant in a forward facing position.

6. The safety seat of claim 2, further comprising an armrest in the seat bottom and an armrest in the back, positioned along either side of the integrated safety seat.

7. The safety seat of claim 2, further comprising inserts within the cradle section, the seat bottom and back of the integrated safety seat.

8. The safety seat of claim 1, wherein the safety seat is united with another seat in the vehicle.

9. The safety seat of claim 1, wherein the safety seat is separated from another seat in the vehicle.

10. The safety seat of claim 1, wherein the seat bottom and back each comprise a plurality of sections, and wherein each of the plurality of sections of the seat bottom and back are configured to incline independently of the remaining sections of the plurality, and wherein each of the plurality of sections incline in a plurality of angles.

11. The safety seat of claim 1, wherein the first support and the second support are each configured to independently incline in a plurality of angles to accommodate the occupant.

12. The safety seat of claim 1, further including safety controls permanently integrated in the vehicle, wherein the safety controls are configured to provide alerts regarding a status of the occupant in the vehicle, and further configured to provide alerts as to whether the occupant is buckled in the safety seat, and wherein the safety controls are operational regardless of whether the vehicle is in operation.

13. The safety seat of claim 1, wherein the means for inclining the seat bottom and the back is a mechanism positioned within an interior of the integrated safety seat, and wherein the mechanism is configured to incline and elevate the integrated safety seat in a plurality of at least one upward and downward inclined positions.

14. The safety seat of claim 13, wherein the mechanism for inclining the seat bottom and the back is configured to incline and elevate the integrated safety seat in at least one of a sliding, a rotation and an elevation motion.

15. The safety seat of claim 13, wherein the mechanism for inclining and elevating the seat bottom and the back moves the safety seat in a first direction in a plurality of angles from the forward facing positions to the rear facing positions and in a second direction in a plurality of angles from the rear facing positions to the forward facing positions.

16. The safety seat of claim 1, further comprising an armrest in the seat bottom and an armrest in the back, positioned along either side of the integrated safety seat.

17. The safety seat of claim 1, further comprising inserts within the seat bottom and back of the integrated safety seat.

18. The safety seat of claim 1, wherein a third support is located within at least one of the seat bottom and back.

* * * * *